May 3, 1938. G. V. ANDERSON 2,116,376
HYDRAULIC CONTROL MECHANISM
Filed Jan. 17, 1936 27 Sheets-Sheet 1
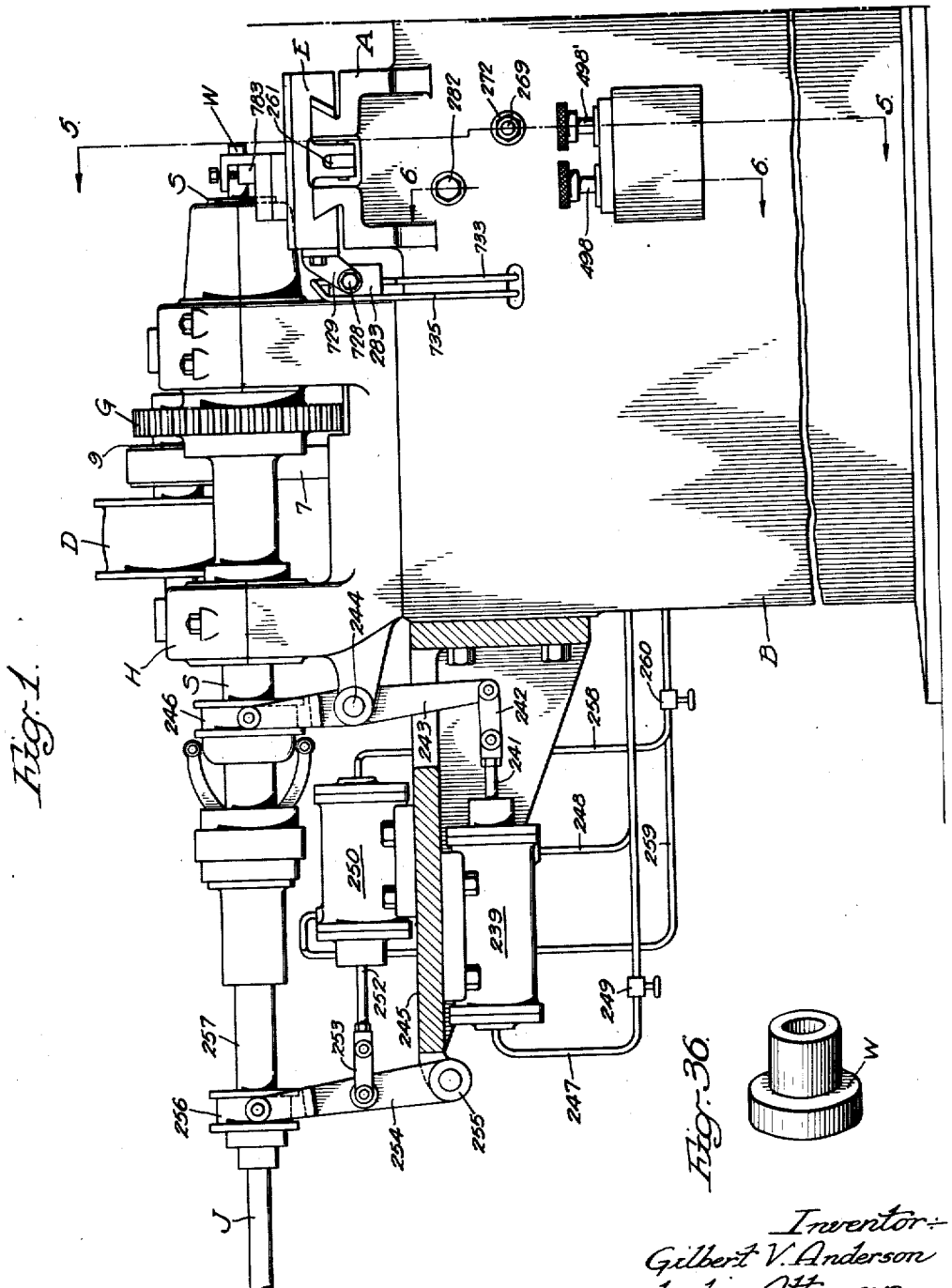
Inventor:-
Gilbert V. Anderson
by his Attorneys
Howson & Howson

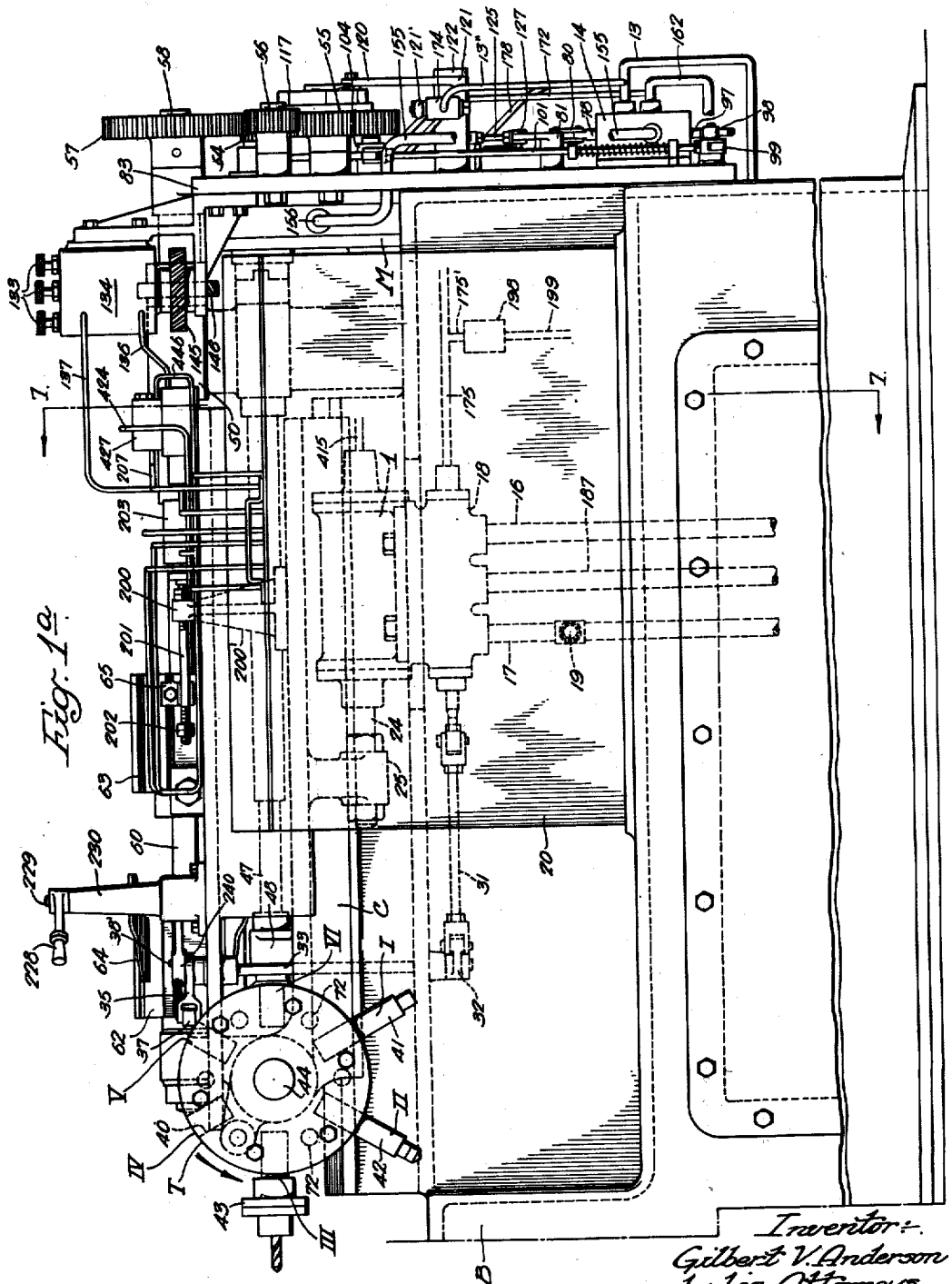

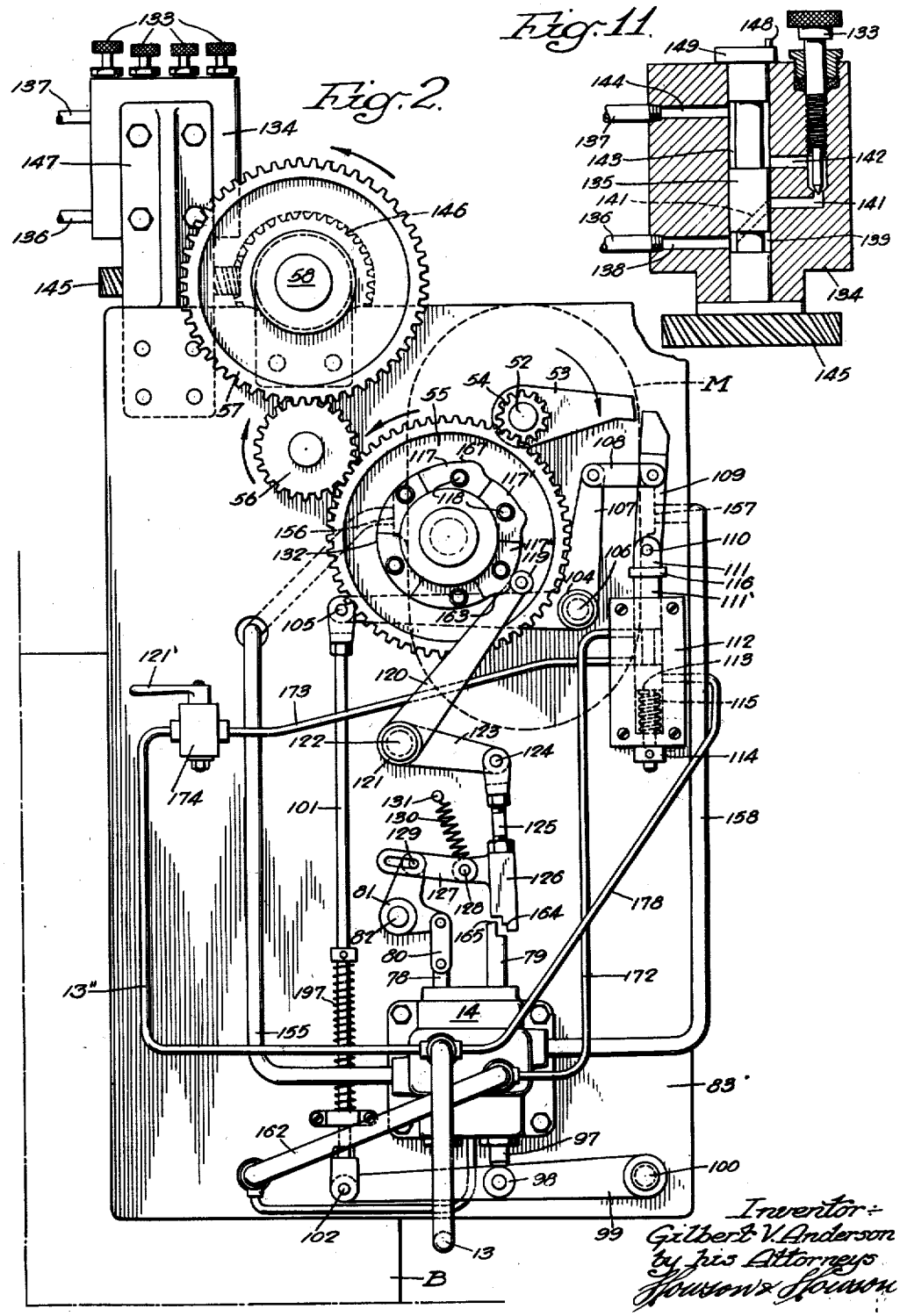

May 3, 1938. G. V. ANDERSON 2,116,376
HYDRAULIC CONTROL MECHANISM
Filed Jan. 17, 1936 27 Sheets-Sheet 4
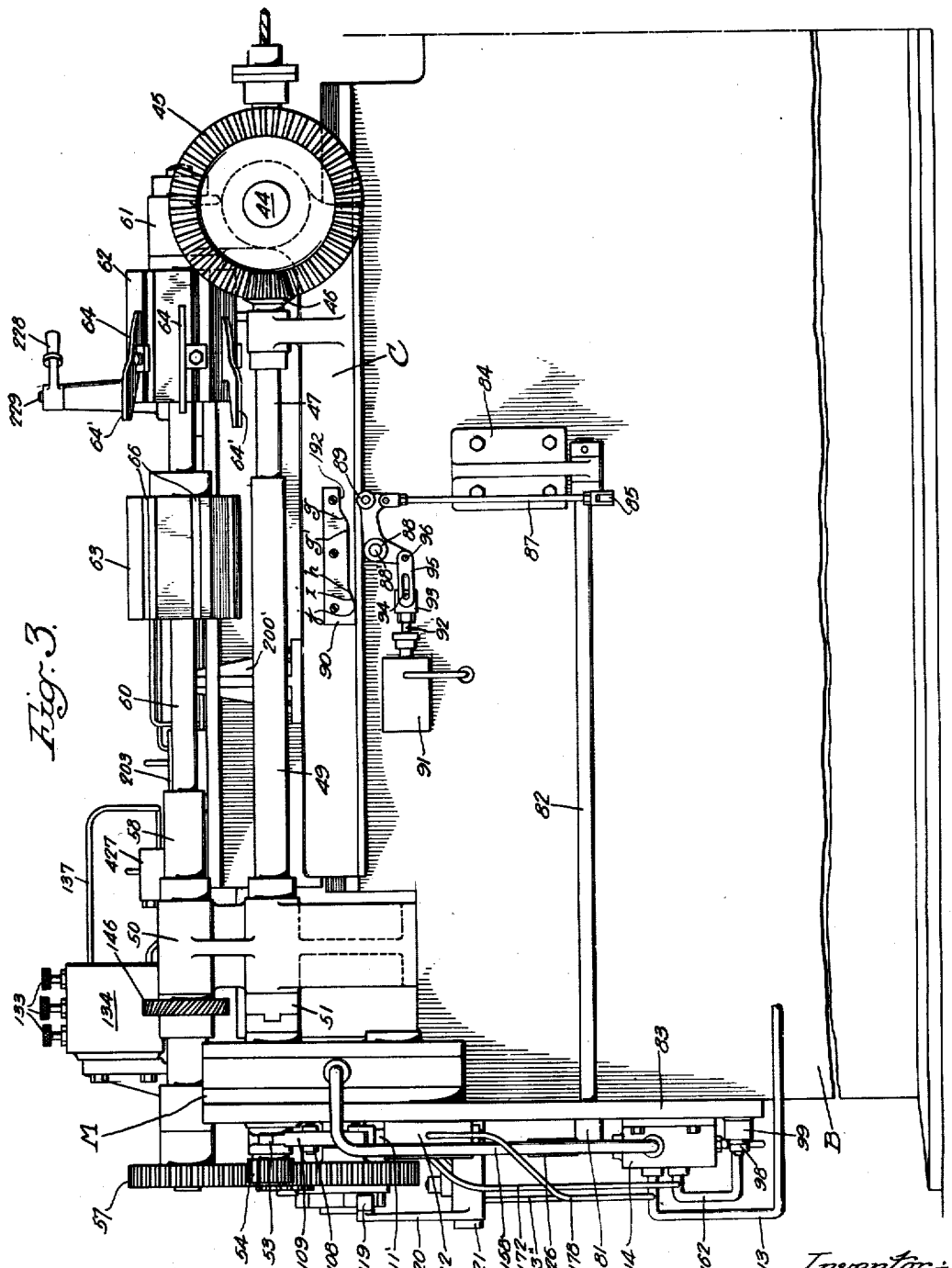

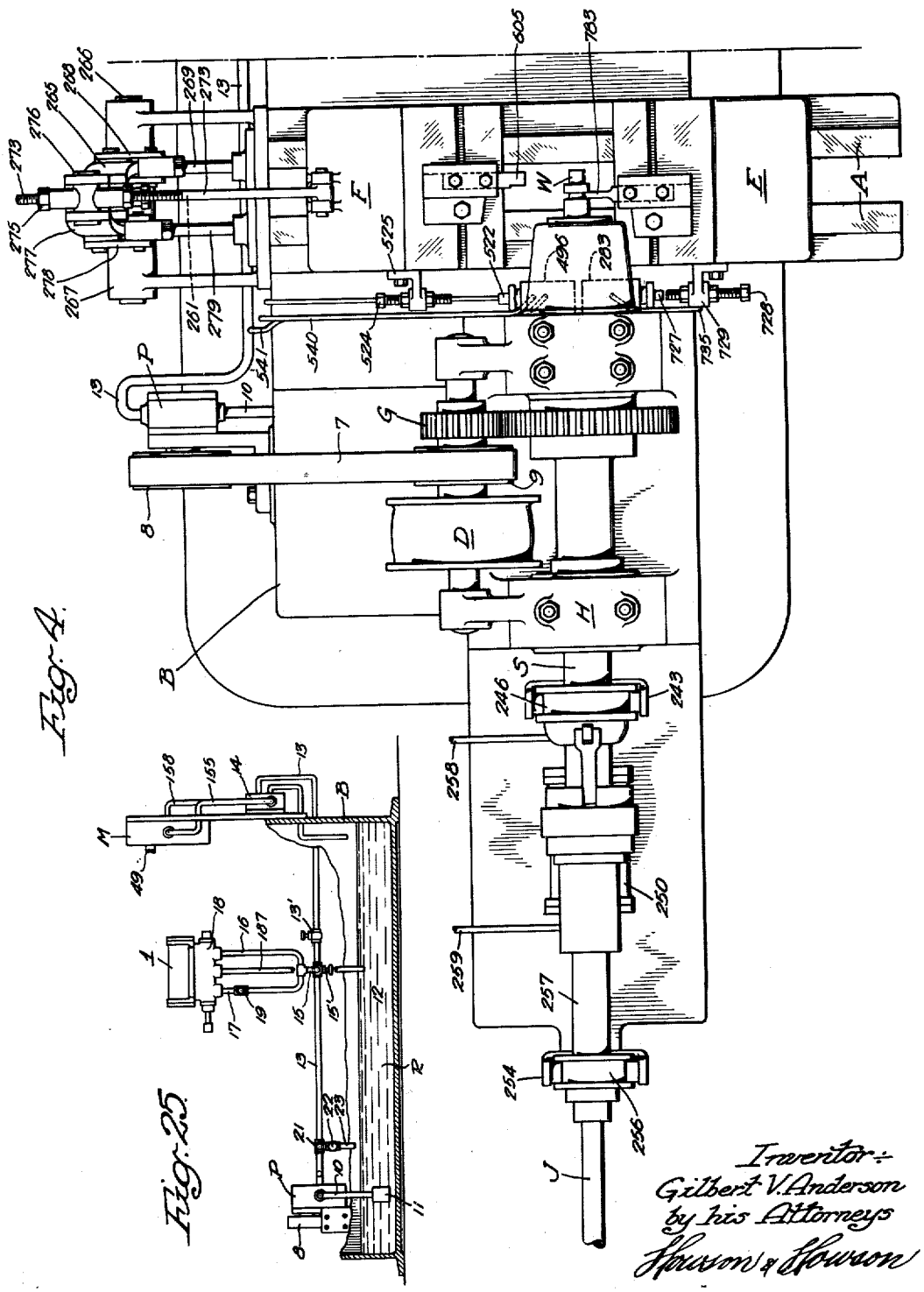

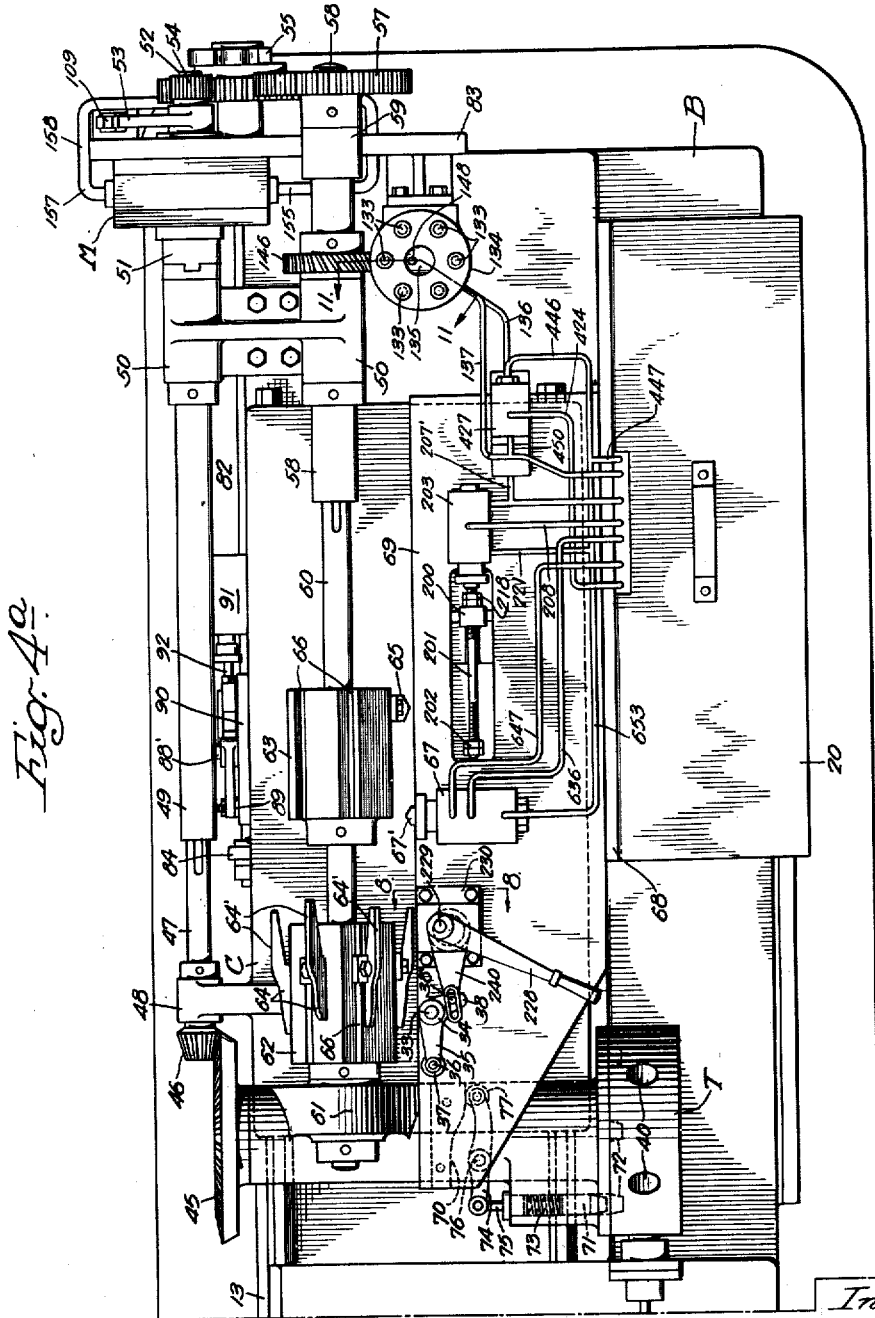

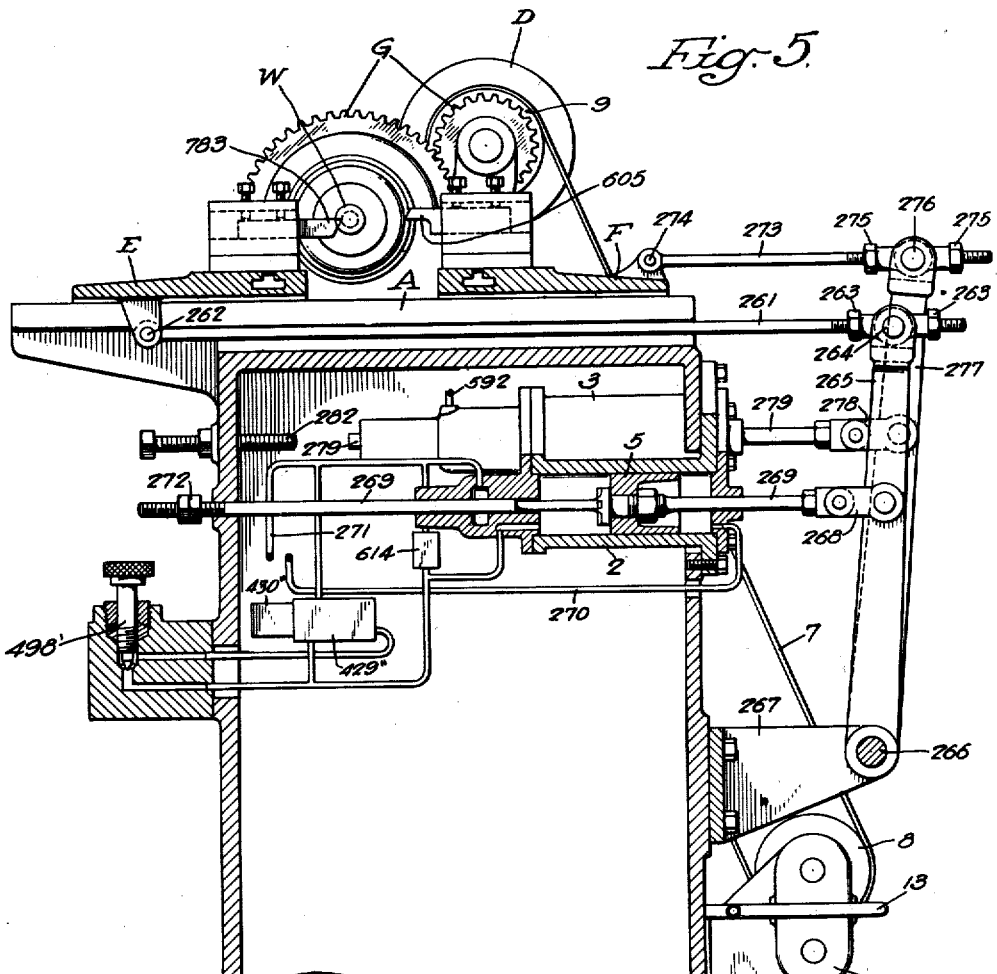
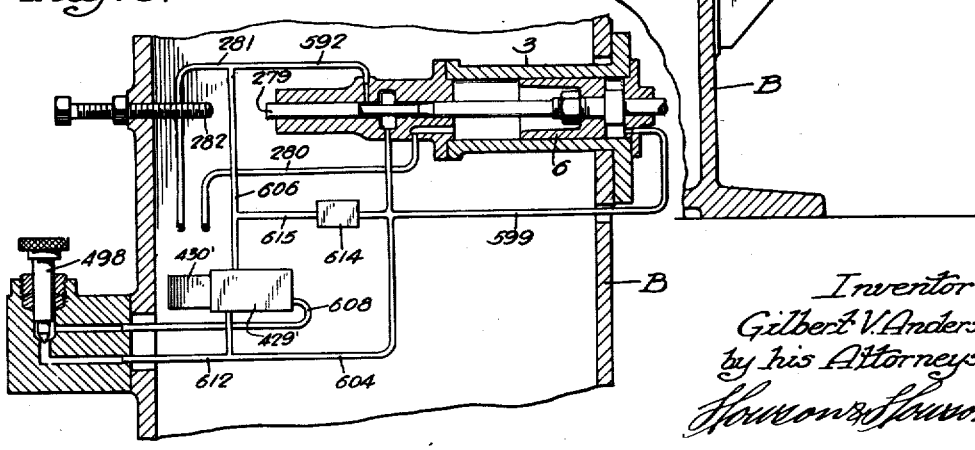

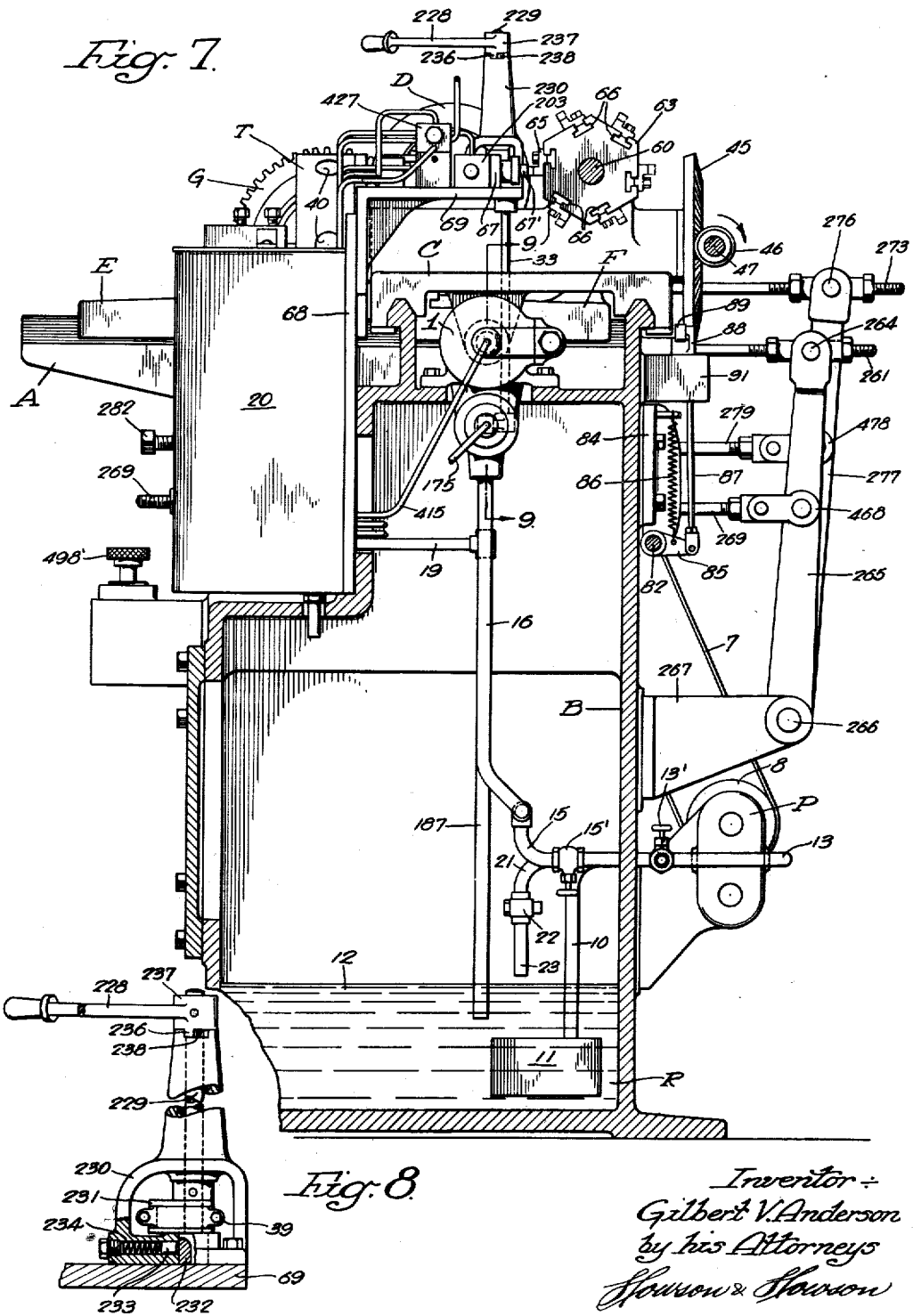

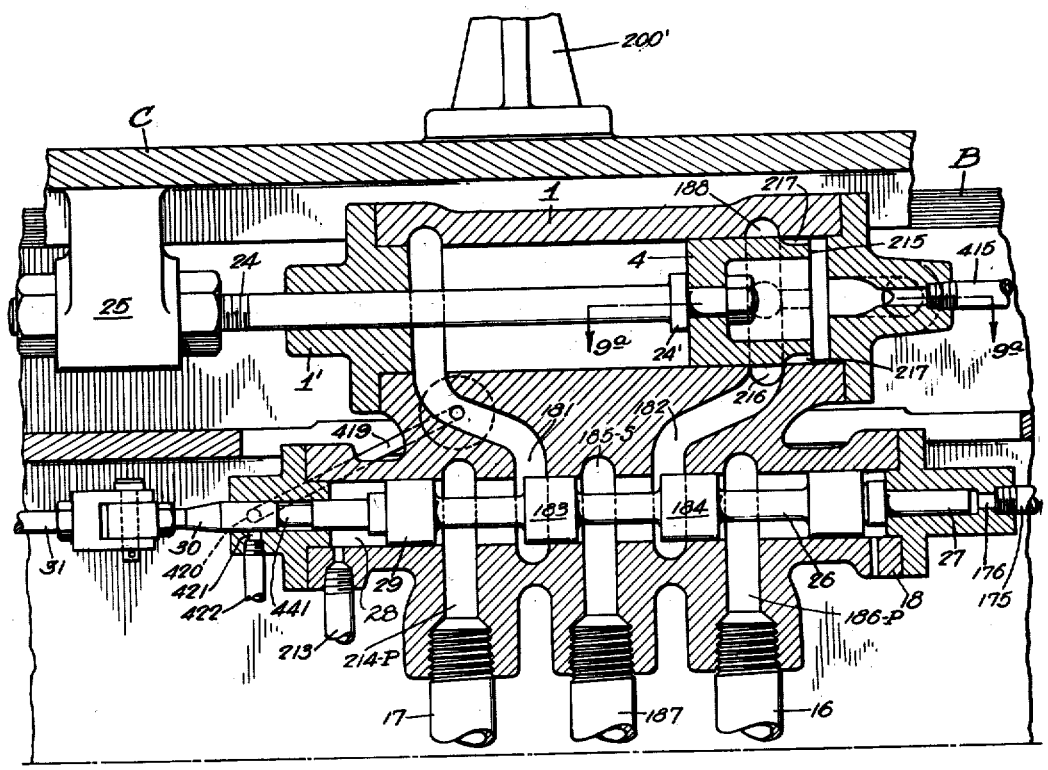
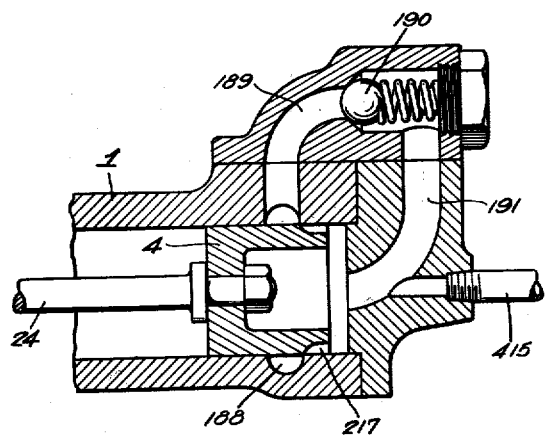

Inventor:
Gilbert V. Anderson
by his Attorneys

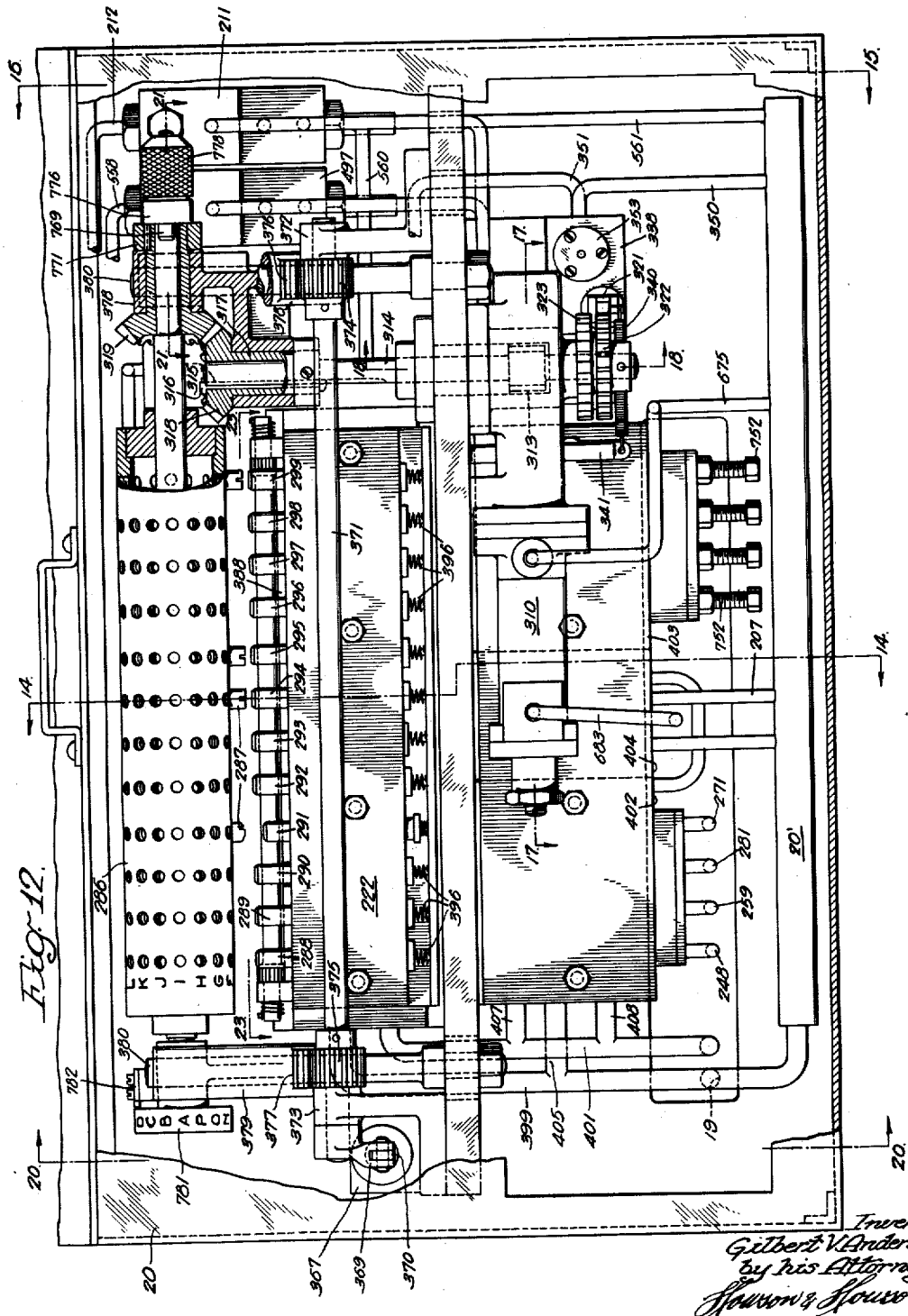

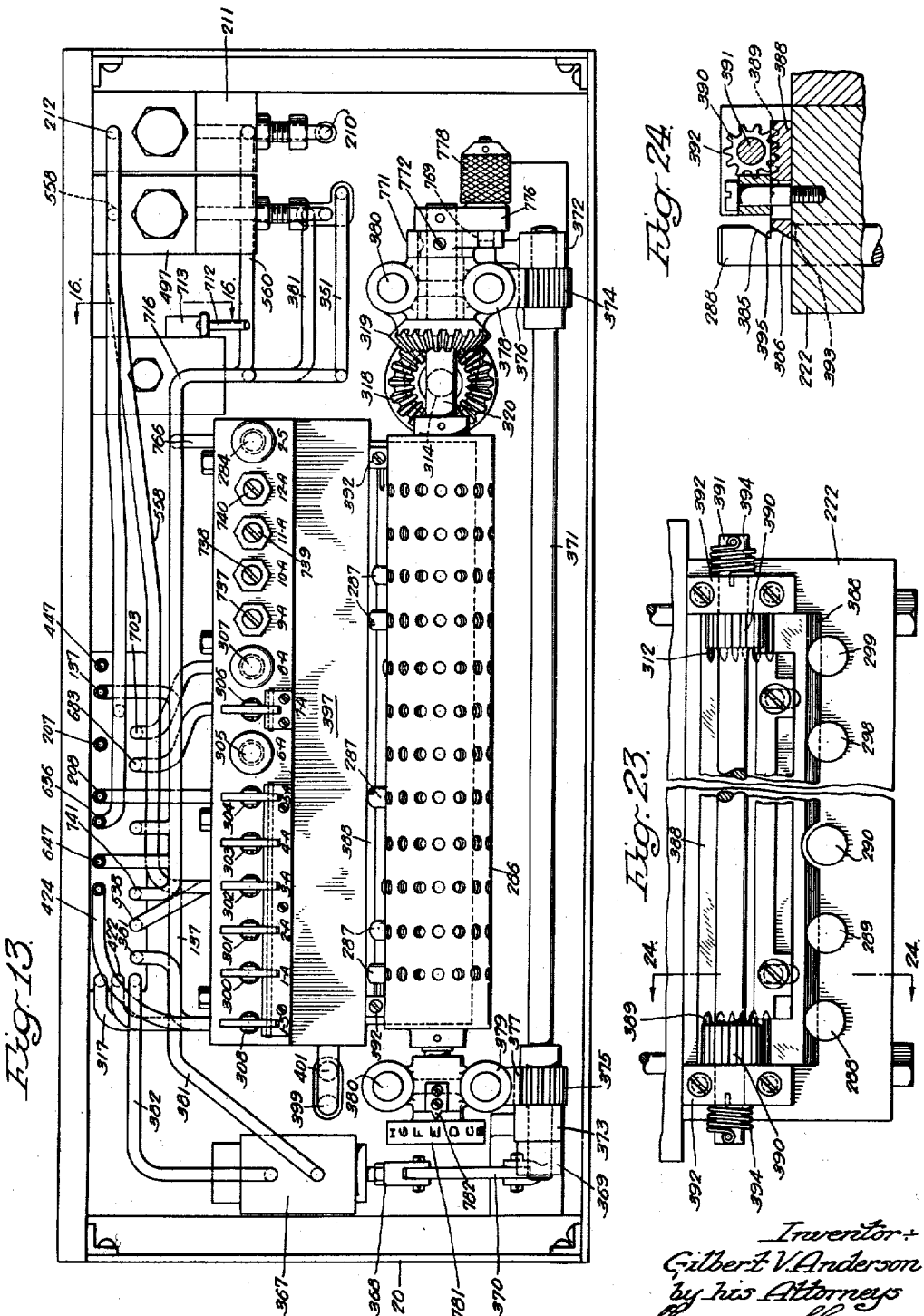

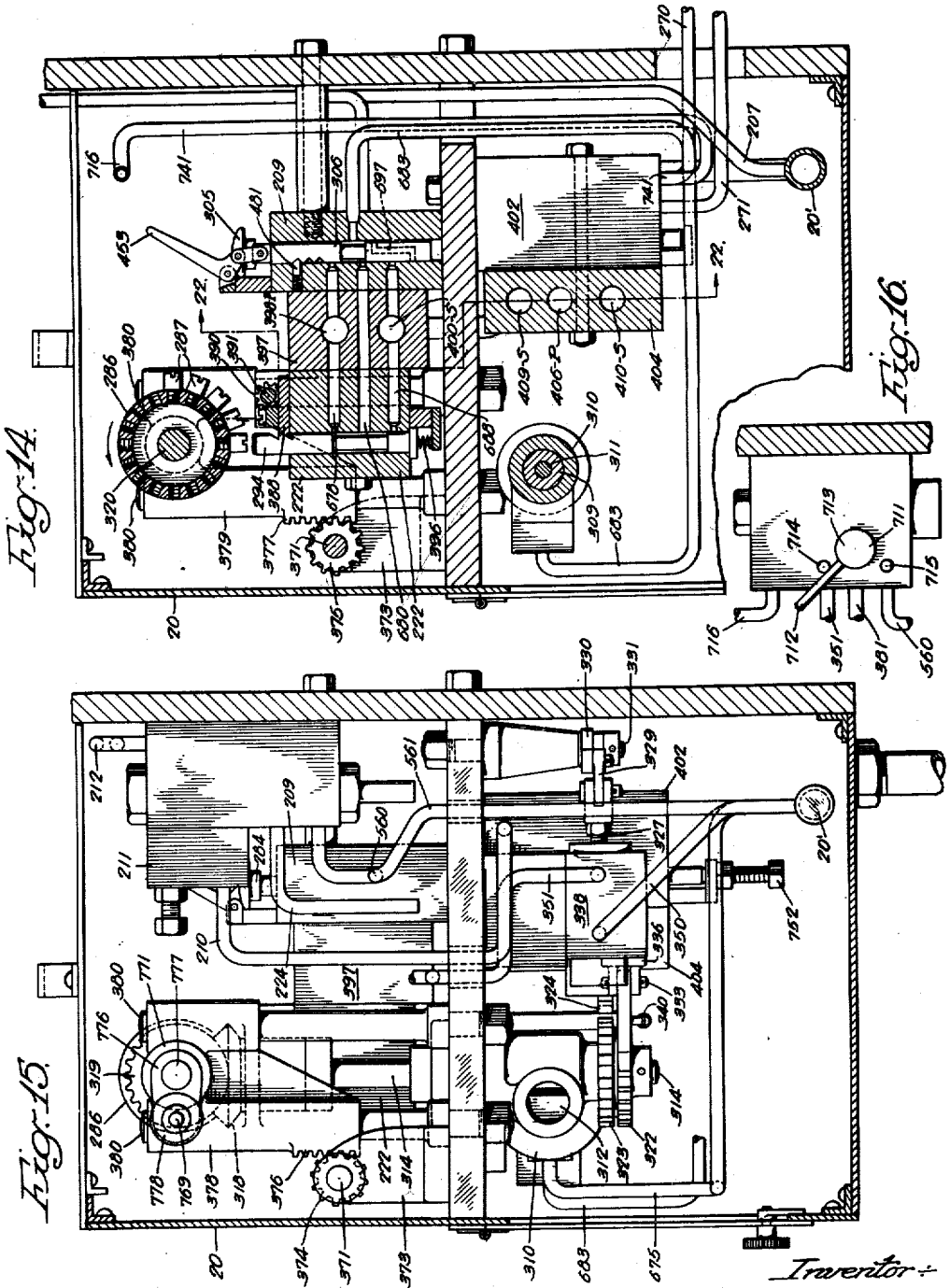

May 3, 1938.　　　G. V. ANDERSON　　　2,116,376

HYDRAULIC CONTROL MECHANISM

Filed Jan. 17, 1936　　　27 Sheets-Sheet 15

Inventor:
Gilbert V. Anderson
by his Attorneys
Lawson & Lawson

May 3, 1938.  G. V. ANDERSON  2,116,376
HYDRAULIC CONTROL MECHANISM
Filed Jan. 17, 1936  27 Sheets-Sheet 16
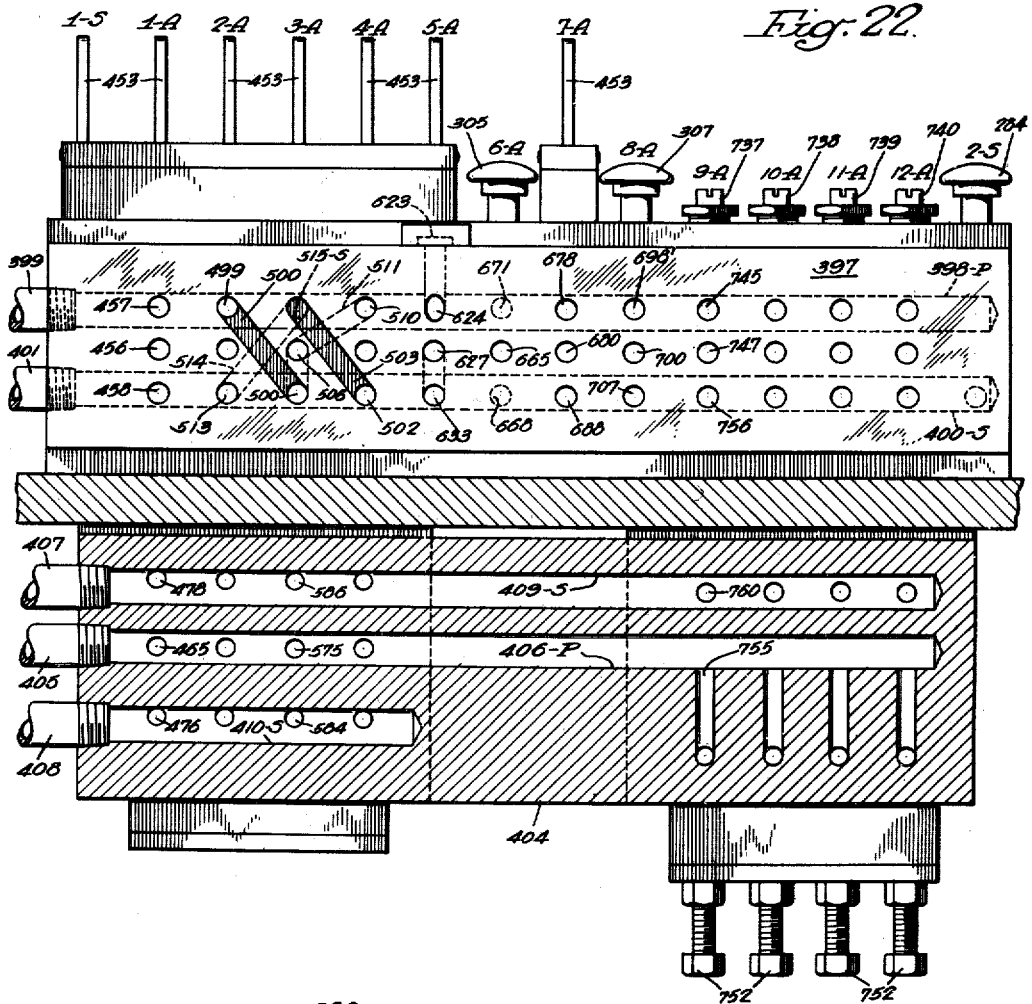
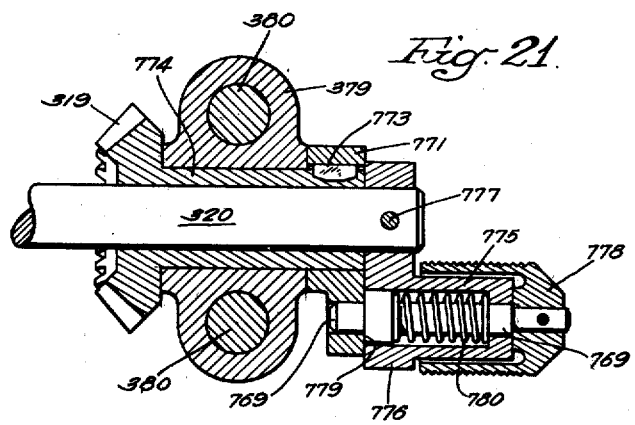
Inventor:
Gilbert V. Anderson
by his Attorneys
Howson & Howson May 3, 1938.　　　G. V. ANDERSON　　　2,116,376
HYDRAULIC CONTROL MECHANISM
Filed Jan. 17, 1936　　　27 Sheets-Sheet 17
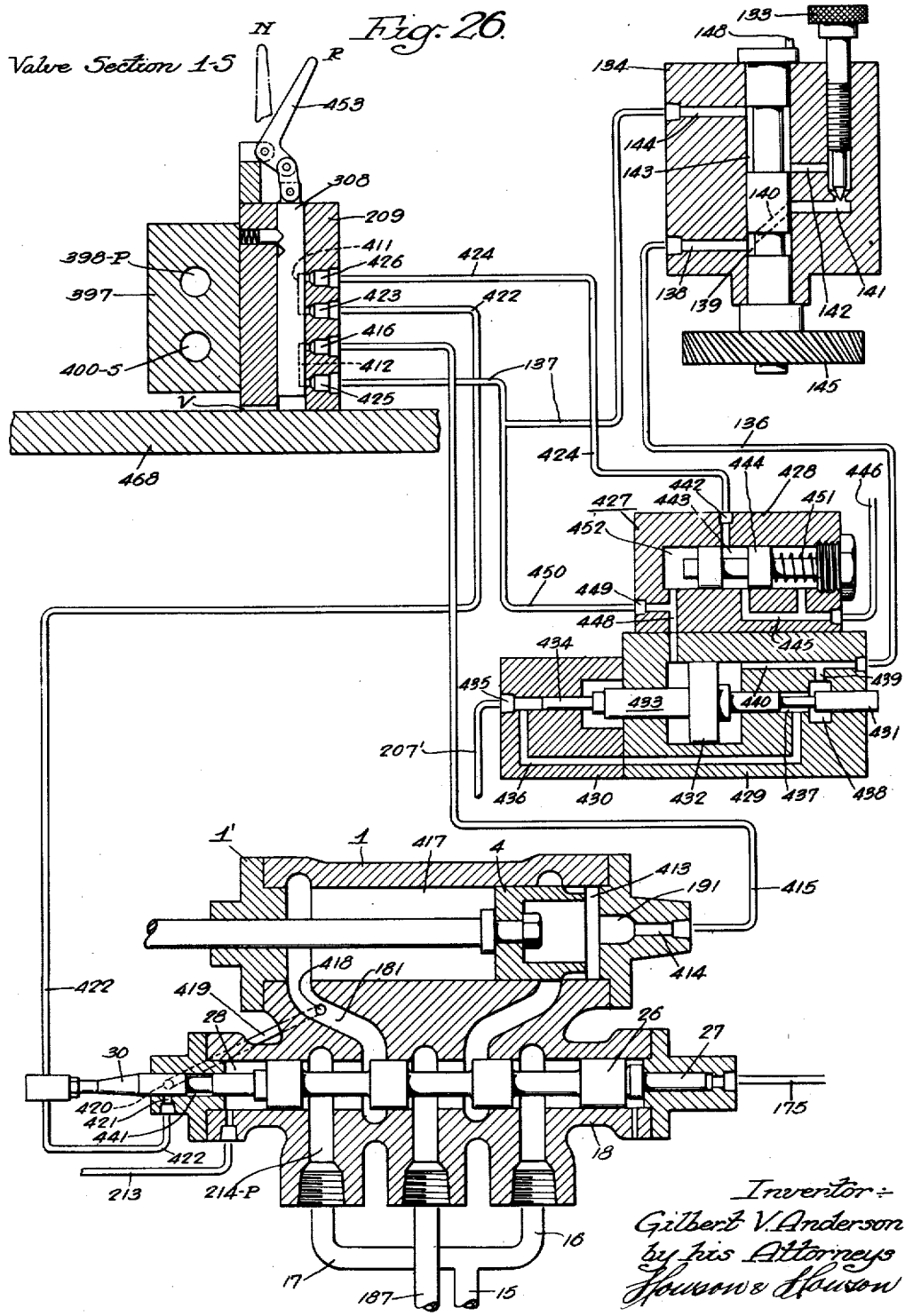

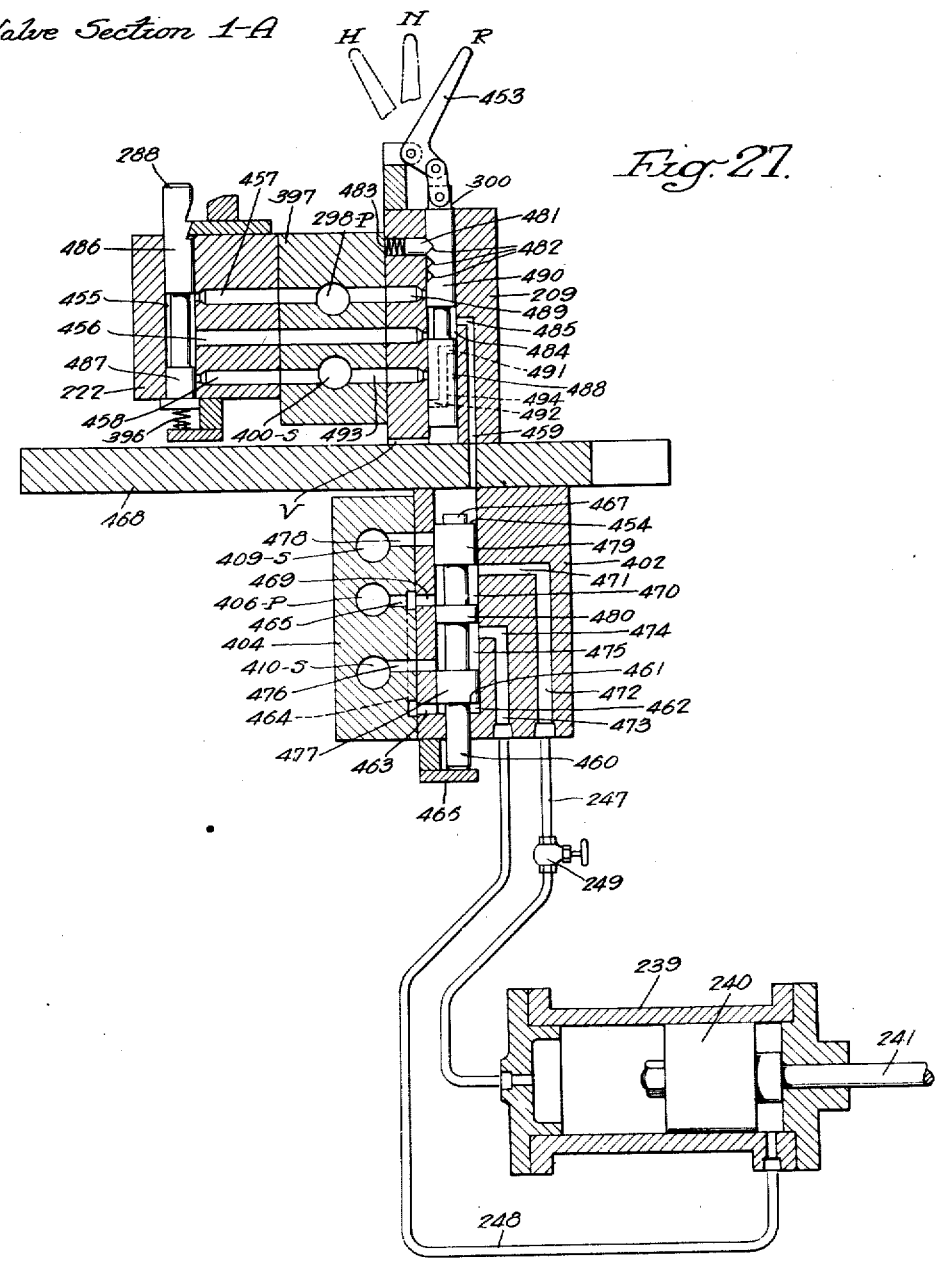

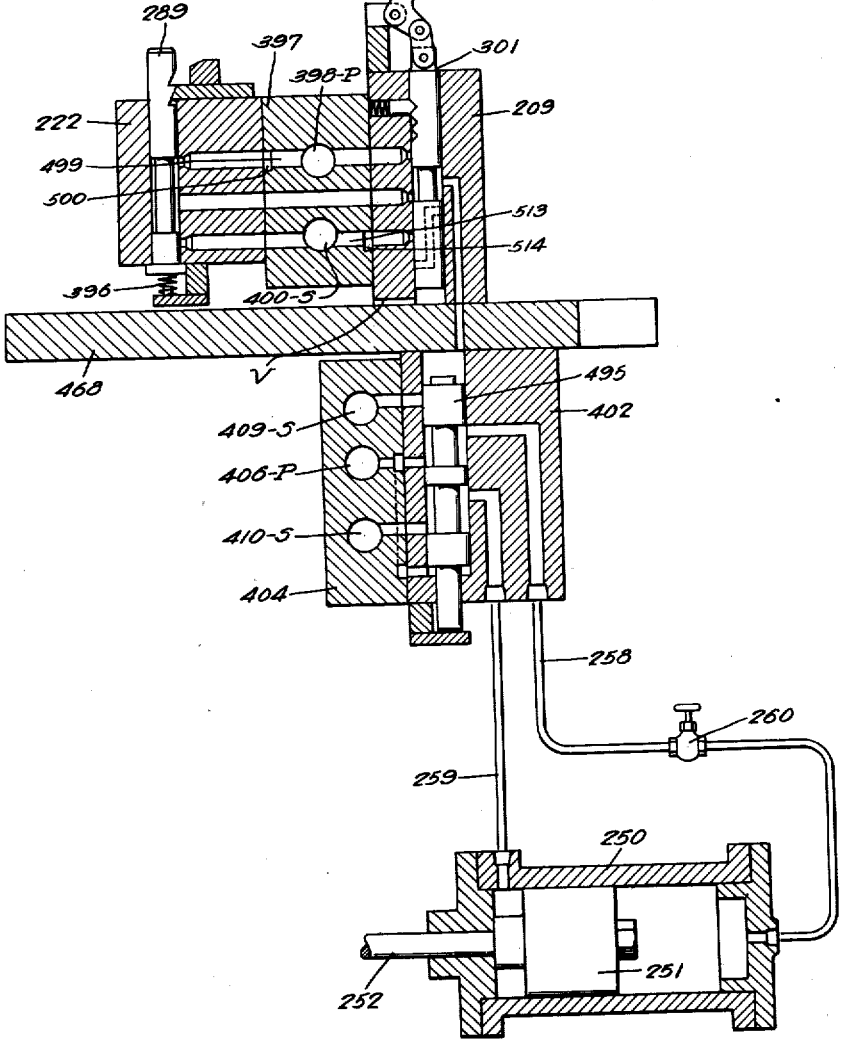

May 3, 1938.  G. V. ANDERSON  2,116,376
HYDRAULIC CONTROL MECHANISM
Filed Jan. 17, 1936  27 Sheets-Sheet 20

Inventor:-
Gilbert V. Anderson
by his Attorneys
Howson & Howson

May 3, 1938.　　　G. V. ANDERSON　　　2,116,376
HYDRAULIC CONTROL MECHANISM
Filed Jan. 17, 1936　　　27 Sheets-Sheet 21
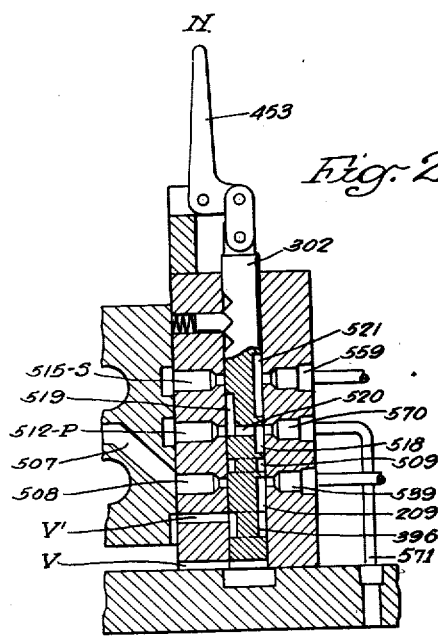
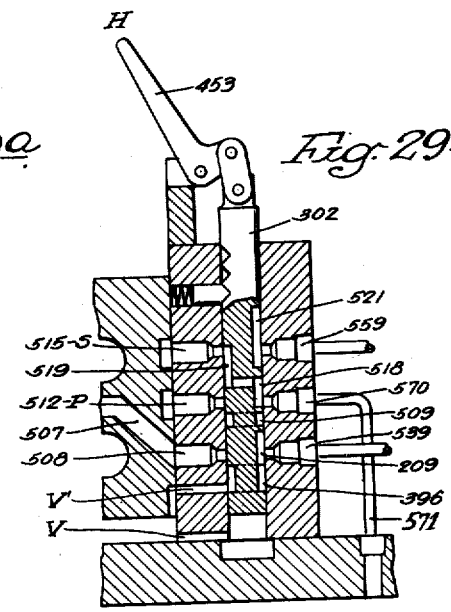
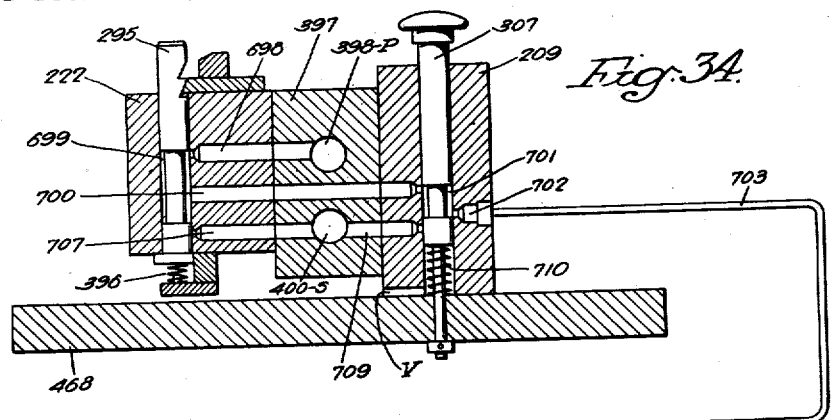
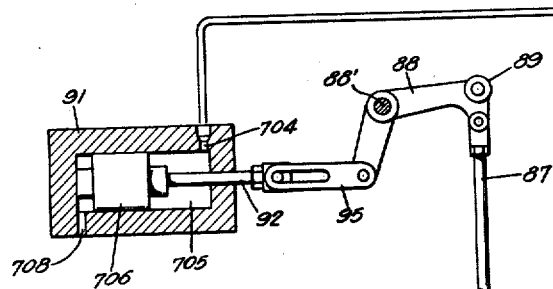
Inventor:
Gilbert V. Anderson
by his Attorneys
Howson & Howson

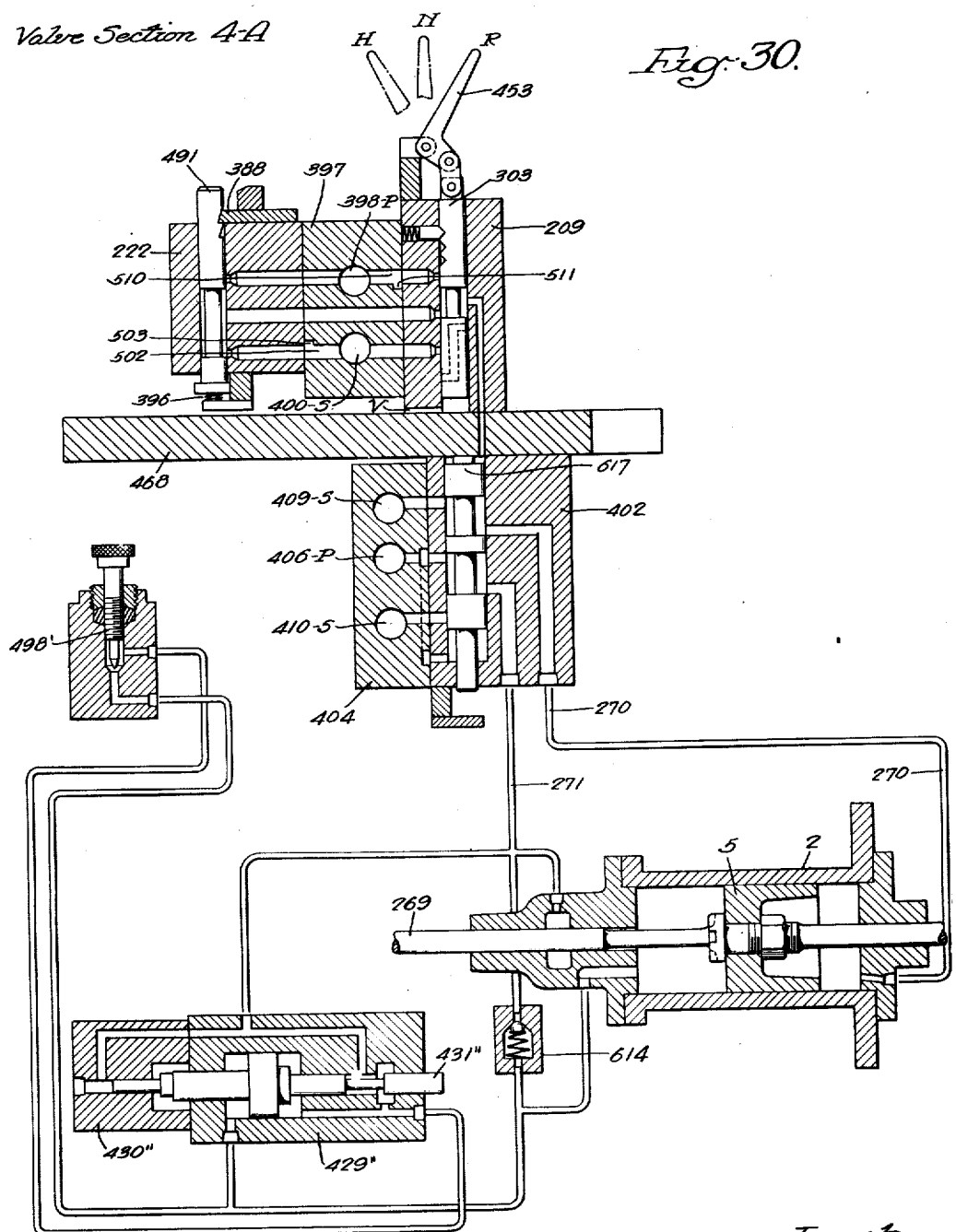

May 3, 1938. G. V. ANDERSON 2,116,376
HYDRAULIC CONTROL MECHANISM
Filed Jan. 17, 1936 27 Sheets-Sheet 23
Fig. 31.
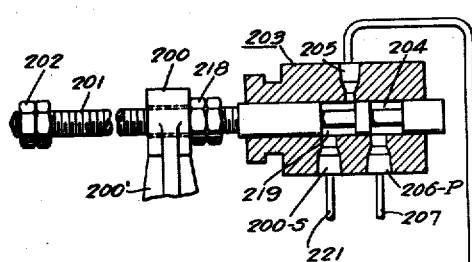
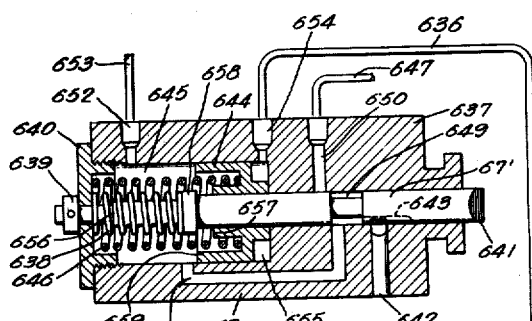
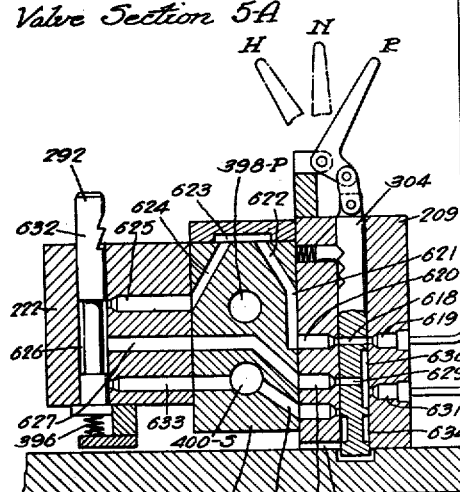
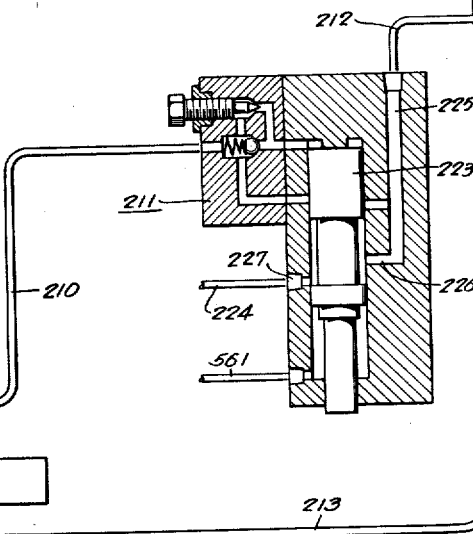
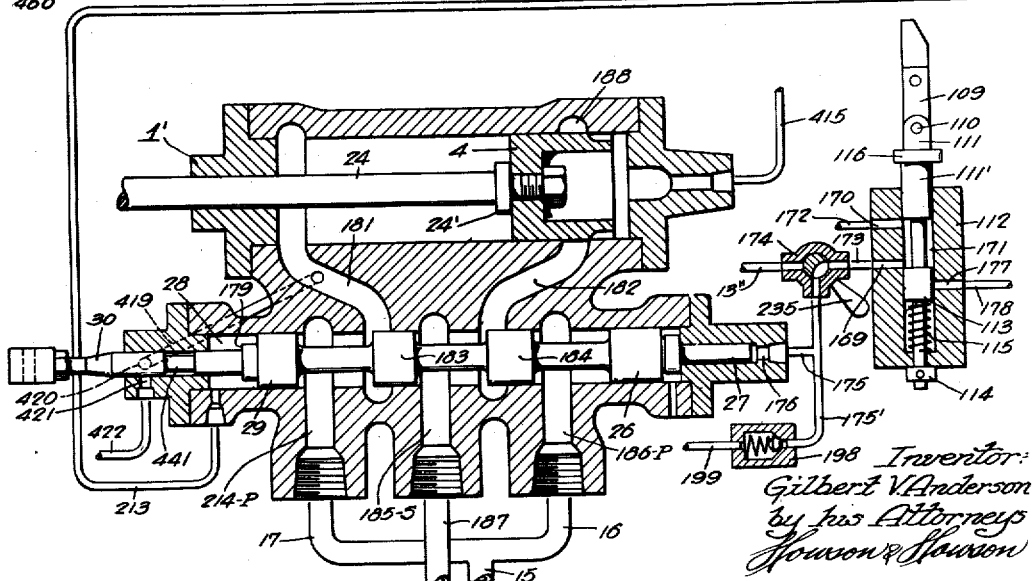
Inventor:
Gilbert V. Anderson
by his Attorneys
Howson & Howson

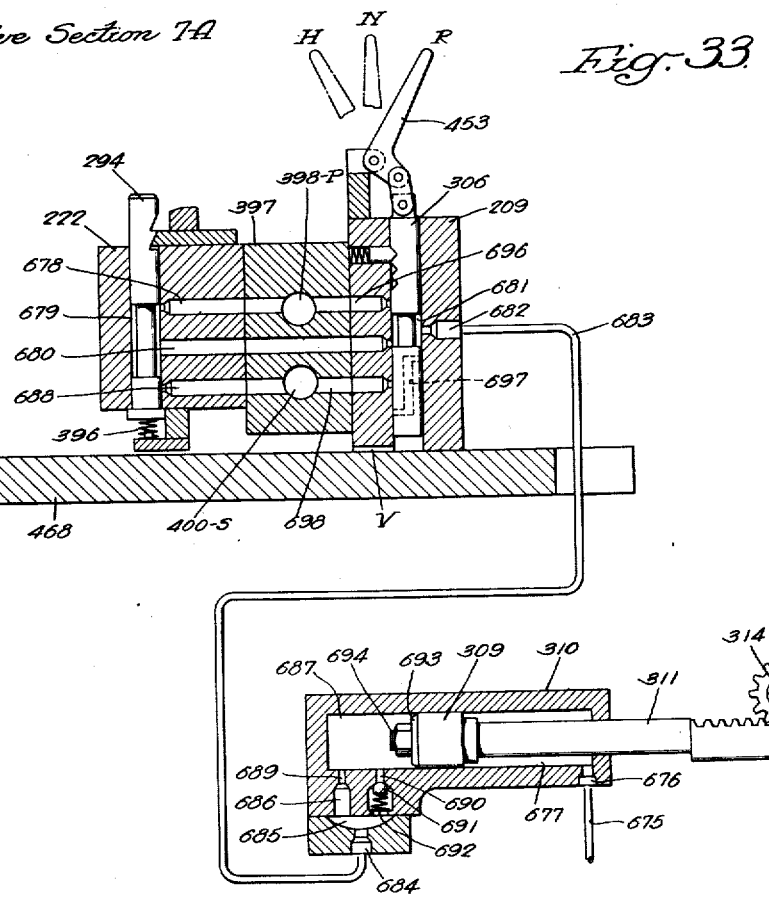
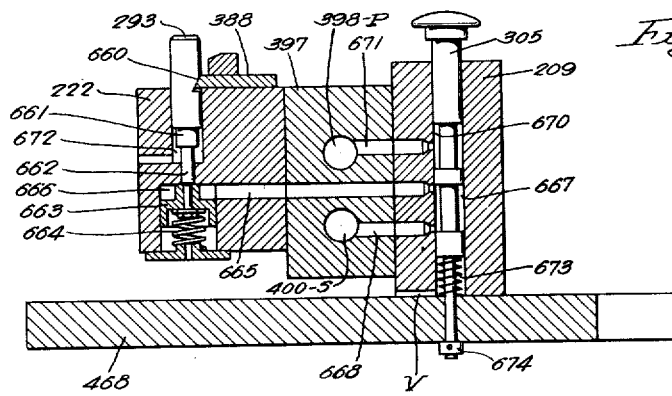

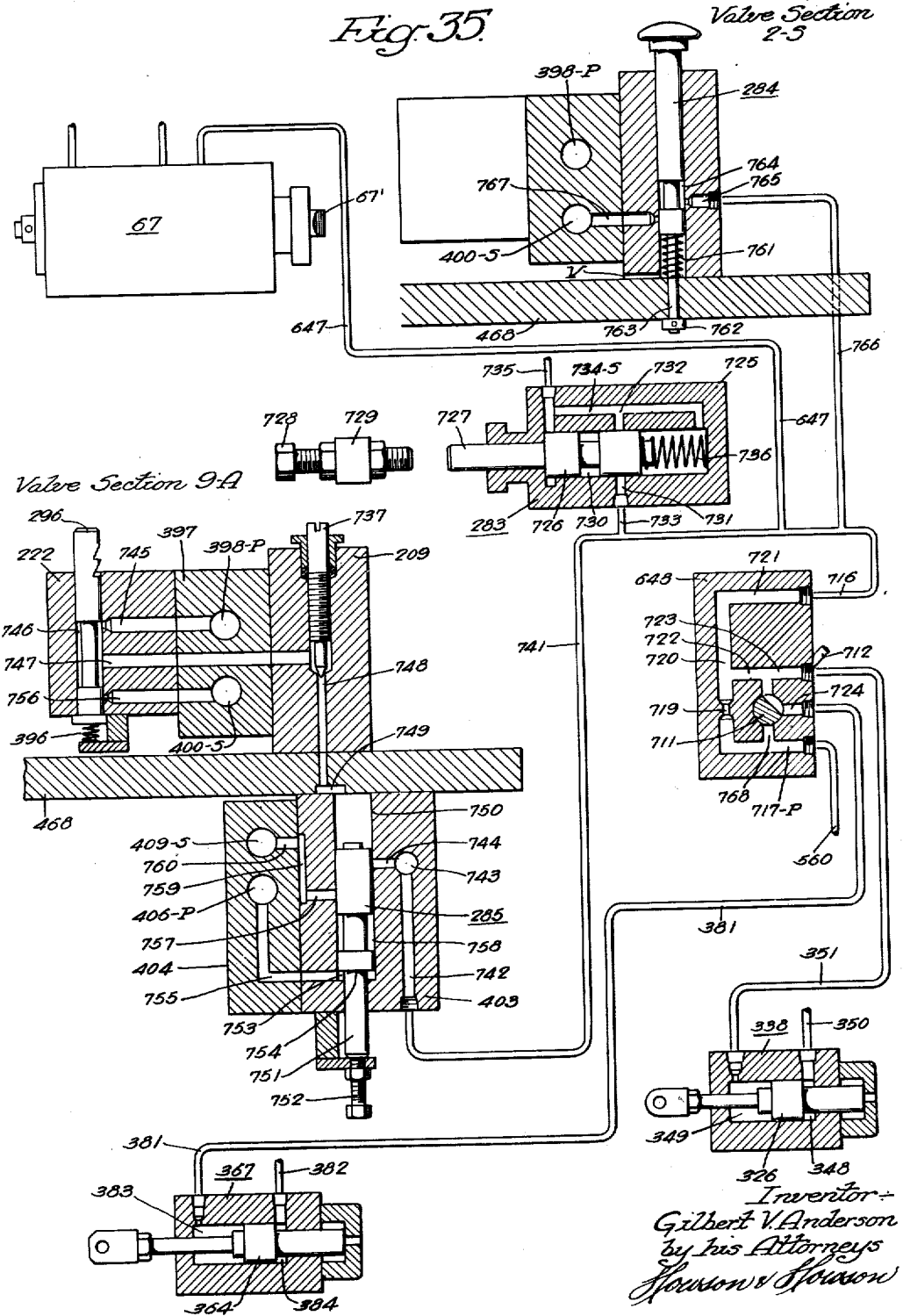

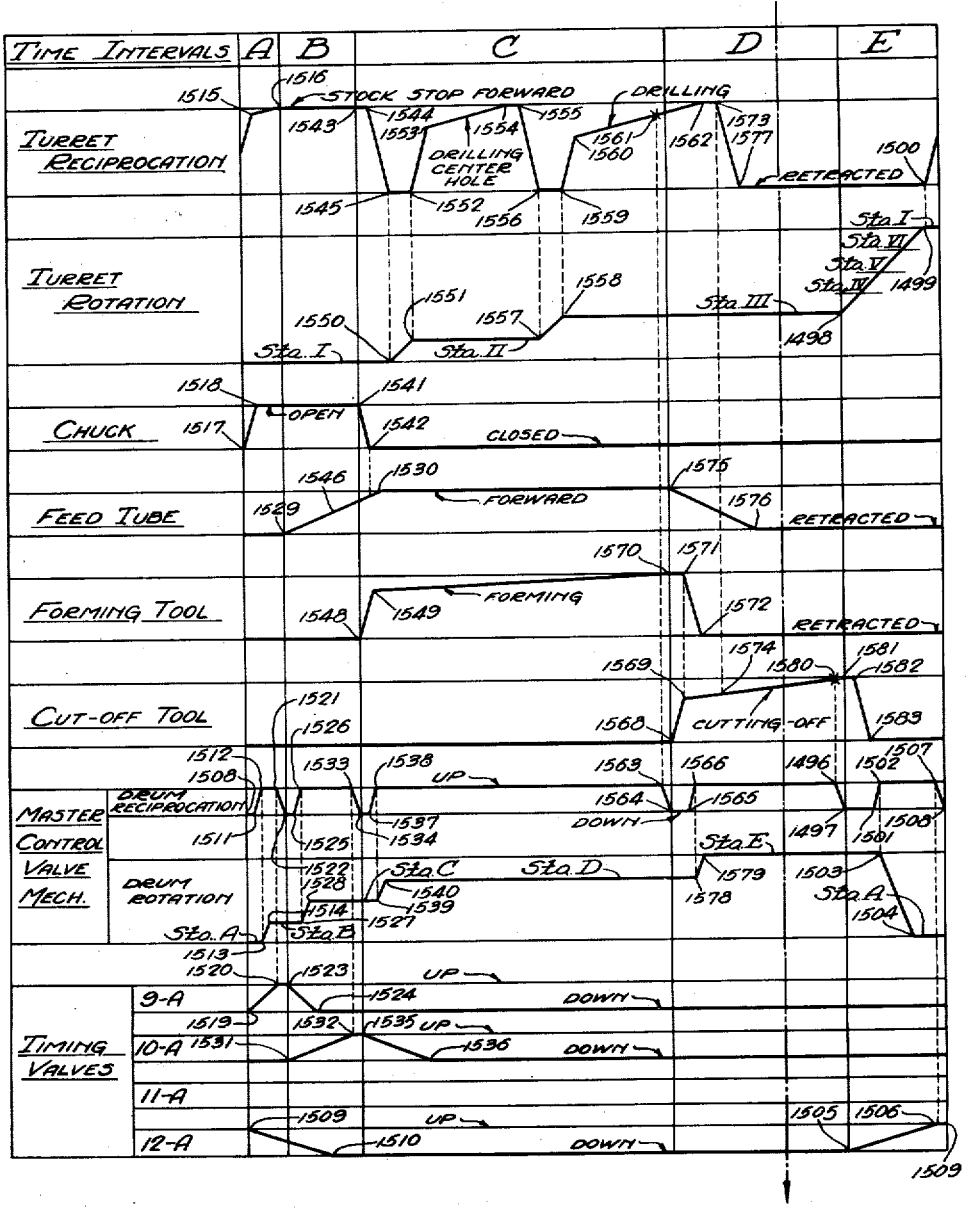

May 3, 1938.   G. V. ANDERSON   2,116,376
HYDRAULIC CONTROL MECHANISM
Filed Jan. 17, 1936   27 Sheets-Sheet 27

*Fig. 38.*

| Master Control Drum Stations | | | A | B | C | D | E |
|---|---|---|---|---|---|---|---|
| Automatic Valves Operated By The Master Control Drum | 1-A | CHUCK OPEN | O | O | | | |
| | 2-A | STOCK FEED FORWARD | | O | O | | |
| | 3-A | FORMING TOOL FORWARD | | | O | | |
| | 4-A | CUT-OFF TOOL FORWARD | | | | O | |
| | 5-A | TURRET HELD FORWARD | O | O | | | |
| | 6-A | CLEARING VALVE | | | | | |
| | 7-A | MASTER CONTROL DRUM RESET | | | | | O |
| | 8-A | TURRET ALLOWED TO ROTATE | | | | O | O |
| | Timing Valves | 9-A | O | | | | |
| | | 10-A | | O | | | |
| | | 11-A | | | | | |
| | | 12-A | | | | | O |

Inventor:
Gilbert V. Anderson
by his Attorneys
Howson & Howson

Patented May 3, 1938

2,116,376

UNITED STATES PATENT OFFICE 2,116,376

HYDRAULIC CONTROL MECHANISM

Gilbert V. Anderson, Philadelphia, Pa., assignor to William F. Fischer, Philadelphia, Pa.

Application January 17, 1936, Serial No. 59,638

39 Claims. (Cl. 29—42)

This invention relates to hydraulic control mechanisms for machine tools and is herein shown as embodied in a turret lathe.

The primary object of the invention is to provide a master control mechanism for use in machine tools for controlling all operations of the machine which is so flexible that any suitable sequence of operations may be readily and quickly obtained and that the timing of the various operations may be readily adjusted to suit any particular job so as to give a high rate of production. This control mechanism eliminates the use of cams or other mechanical control devices and enables the operator to set the tools up and to have the machine operating on a given job in a relatively short time without the expense and delay incident to the making of cams, etc., and to the designing or figuring of the proportions thereof.

Another object is to provide a machine tool in which the feed rate of each individual tool is instantly adjustable while the tool is cutting to suit that particular tool for the given speed and material of the work.

A further object is to provide a machine tool in which the non-productive motions of the tool carrier in bringing the various tools successively to the work may take place at a rapid rate so as to minimize the lost time.

A still further object is to provide a machine tool embodying a rotatable and translatable tool carrier having a retractive movement to withdraw the tool from the work, a rotary indexing movement to bring a new tool into line with the work and a forward movement to bring the tool up to the work in which, after a retractive movement, a single rapid rotary motion past one or more unused stations to the next tool may be accomplished, when the maximum number of tools is not used, before the next forward movement takes place. In existing machines it is necessary because of mechanical limitations, to provide a separate rotary indexing movement for each station of the tool carrier, whether it carries a tool or not before the next tool can be brought up to the work and in some machines a complete cycle of movements comprising a retractive movement, a rotary movement and a forward movement is necessary in order to pass each unused station of the tool carrier. It is apparent that the saving in time effected by rotating the tool carrier past the unused stations in a single rapid movement instead of being required to stop at each station is appreciable and in some cases quite considerable.

Still another object is to provide a machine tool of the nature described with hydraulically driven feeds to obtain thereby a smoother cutting action, a higher rate of production and a longer life of tools.

These and other objects and advantages hereinafter defined will become more apparent from the following description of an illustrative embodiment of the invention and from the annexed drawings, in which:

Figures 1 and 1a are front elevational views taken respectively at opposite sides of a transverse dividing line of a turret lathe embodying my invention, the two figures jointly constituting a complete elevation;

Fig. 2 is a partial elevational view from the right hand end of Fig. 1a;

Fig. 3 is a rear elevational view of the portion of the machine shown in Fig. 1a;

Figs. 4 and 4a are respectively plan views of those portions of the machine shown in Figs. 1 and 1a;

Figure 10:
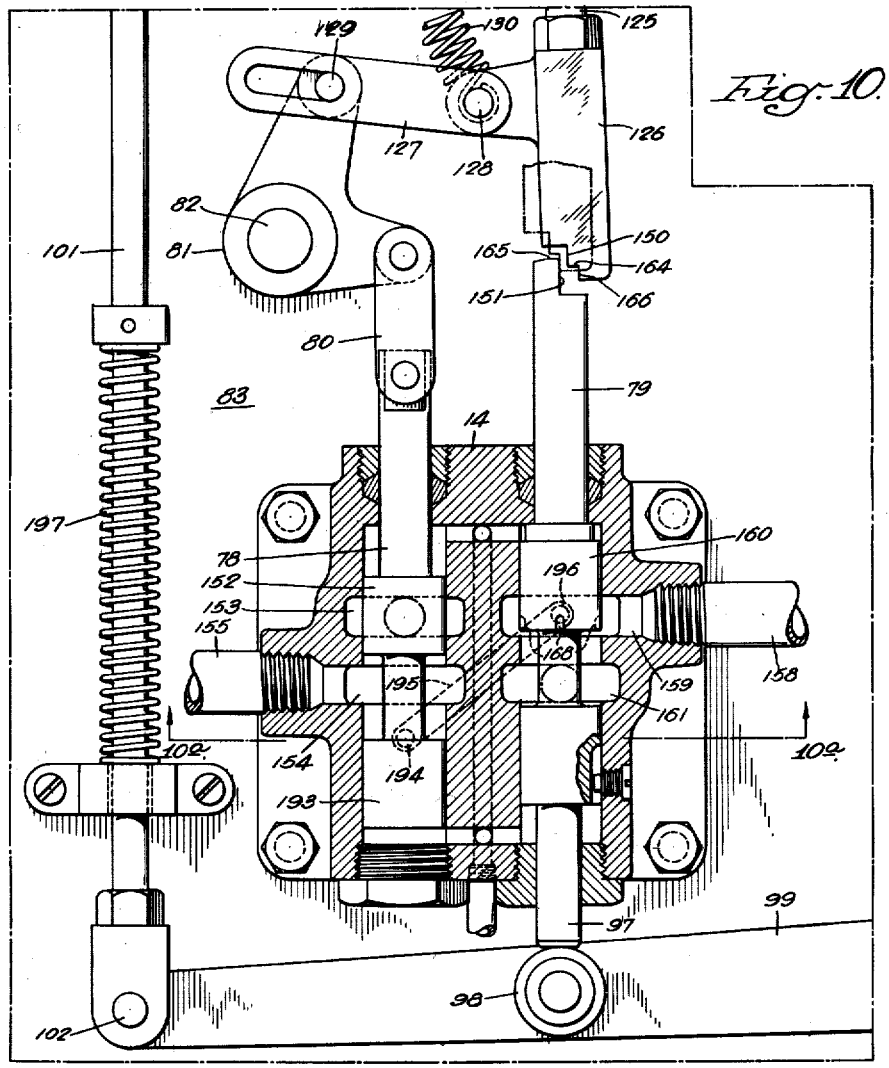
Figure 10A:
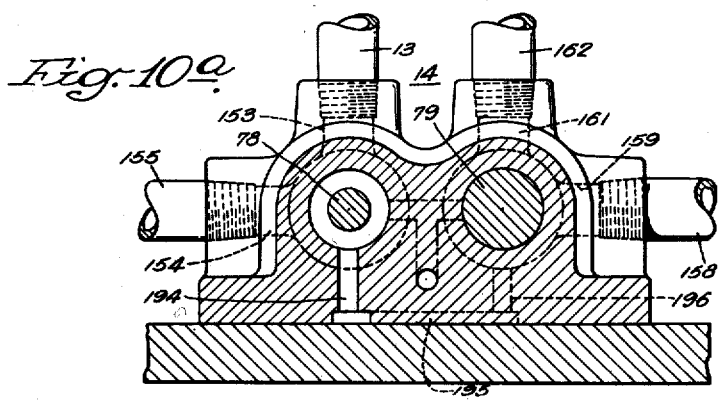
Figure 20:
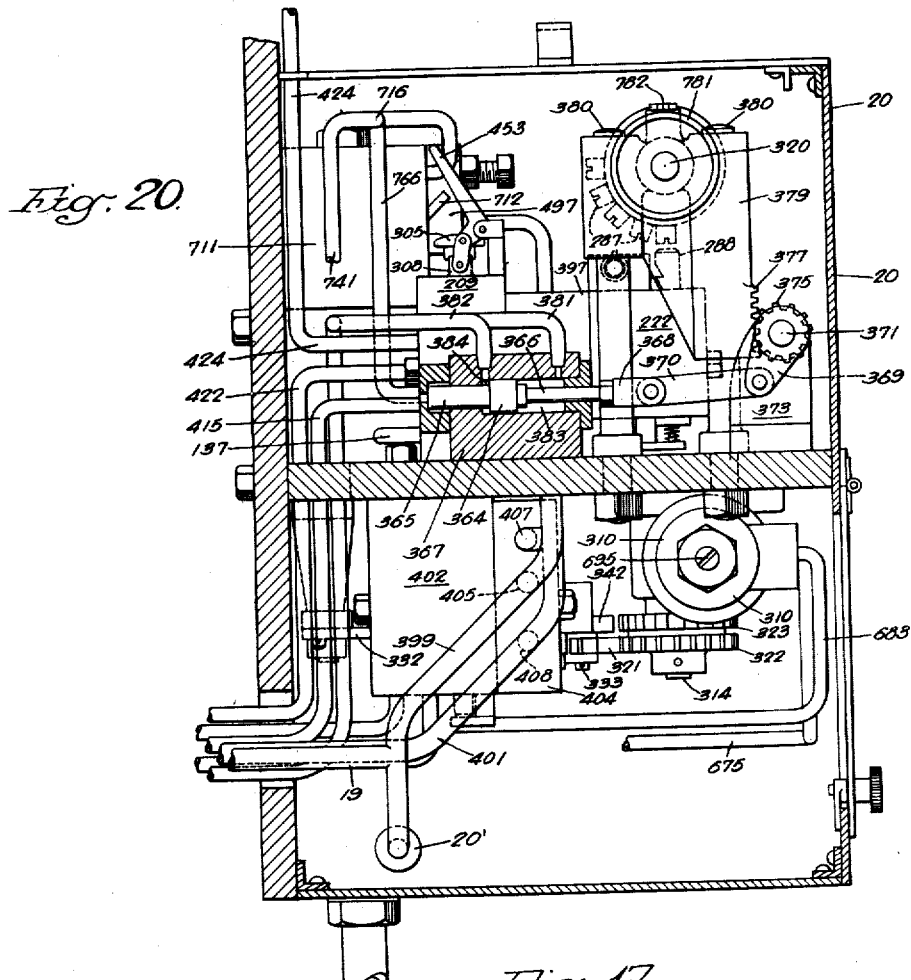
Figure 17:
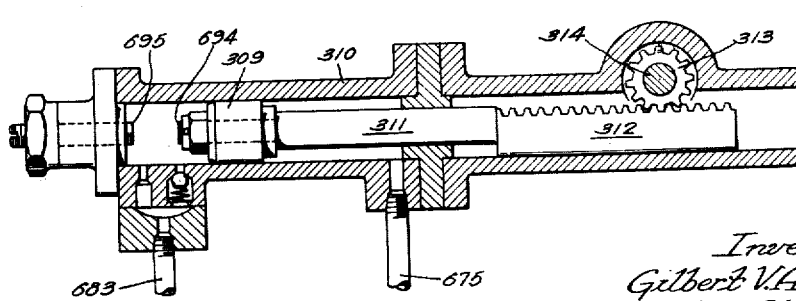
Figure 18:
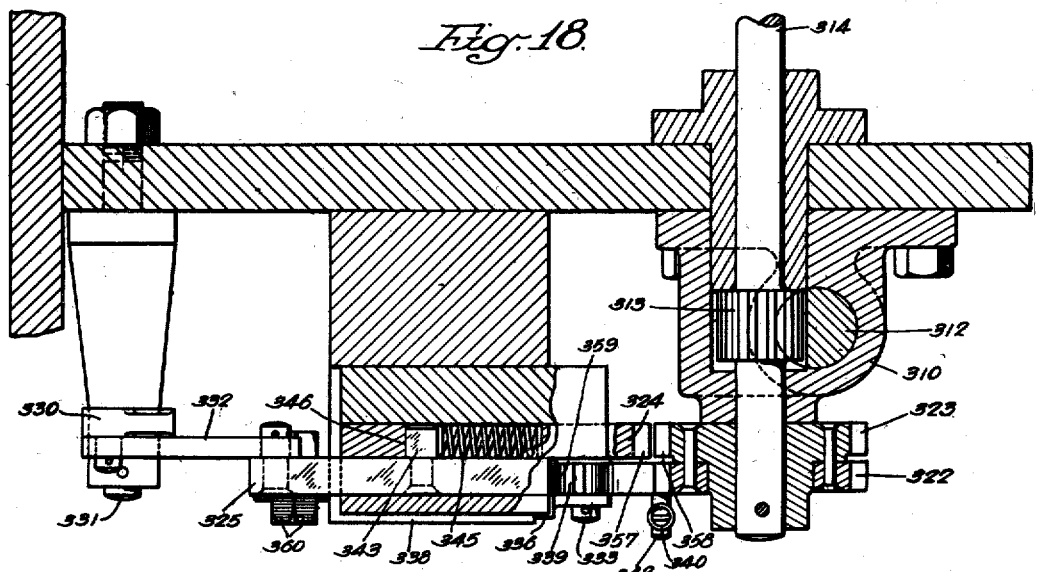
Figure 19:
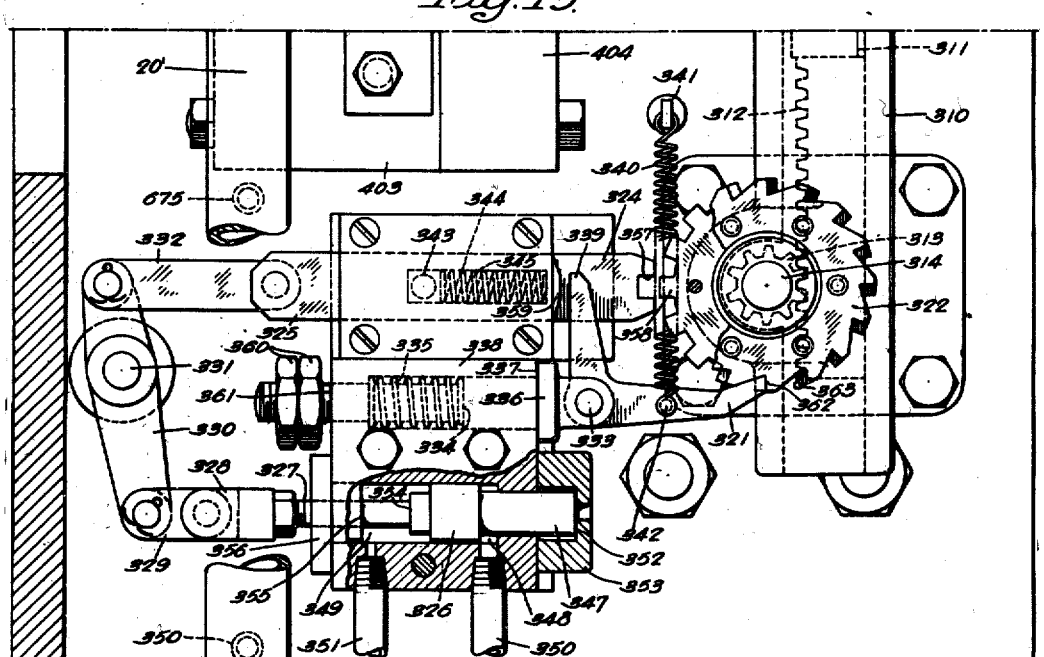

Figs. 5 and 6 are respectively sectional views on the lines 5—5 and 6—6 of Fig. 1;

Fig. 7 is a section on the line 7—7, Fig. 1a;

Fig. 8 is a section on the line 8—8, Fig. 4a;

Fig. 9 is a section on the line 9—9, Fig. 7;

Fig. 9a is a section on the line 9a—9a, Fig. 9;

Fig. 10 is a vertical sectional view of the valve unit shown at the bottom of Fig. 2;

Fig. 10a is a section on the line 10a—10a, Fig. 10;

Fig. 11 is a section on the line 11—11, Fig. 4a;

Fig. 12 is a front elevational view of the master control valve mechanism;

Fig. 13 is a plan view of the mechanism shown in Fig. 12;

Fig. 14 is a section on the line 14—14, Fig. 12;

Fig. 15 is a section on the line 15—15, Fig. 12;

Fig. 16 is a section on the line 16—16, Fig. 13;

Fig. 17 is a section on the line 17—17, Fig. 12;

Fig. 18 is a section on the line 18—18, Fig. 12;

Fig. 19 is an inverted view of the mechanism shown in Figs. 17 and 18;

Fig. 20 is a section on the line 20—20, Fig. 12;

Fig. 21 is a section on the line 21—21, Fig. 12;

Fig. 22 is a section on the line 22—22, Fig. 14;

Fig. 23 is a fragmentary plan view on the line 23—23, Fig. 12;

Fig. 24 is a section on the line 24—24, Fig. 23;

Fig. 25 is a diagrammatic fragmentary longitudinal sectional view of the machine base showing details of the fluid system;

Figs. 26, 27, 28, 29, 29a, 29b, 30, 31, 32, 33, 34 and 35 are diagrammatic sectional views showing portions of the fluid system;

Fig. 36 is a view of a piece of work used as an example in describing the operation of the machine;

Fig. 37 is a chart illustrating the cycle of operations performed by the machine in making the piece shown in Fig. 36, and Fig. 38 is a table showing the number and location of buttons on the master control drum required for making the piece shown in Fig. 36.

Referring more specifically to the drawings, the invention is disclosed as embodied in a turret lathe comprising a base B, a spindle S carried in the headstock H, mounted on the upper left end of the base B as shown in Fig. 1, and a turret or rotary tool carrier T mounted on a carriage C which is slidably supported on ways at the upper right end of base B, as shown in Fig. 1a. Spindle S carries the work W, which in this case is shown as a bar of stock J, and is driven by any suitable source of power connected by belt to pulley D which is connected to the spindle S in the usual manner by means of gearing G. Cross slides E and F are slidably mounted on a cross frame A formed in the upper part of base B between the headstock H and carriage C. The turret mounted on carriage C and the cross slides E and F carry the tools which operate on the work W and are each brought to and away from the work by hydraulic cylinders 1, 2 and 3 respectively as shown in Figs. 1a, 5, 6, 7, 9 and 9a and their respective pistons, 4, 5 and 6. The working liquid for operation of these cylinders and other hydraulic mechanisms of the machine is supplied by the pump P shown in Figs. 4, 5 and 25 which is driven by the belt 7 and pulleys 8 and 9, the latter of which is driven by the pulley D. Pump P is connected by pipe 10 with a strainer 11 within the base B and receives liquid therefrom, the lower part of base B serving as a reservoir R with the level of the liquid 12 well above the top of the strainer as shown. Liquid is discharged from the pump into the pipe 13 which leads through a hand control valve 13' to the turret rotating motor valve housing 14. A branch pipe 15 leads from pipe 13 through a hand control valve 15' to the two branches 16 and 17, connecting to the turret reciprocating valve casing 18 formed integral with the reciprocating cylinder 1. A branch pipe 19 leads from pipe 17 into the housing 20 of the master control valve mechanism to connect with manifold 20', Fig. 12, and thereby supply working liquid to the various mechanisms therein contained, as will be more fully described hereinafter. Another branch pipe 21 leads from pipe 13 to a pressure relief valve 22 within the base B. Pump P is designed to pass liquid at a volumetrically uniform rate somewhat in excess of the maximum amount required by the machine, and the relief valve 22 is set to open when the predetermined working pressure is reached and bypass into the reservoir or sump R through pipe 23 the excess supplied by the pump maintaining in the hydraulic system the predetermined working pressure.

*Turret mechanism*

The turret mechanism consists of the reciprocating carriage C actuated by the hydraulic cylinder 1 and its piston 4 which is slidably mounted therein, the rotatably mounted turret T which is rotated or indexed by the hydraulic motor M through the necessary gearing and the associated valves and operating mechanisms which will later be described in detail. Piston 4 is connected to carriage C by means of the piston rod 24 and the lug 25 which extends below from carriage C. Movements of piston 4 and of carriage C are obtained by hydraulic pressure which is controlled by the valve 26 within the valve casing 18 of reciprocating cylinder 1. Valve 26 is moved to the left, as viewed in Fig. 9, by means of the hydraulic pressure acting on the plunger 27, and to the right by hydraulic pressure within the chamber 28 at the left end of valve 26, which acts on the effective area between the enlarged portion 29 of valve 26 and the stem 30 of same. Valve stem 30 connects by means of the link 31 and lever 32, Figs. 1a and 4a, with the vertical rock shaft 33 to the upper end of which the bell crank 34 is attached. One arm 35 of this bell crank carries a stud 36 upon which a cam roll 37 is mounted. The other arm 38 carries a pin 38' which engages a slot in a lever 39 hereinafter described.

The turret T contains a plurality of holes 40 (in the machine shown there are six) in which, by any usual method of clamping, are held the necessary tools, as shown at 41, 42 and 43 for performing the operations on the work W. The turret is attached to and rotates with the shaft 44 to the opposite end of which the bevel gear 45 is attached. Bevel gear 45 is driven by the bevel pinion 46, the ratio in this case being six to one so that the turret makes ⅙ of a turn or indexes one station for each full revolution of bevel pinion 46 and brings each turret station or tool carried therein successively in line with the work W so that the forward movement of the carriage C upon which the turret is mounted will bring the tools properly into engagement therewith. Bevel pinion 46 is mounted on the end of a shaft 47 which is carried in a bearing formed in the arm 48 which extends from the carriage C. The opposite end of shaft 47 is keyed to but slidably mounted in the telescoping tube 49 which is supported by a bearing bracket 50 at the right hand end of the machine. Telescoping tube 49 is rotated by the hydraulic motor M by means of the universal coupling 51 connecting the two as shown in Fig. 4a. The drive shaft 52 of hydraulic motor M extends through same and carries at its right end a rotatable finger 53 and a spur pinion 54. Pinion 54 meshes with gear teeth cut in the periphery of a cam carrier 55, Fig. 2, the ratio in this case being also six to one, so that cam carrier 55 makes ⅙ of a revolution for each full revolution of the pinion 54. The gear teeth in cam carrier 55 mesh with an idler gear 56, which in turn meshes with a gear 57 mounted on the end of a second telescoping shaft 58 which is supported by the bearing bracket 50 and a bearing bracket 59 at the right hand end as shown more clearly in Fig. 4a. Gear 57 has the same number of teeth as are provided in the periphery of cam carrier 55. Slidably mounted within the telescoping shaft 58, but keyed to same is a shaft 60 which is carried in a bearing 61 at its left hand end, bearing 61 being part of and extending upwards from carriage C. Upon shaft 60 the two carriers 62 and 63 are mounted. Upon carrier 62 are slidably mounted the six identical cams 64 for control of the forward rapid traverse movements of the turret mechanism, and upon the carrier 63 are slidably mounted such dogs 65 as are necessary for actuation of the master control valve mechanism. These parts and their functions will be described more fully hereinafter. Carriers 62 and 63 reciprocate with the carriage C and are the same in all respects except their length.

They are both provided with six T-slots 66, Fig. 7, which are equally spaced angularly about their peripheries and so located angularly that in each stopping or working position of the turret T cams 64 and any dogs 65 that are required will line up properly with the cam roll 37 and valve spindle 67' respectively with which they coordinate. Valve 67, the master control actuating valve, from which valve spindle 67' projects, will be described in detail later.

A plate 68, Fig. 7, upon which the master control valve housing 20 is mounted, is secured to base B. This plate carries at its upper end an angle plate 69 upon which the master control actuating valve 67 and other valves and mechanisms to be described are mounted. Underneath this plate at the left end a cam 70 is attached, see Fig. 4a, the purpose of which is to withdraw the turret locking pin 71 at each backward or retractive stroke of the carriage C. Turret locking pin 71 has a tapered end which engages a tapered hole 72 in the turret T in each one of its stopping or working positions. Locking pin 71 is normally forced into engagement with one of the tapered holes 72 of the turret by a compression spring 73 and is withdrawn by the lever 74 with which it is connected by the pin 75 as shown. Lever 74 is mounted on the movable carriage C by the pivot pin 76 so that as the carriage C is moved back into its retracted position as shown, the cam roll 77 attached to the opposite end of lever 74 will ride up the stationary cam 70 and withdraw lock pin 71 to allow turret to be rotated to the next stopping position.

Control of the hydraulic motor M for the rotation of the turret T is effected by means of valves, shown in detail in Figs. 10 and 10a, within the housing 14. The left hand valve 78 controls the intake of liquid to the motor M and the right hand valve 79 controls the discharge from same. Intake valve 78 is connected by means of the link plates 80, see also Fig. 2, to the lower arm of a bell crank 81 which is attached to the end of a rock shaft 82 which extends along the back of the machine as shown in Figs. 3 and 7. Rock shaft 82 is rotatably mounted in plate 83, and bracket 84. Plate 83 is attached to the right hand end of the base B and supports the hydraulic motor M and other mechanisms as shown. Bracket 84 is attached to the rear of the machine and forms a bearing for the rock shaft 82. Near the end of rock shaft 82 which is supported by bracket 84, a lever 85 is attached. A tension spring 86 is attached to lever 85 which tends to rotate rock shaft 82 in a counterclockwise direction as viewed in Fig. 7. A link 87 connects the end of lever 85 with the upper arm of a bell crank 88 pivoted at 88' and to which a cam roll 89 is attached. Spring 86 tends to hold cam roll 89 in engagement with the cam 90 mounted at the rear of carriage C, but as herein shown cam roll 89 is held away from cam 90 by means of a small hydraulic cylinder 91 which is provided for the purpose of preventing rotation of the turret and will be more fully described hereinafter. Piston rod 92 projecting from cylinder 91 attaches to a block 93 in which a pin 94 is fitted. Pin 94 engages the slotted link plates 95 which are attached by means of pin 96 to the lower end of bell crank 88. Piston rod 92 is herein shown as pulled towards cylinder 91 to the inner end of its stroke so as to hold cam roll 89 away from cam 90. When piston rod 92 is moved to its outer position, the slots in link plates 95 give sufficient clearance on pin 94 to allow free movement of bell crank 88 as cam roll 89 follows the contour of cam 90. The lower end 97 of hydraulic motor discharge valve 79 engages a roll 98, Fig. 2, attached to a lever 99 which is pivotally mounted at 100 on plate 83. Link 101 is connected at its lower end to the outer end of lever 99 by means of pin 102 and at its upper end with the arm 103 of a bell crank 104 by means of the pin 105. Bell crank 104 is pivotally mounted on the stud 106 and its upper arm 107 connects by means of the link 108 with the swing finger 109. Swing finger 109 is pivotally mounted at 110 to the upper end of its holder 111, see Fig. 31, which is formed in the upper end of a valve spindle 111' which is slidably mounted in block 112. Valve 111' is reduced in diameter at its lower end to form a shoulder 113. At its lower end a collar 114 is attached as shown. Spring 115 normally holds valve 111' in the upper position as shown which provides a certain amount of clearance between the lower face of shoulder 116 formed in the upper part of valve 111' and the upper face of block 112. The upper end of swing finger 109 is adapted to be swung into the path of rotating finger 53 by a downward movement of motor discharge valve 79 and to be pushed downward by the outer end of the rotating finger 53 until the shoulder 116 of valve 111' contacts with block 112 to stop rotation of the hydraulic motor M, as will be more fully described hereinafter.

Cam carrier 55, Figs. 2 and 11, is adapted for attachment of six identical and equally spaced cams of which three only, 117, 117' and 117'', are used in the present instance, as only three turret tools are required for this particular job. These cams are attached by means of screws 118 as shown. Cams 117, 117' and 117'' are arranged so as to successively engage cam roll 119 mounted at the end of a cam lever 120. The purpose of these cams is to slow down gradually the rotation of motor M near the end of each rotation by closure of the rotary motor discharge valve 79 and to actuate swing finger 109 so as to finally stop rotation of same, as will be described later. Cam lever 120 forms part of a bell crank 121 which is pivotally mounted on stud 122. The other lever arm 123 is connected by means of pin 124 with a clevis and stud 125, to the lower end of which a block 126 is attached. Block 126 is adapted to engage the upper end of discharge valve 79. Slotted link plates 127 are connected to block 126 by means of the pin 128. The slots in link plates 127 engage a pin 129 carried in the end of the upper lever arm of bell crank 81. A tension spring 130 is provided which is attached at one end to post 131 and at the other end to pin 128 carried in block 126. Post 131 is situated above pin 128 so that the tension of spring 130 will hold cam roll 119 on cams mounted on cam carrier 55 or on surface 132, Fig. 2, of cam carrier 55 when same rotates to bring cams out of contact with the cam roll. Post 131 is also situated to the left of pin 128 so that a counterclockwise rotation of bell crank 81 will allow the tension of spring 130 to bring block 126 in contact with the upper end of motor discharge valve 79, as will be more fully described hereinafter.

A set of valves (six in this case) are provided for the purpose of selectively controlling the feed of the turret on its forward feeding motion after rapid traverse so as to provide a separate control of the turret feed in every one of the turret's stations. These valves 133, Fig. 4a, are grouped in a housing 134 and are equally spaced angularly about, and at the same radial distance from a central rotary valve 135. This group of valves will hereinafter be referred to as the "selector valves". A common inlet pipe 136 and a common discharge pipe 137 are connected at the side between two of the control valves 133. A sectional view of the selector valve unit is shown in Fig. 11. This section is taken through pipes 136 and 137 and one of the control valves 133. Passage 138 leads from the inlet pipe 136 to an annular groove 139 in the rotary valve 135, and from this groove a passage 140 leads upwards through rotary valve 135 to the line of the radial passages 141 leading to the separate control valves 133. From the control valves passages 142 lead to a second annular groove 143 in rotary valve 135. From annular groove 143 a passage 144 leads to the discharge pipe 137. Attached to the lower end of rotary valve 135 is a helical gear 145. This gear meshes with a companion helical gear 146 mounted on the tubular shaft 58 which is driven by gear 57, Figs. 2 and 4a. Selector valve housing 134 is supported by a bracket 147 which is secured to plate 83. The ratio of the helical gears 145 and 146 is one to one, so that the central rotary valve 135 makes one revolution to every revolution of the turret T, and as there are as many valves 133 provided as there are turret stations, six in this case, a separate control valve is brought into connection with the pipes 136 and 137 leading to and from the selector valve unit each time a turret hole 40 is brought into the working position. A small pin 148 projects from the shouldered head 149 at the top of rotary valve 135 near the periphery of same. This pin serves as an indicator to show which control valve 133 is connected at any given turret position and is useful in showing the operator which valve to turn to adjust the feed of the given tool.

*Operation of the turret mechanism*

The automatic operation of the turret mechanism in bringing the different tools successively into engagement with the work and feeding them to the end of their cutting strokes is as follows:
In the drawings, the parts are in the positions which they occupy after the last tool 43 has finished its operation and the turret is being held back to await the completion of the cut-off stroke. When the piece W has been severed from the bar J, piston rod 92, Fig. 3, is freed, as will be more fully described later, to allow spring 86, Fig. 7, to pull cam roll 89 up into contact with cam 90. This causes a counterclockwise rotation of rock shaft 82 and bell crank 81 which pulls the hydraulic motor intake valve 78, Figs. 10 and 10a, into its upper position. At the same time, this counterclockwise rotation of bell crank 81 allows block 126, see enlarged view in Fig. 10, to move to the left until face 150 of block 126 contacts with face 151 of motor discharge valve 79. The upward movement of intake valve 78 causes the enlarged portion 152 of same to uncover port 153 and allow liquid under pressure to flow from pipe 13, which connects therewith, through port 153 and out port 154, through pipe 155 which connects port 154 to the intake opening 156 of the hydraulic motor M. From the discharge opening 157 of same it flows through pipe 158 to the port 159 in motor valve housing 14 to which pipe 158 connects, and as this port is uncovered by the enlarged part 160 of the motor discharge valve 79, the liquid flows to port 161, and thence through pipe 162, to which this port leads, to the sump or reservoir R in the bottom part of base B. This flow of liquid through motor M causes rapid rotation of same and of the turret T, cam carriers 55 and 62 and dog carrier 63 which are geared to the shaft 52 of motor M, as has been described. This rotation of motor shaft 52 occurs in a clockwise direction as viewed in Fig. 2, giving a counterclockwise direction of rotation to cam carrier 55 and gear 57 which rotates the cam and dog carriers 62 and 63 respectively. These directions of rotation are indicated by the arrows shown in Fig. 2.

Counterclockwise rotation of cam carrier 55 brings the low part 163 of cam 117'', Fig. 2, under cam roll 119 and lets same ride on the surface 132 of cam carrier 55. This inward movement of cam roll 119 allows cam lever 120 to swing to the left a sufficient amount to pull face 164 of block 126 above face 165 at the upper end of motor discharge valve 79, which allows block 126 to move still further to the left until face 166 of same contacts with face 151 of discharge valve 79. Block 126 is now in a position to close discharge valve 79, which it does gradually when cam carrier 55 has rotated sufficiently to cause cam roll 119 to ride up the inclined face 167 of cam 117, Fig. 2. As discharge valve 79 is pushed downwards by block 126 to close same, its lower end 97 pushes on roll 98 and causes swing finger 109 to swing into the path of the rotating finger 53, by means of the connections described above. Just before rotating finger 53 comes into contact with swing finger 109, motor discharge valve 79 has been pushed down far enough for the enlarged portion 160 of same to close port 159, but flow of liquid still continues through the small auxiliary slots 168 cut in the lower edge of the enlarged portion 160, allowing the motor to continue rotation but at such a slow rate that the end of rotating finger 53 will contact with the upper end of swing finger 109 and push it down to cause contact of shoulder 116 on holder 111 with block 112, and thereby stop rotation of motor M without noise or shock. When hydraulic motor M has been brought to rest, cam roll 119 will be in the stopping position on cam 117, which position corresponds relatively to the position of the roller 119, as shown in Fig. 2 on the cam 117''. Cam carriers 55 and 62, dog carrier 63 and turret T have now been rotated through four divisions in the directions indicated by the respective arrows on Figs. 1a and 2. This brings tool 41 in turret T into the working position, the three unused stations of turret having been passed in this one rapid rotary motion. It should be noted that the motor intake valve 78 is still open when motor shaft 52 has come to rest. This insures that the rotary parts are held in proper alignment until locked in position by the turret lock pin 71 upon the subsequent forward movement of the turret mechanism.

It will be noted in Figs. 9 and 26 that, with the turret mechanism in the retracted position, the valve 26, which controls its movements, is in its extreme right hand position. It will be noted also that, with the valve 111', Fig. 31, in its upper position, passages 169 and 170 are opened to communication with each other by means of the annular groove 171 in valve 111'. This connects pipe 172 leading from the sump pipe 162, Fig. 2, with pipe 173 leading through the three-way valve 174 to pipe 175 which leads to passage 176 at the right hand end of the plunger 27. It may thus be seen that with the valve spindle 111' in the upper position, there is no tendency for plunger 27 to move valve 26 to the left. Just before shoulder 116 of valve 111' contacts with block 112 in its downward movement at the end of the rotary movement of the turret, passage 170 will be closed and passage 177 will be opened to communication with passage 169, allowing liquid under pressure to flow from the main supply line 13 through the pipe 178 which connects with passage 177, and from thence through the passage 169, pipe 173, three-way valve 174 and pipe 175 into passage 176 to the outer end of plunger 27, causing it to force valve 26 to the left, space 28 to the left of which has been connected to the sump, as will be described later. Valve 26 moves to the left until the shoulder 179 formed near the left end on same contacts with the inner surface of cap 180, at which time ports 181 and 182 have been uncovered by the enlarged portions 183 and 184 of valve 26 to establish communication with ports 185s and 186p respectively. Attention is directed to the use of subscripts $p$ and $s$ after a reference number referring to a liquid passage leading to or from a valve. These subscripts will be used hereinafter to designate a pressure connection leading from the pump or an exhaust connection leading to the sump R respectively. Port 186p is connected with pipe 16 which extends from the pump P and carries liquid under pressure, and port 185s is connected with pipe 187, which leads to the sump. With the connections thus established liquid under pressure will flow from pipe 16 through ports 186p, 182 and 188, passage 189, Fig. 9a, past ball check valve 190, and through passage 191 to the right end of cylinder 1, causing piston 4 and carriage C to which it is attached and which carries the turret mechanism, to move to the left. Leftward movement of piston 4 forces liquid through passages 181, 185s and pipe 187 to the sump. This flow of liquid causes a rapid forward movement of the turret mechanism, but the leftward movement of valve 26 causes a clockwise rotation of bell crank 34 as viewed in Fig. 4a, which swings cam roll 37 into the path of one of the cams 64 which has been brought into line with this cam roll. When this cam 64, which is carried forward by its carrier 62 during the forward movement of the turret mechanism, comes in contact with cam roll 37, it causes a counterclockwise rotation of bell crank 34, which causes a movement of valve 26, Fig. 9, to the right in opposition to the force exerted on valve 26 by the fluid pressure on plunger 27. This movement of valve 26 to the right closes ports 181 and 182, the shape of cams 64 being such as to gradually reduce the high velocity of the forward motion of the turret mechanism to the comparatively slow velocity of a feed rate without noise or shock. Although the ports are thus entirely closed, the forward movement of the turret mechanism continues at a controlled feed rate, in a manner to be described later. When the cam roll 37 is on the straight part 64' of the cam 64, the valve 26 is shifted to its central position with the central enlarged portions 183 and 184 overlapping the ports 181 and 182 respectively with an equal amount at each side. Cams 64 are separately adjustable longitudinally of their carrier 62 to suit the tools in the corresponding positions of the turret T so that the rapid forward movement of the turret will not be reduced to the feeding rate until the tool is in close proximity to the work so that they may engage the work with as little loss of time as possible.

When the carriage and the turret mechanism move toward the spindle S on the forward stroke, cam 90, Fig. 3, resets the rotary motor control valves 78 and 79 to be ready for the succeeding rotary or indexing motion of the turret. When cam roll 89 is on the high part 192 of said cam, the rotary motor intake valve 78 is fully open. When the carriage C has moved toward the spindle to bring cam roll 89 to position $g$, this valve has been pushed down to the point where the enlarged part 152 of same closes port 153 to communication with port 154, shutting off pressure to hydraulic motor M but locking it against backward rotation because of the incompressibility of the liquid in the pipes and passages between said valve and motor. This holds the turret in proper alignment till a point $g'$ is reached at which turret lock pin 71 has fully engaged the corresponding hole 72 in turret T to lock same in one of its working positions. When carriage C has moved forward to bring cam roll 89 to position $h$, valve 78 has been moved down to a point where the enlarged portion 193 of valve 78 starts to uncover passage 194 which connects by means of passages 195 and 196 with port 159 which connects with pipe 158 leading to the discharge opening 157 of hydraulic motor M. Uncovering of passage 194 by the enlarged portion 193 of valve 78 establishes communication of passage 194 with port 154 which connects with pipe 155 leading to the intake opening 156 of hydraulic motor M. This establishing of communication between the two ends of hydraulic motor M equalizes the pressure at these two ends of same and thereby relieves any pressure that may exist between rotating finger 53 and swing finger 109, see Fig. 2, except that caused by spring 115, which is comparatively small, so that when the position $i$ of cam roll 89 on cam 90 is reached, at which point face 164 of block 126, Figs. 2 and 10, has been pushed to the right to clear face 165 at the upper end of motor discharge valve 79, spring 197, Fig. 2, can force the outer end of lever 99 upwards to move upper end of swing finger 109 clear of rotating finger 53 and push motor discharge valve 79 into its upper or open position, as shown in Fig. 10. Motor control valves 78 and 79 are now ready for the next rotation of hydraulic motor M. It should be noted that when swing finger 109 is moved clear of rotating finger 53, this will allow spring 115 to shift valve 111' into its upper position, which again establishes, by means of passage 170, a sump connection to passage 176 behind plunger 27, which will allow valve 26 to be pushed to the right. Position $j$ in Fig. 3 is the point to which cam roll 89 travels relative to cam 90 at the end of the forward movement of carriage C. The relief valve 198, Fig. 31, which connects to pipe 175 by means of pipe 175', serves the purpose of a safety valve. It is provided so that in case valve 26 should be moving to the right as viewed in Fig. 31 because of the action of one of the cams 64, Fig. 4a, on cam roll 37 at a time when valve 111' should shift from its lower position to the upper position, there would be no possibility of breakage due to the fact that during the shift of valve 111' there is a point when the passages 170 and 177 are both closed when changing communication of passage 173 from the latter to the former. If there were no means such as the safety valve 198 to provide for escape of liquid under such conditions, breakage of the parts would probably occur at just the instant when the escape of liquid were in this way cut off. The plunger 27 is of such a small diameter that with the full working pressure applied to its right hand end, the resulting force to move valve 26 to the left is only enough more than that necessary to overcome the friction of the parts to insure positive movement of valve 26 at the times when such movement is necessary in the operation of the machine. Also relief valve 198 is set so that it will pass liquid through pipe 199 to the sump at a pressure only enough greater than the working pressure to insure that it will open only under the conditions as just described, so that the forces exerted on the parts during such time when passage of the working liquid through the relief valve occurs will not be unduly great. As the carriage C nears the end of its forward movement, the head 200 of a bracket 200' mounted on carriage C which surrounds the valve spindle 201, as shown on Figs. 1a and 4a, contacts with the adjusting lock nuts 202 at the left end of the valve spindle 201 which is slidably mounted within the body 203 of the turret reversing valve. A sectional plan view of this valve is shown in the diagrammatic view of Fig. 31, and the other valves with which it is connected. The axial position of the adjusting lock nuts 202 on valve spindle 201 is such that when the carriage C has moved to the end of its forward movement as determined by contact of shoulder 24', Fig. 9, of piston rod 24 with the inner surface of cylinder head 1', valve spindle 201, Fig. 31, will have moved to the left sufficiently for the annular groove 204 to establish communication between the passages 205 and 206p. Passage 206p connects with pipe 207 which leads to the pressure manifold 20', Fig. 12. This movement of valve spindle 201 allows liquid under pressure to flow through pipe 207, passage 206p, annular groove 204, passage 205, pipe 208, through passages in the master control valve unit indicated at 209, Fig. 31, which are normally open, pipe 210, through the turret reversing timing valve 211 which will be described hereinafter, pipe 212 and pipe 213 to the space 28, Fig. 9, at the left of reciprocating valve 26 to move it to the right. Movement of the valve 26 to the right moves cam roll 37, Fig. 4a, away from cam 64 and causes the central enlarged portions 183 and 184 of valve 26 to uncover ports 181 and 182 to communication with ports 214p and 185s respectively, which allows liquid under pressure to flow from pipe 17 through ports 214p and 181 to the left end of cylinder 1 forcing piston 4 rapidly to the right, which in turn forces liquid from the right end of cylinder 1 through ports 182 and 185s to pipe 187 which leads to the sump. This movement of piston 4 to the right causes a rapid retractive movement of carriage C and the turret mechanism. When the right hand edge 215 of piston 4, Fig. 9, comes flush with the right hand edge 216 of port 188, near the end of the movement to the right of piston 4, the escape of liquid through port 188 is restricted to that which flows through the four slots 217 cut in the back edge of piston 4. This restriction builds up a pressure in cylinder 1 to the right of piston 4 considerably greater than that existing in pipe 17 and passages leading to the left of same and causes a rapid retardation of the retractive movement of carriage C and the turret mechanism. The depth of slots 217 is gradually reduced to maintain the higher retarding pressure to the right of piston 4 as the velocity of same is reduced until they are closed entirely at the end of the retractive stroke, at which time piston 4 occupies the position shown in Fig. 9. This gradual reduction of the cross sectional area of slots 217 causes the parts to come to rest at the end of the retractive stroke without noise or shock. When the carriage C has been brought to the end of its retractive stroke, head 200 of bracket 200', Figs. 4a and 31, will have shifted turret reversing valve spindle 201 to the right, by contact with the adjusting lock nuts 218 to the position shown in Fig. 31, which causes annular groove 219 to establish a communication between passage 220s which is connected through pipe 221 to the sump, and passage 205 leading to pipe 208. Pipe 208 leads through passages of the master control valve section 222 to pipe 210 as already stated which leads to the turret reversing timing valve 211. This sump connection to the turret reversing timing valve allows the valve spindle 223 of same to move upwardly as shown in Fig. 31 to the normal or inoperative position in a manner hereinafter described. With valve spindle 223 in the position shown in Fig. 31, pipes 213 and 212 leading from space 28 at the left of turret reciprocating valve 26 are connected to pipe 224, which leads to the sump, by means of the passages 225, 226 and 227. This establishing of a sump connection to space 28 at the left of turret reciprocating valve 26 will allow same to move to the left under the force of the plunger 27 when it is subsequently acted upon by hydraulic pressure as has been described. When carriage C is retracted to the position as shown in the drawings, cam roll 89, Fig. 3, in following the contour of cam 90, if not prevented from doing so by the action of the small hydraulic cylinder 91, the purpose of which has already been stated, will have moved upwards to the upper part 192 of cam 90 to open the motor intake valve 78, Fig. 10, the point of opening being indicated in Fig. 3, by position g. Opening of valve 78 will start another cycle of movement of the turret mechanism as just described to index turret T and move it forward to present a new tool to the work. The turret mechanism would, if allowed to continue, automatically bring each tool successively to the work, feed it to the end of its forward stroke, withdraw turret, index same to bring the next tool in line to bring it to the work, etc., and continue these motions indefinitely. In the automatic operation of the machine as a whole, however, these motions of the turret mechanism are arrested at different points, as will be more fully brought out in the subsequent description.

A turret control lever 228, Figs. 1a, 4a, 7 and 8 is provided for hand control of the reciprocating movement of the carriage C and turret mechanism for use in setting up and adjusting the turret tools, taking trial cuts and adjusting the cams 64 and dogs 65 on their respective carriers. Turret control lever 228 is attached to the upper end of a shaft 229 which is supported in a bearing bracket 230. Bearing bracket 230 is mounted on angle plate 69 to the right of the bell crank 34. An eccentric 231 is attached near the lower end of shaft 229 and carries the enlarged end of the lever 39 which is slotted at its left end to engage the pin 38' which is attached to bell crank 34. The lower end 232 of shaft 229 is enlarged and a friction plug 233 is forced against this enlarged end by a stiff spring 234 so as to hold hand lever 228 in any desired position. Hand lever 228 has two extreme positions, in one of which it is shown in Fig. 4a. When hand lever is in the position shown, bell crank 34 is free to oscillate the normal amount necessary for the automatic operation of the turret mechanism. When shifted to the right in Fig. 4a to the other extreme position, pin 38' will have been drawn to the right far enough to pull valve 26 to its extreme right hand position, as shown in Figs. 9 and 31 by means of the mechanical connections which have been described. The position in which the lever is shown in Fig. 4a is the normal position of hand lever 228 when the machine is in automatic operation. The other position of the lever is the normal position when making adjustments and setting up the tools, etc. The three-way valve 174 shown in Figs. 2 and 31 is provided for use in connection with the hand lever 228. When it is desired to use hand lever 228 in moving the turret toward or away from the spindle by hand, valve lever 235 is turned to establish communication through the valve 174 between pipes 13" and 175, (see Fig. 31), thereby transmitting the pressure from the main pressure pipe 13 to the passage 176 to the right of plunger 27 and exerting a force on the latter tending to move valve 26 to the left. If hand lever 228 is now swung to the left past the midposition, valve 26 will correspondingly move to the left past its midposition and cause the turret to move toward the spindle. This forward movement may be made as fast or slow as desired and may be terminated at any point by proper manipulation of hand lever 228. Retractive movements of the turret may also be obtained and controlled by a corresponding rearward manipulation of hand lever 228. A lug 236, see Figs. 7 and 8, is formed below the hub 237 of lever 228 which engages an opening 238 provided at the top of bearing bracket 230. Opening 238 is of such angular width as to limit the movement of lever 228 between the extreme left and right positions.

Chuck operating mechanism

The chuck operating mechanism shown in Figs. 1 and 4 consists of the hydraulic cylinder 239 with its piston 240, Fig. 27, which is connected by means of the piston rod 241 and links 242 with the lever 243 pivoted at 244. Hydraulic cylinder 239 is mounted on the under side of bracket 245 which is bolted to the base B as shown. Lever 243 is forked at its upper end and engages the shiftable cone 246 which is slidably mounted at the rear of spindle S. This cone operates the usual type of collet chuck which is well understood by those skilled in the art, and no further description is deemed necessary. Flow of liquid to cylinder 239 for operation of the chuck mechanism takes place through the connecting pipes 247 and 248. The flow of liquid in these pipes is controlled by the valve mechanism illustrated in Fig. 27 which will be more fully described later. Valve 249, Fig. 1, is provided for controlling the velocity of movement of the parts comprising this mechanism.

Stock feeding mechanism

The stock feeding mechanism, also shown in Figs. 1, 4 and 28, consists of the hydraulic cylinder 250 with its piston 251, Fig. 28, which is connected by means of the piston rod 252 and links 253 to the lever 254. Cylinder 250 is mounted above bracket 245 and the lever 254 is pivoted at the bosses 255 formed in the end of this bracket as shown. The upper end of lever 254 is forked and engages the flanged hub 256 of the stock feeding tube 257 as shown. Stock feeding tube 257 is slidably mounted within the rear end of the hollow spindle S. The inner end of stock feeding tube 257 carries a set of feeding fingers (not shown) which are sprung over the stock J and feed the stock by frictional engagement with same, as will be well understood by those skilled in the art. Flow of liquid to cylinder 250 for operation of the feed tube mechanism takes place through the connecting pipes 258 and 259. The flow of liquid in these pipes is controlled by the valve mechanism illustrated in Fig. 28 which will be more fully described hereinafter. Valve 260, Fig. 1, is provided for controlling the velocity of movement of the feed tube.

Cut-off tool slide mechanism

The cut-off tool slide mechanism is shown in Figs. 1, 4, 5 and 6. The cut-off tool slide E is reciprocated by means of the rod 261 which is pivotally attached to same at 262. Rod 261 is adjustably connected by means of the lock nuts 263 to the swivel pin 264 in the upper end of lever 265. Lever 265 is pivotally mounted on shaft 266 carried in bracket 267 which is bolted to the base B. Lever 265 connects, by means of the links 268 and piston rod 269, with piston 5 which imparts the required motions to the cut-off tool slide E. Flow of liquid to cylinder 2 for operation of piston 5 takes place through the connecting pipes 270 and 271. Control of the liquid flow in these pipes is effected by means of valve mechanisms shown in Fig. 30, to be described subsequently. Piston rod 269 is extended through the front of the base B and is threaded and carries lock nuts 272 for adjusting the extent of the inner movement of the cut-off tool slide E.

Forming tool slide mechanism

Forming tool slide mechanism is shown in Figs. 1, 4, 5 and 6. The forming tool slide F is reciprocated by means of the rod 273 which is pivotally attached to same at 274. Rod 273 is adjustably connected, by means of the lock nuts 275 to the swivel pin 276 in the upper end of lever 277. Lever 277 is pivotally mounted on shaft 266 at the side of lever 265. Lever 277 connects, by means of the links 278 and piston rod 279 with the piston 6 which imparts the required motions to the forming tool slide F. Flow of liquid to cylinder 3 for operation of piston 6 takes place through the connecting pipes 280 and 281. Flow of liquid through these pipes is controlled by valve mechanisms shown in Fig. 29 which will also be subsequently described. Piston rod 279 is extended to the left in Figs. 5 and 6 and is adapted to contact with the adjusting screw 282 for adjusting the extent of the inner movement of the forming tool slide F.

Master control mechanism

The master control valve mechanism shown in Figs. 12 to 24, inclusive, and represented diagrammatically in Figs. 26 to 36, inclusive, controls all operations of the machine and in turn is actuated by the following valves: (see Fig. 35) the master control actuating valve 67, (see also Figs. 4a and 31), and the cut-off reversing valve 283, (see also Fig. 4), the hand operated indexing valve 284, (see also Fig. 13, and the timing valves 285, (Fig. 35). The manner in which this mechanism is actuated and in which it in turn controls the operation of the machine will be more fully described hereinafter.

The master control valve mechanism consists essentially of a drum 286, see Figs. 12, 13 and 14, to the periphery of which suitable screws or buttons 287 are attached so that at the proper angular positions of this drum these buttons are brought successively into line with valves 288 to 299, inclusive, projecting from the valve block 222 located below the drum, Figs. 12, 14, 23 and 24. These valves will be hereinafter referred to as the "automatic valves". A downward movement of the drum causes the buttons 287 to depress the particular valves that are desired and thereby cause the operation of the corresponding units of the machine. The automatic valves controlled by these buttons are all located within the one valve block 222. These valves control the entire machine when in automatic operation, and some of these are connected to corresponding hand-operated valves 300 to 307, inclusive, Fig. 13, so that the various operations of the machine may be controlled by hand in "setting up" the tools and taking trial cuts with same. In addition to the eight hand-operated valves 300 to 307, inclusive, two other hand-operated valves 308 and 284 are provided at the left and right hand ends respectively of the master control valve unit, for use also in setting up the tools and adjusting the machine.

The master control drum 286 is rotated by means of the piston 309, Fig. 17, within the cylinder 310. Piston 309 is attached to the piston rod 311 in which rack teeth 312 are provided in the enlarged end as shown. Rack teeth 312 engage the pinion 313 formed on shaft 314 in which at its upper end the keyway 315 is cut, see Fig. 12. This keyway engages the shouldered key 316 carried in the corresponding keyway in the hub 317 of the miter gear 318. Miter gear 318 meshes with miter gear 319 mounted upon the shaft 320 of the master control drum, and it is seen that motion of piston 309, Fig. 17, will, through action of the gearing and connections just described, cause rotation of the master control drum 286.

In the operation of the machine, the master control drum rotates one division at a time in a counterclockwise direction, as viewed in Fig. 14, to bring the successive rows of buttons into operative position. Control of the rotation of the drum in the direction stated is effected by means of an escapement mechanism shown in Figs. 18 and 19. Piston 309 is normally urged to the right, as viewed in Fig. 17, by hydraulic pressure, as will be described more fully hereinafter, giving a tendency to counterclockwise rotation of pinion 313 on shaft 314. This causes a clockwise tendency to rotation of shaft 314 when viewed in Fig. 19. With the parts in the positions shown in Fig. 19, the pawl 321 engages the ratchet teeth of wheel 322 and prevents rotation of shaft 314 to which said wheel is attached. The escapement mechanism consists, in addition to the ratchet wheel and pawl mentioned, of a lock wheel 323 integral with the ratchet wheel, a lock bar 324, Fig. 18, a pawl-releasing bar 325 and a piston 326 connected to the pawl-releasing bar 325 by means of the piston rod 327, clevis 328, link 329, lever 330 which is pivoted at 331 and the link 332. Pawl 321 is mounted on a pin 333 secured in the forked end of bar 334 which is urged to the right, as viewed in Fig. 19, by a light spring 335. This spring is not powerful enough to resist the tendency to clockwise rotation produced by piston 309 so the shoulder 336 formed on pawl-supporting bar 334 is normally forced against the face 337 of block 338. Pawl 321 forms part of a bell crank as arm 339 is made integral with it. Spring 340 is attached to post 341 and hooks into the spring pin 342 attached to pawl 321. The tension of spring 340 normally holds pawl 321 in engagement with the teeth of the ratchet wheel 322. A square head shouldered stud 343, attached to pawl-releasing bar 325, engages a slot 344 in lock bar 324. Within this slot a spring 345 is provided which normally holds the end 346 of slot 344 against stud 343 providing a yieldable connection between the lock bar 324 and the pawl-releasing bar 325. Piston 326 is integral with its rod 327 and is also integral with the reduced extension or tail piece 347 at its other end. The diameter of tail piece 347 is larger than that of piston rod 327, so that the effective area between it and the piston 326 is less than the effective area between the piston 326 and the rod 327. Working pressure is normally admitted to the cylindrical spaces 348 and 349 at opposite sides of piston 326, Fig. 19, by the pipes 350 and 351 respectively, which normally holds the piston 326 in the position shown due to the greater resulting force on the left side of piston 326. This causes the end 352 of the tail piece 347 to contact with the inner surface of the cap 353.

The operation of the escapement mechanism is as follows: Pipe 351 is connected to the sump, by valve mechanism which will be described later, allowing the pressure acting on the right hand face of piston 326 to force piston to the left, as viewed in Fig. 19, until shoulder 354 contacts with the inner face 355 of cylinder head 356. This motion of piston 326 causes the two bars 324 and 325 to move to the right. This movement of lock bar 324 will continue until the opening 357 engages the tooth 358 in lock wheel 323, at which time spring 345 will yield and allow pawl-releasing bar 325 to continue its movement to the right, as viewed in Fig. 19, and cause its right hand end 359 to engage arm 339 of pawl 321 and rotate it in a clockwise direction until pawl 321 is free of ratchet wheel. At this point, spring 335 forces the pawl-supporting bar a short distance to the right until the upper one of the pair of lock nuts 360 comes in contact with the lower face 361 of the block 338 which will hold the upper or engaging end of pawl 321 above the face 362 of the previously engaged ratchet tooth. Ratchet wheel 322 is prevented from rotating upon release of pawl by engagement of lock bar 324 with lock wheel 323. When pressure is re-established in pipe 351 leading to the chamber 349, piston 326 will be forced to the right, causing the bars 324 and 325 to move to the left. When lock bar 324 releases lock wheel 323 in this movement, lock wheel 323 will turn in a clockwise direction, due to the torque produced on shaft 314 by piston 309, causing face 363 of the next ratchet tooth to engage the upper end of pawl 321, forcing the pawl and its supporting bar 334 to the left until the shoulder 336 again comes in contact with the upper face 337 of block 338. The drum has now been rotated one division to bring a new row of buttons into alignment with their corresponding valves.

The reciprocation of the master control drum, which causes the buttons to actuate their valves, is obtained by means of the mechanism shown in Fig. 20. This reciprocating mechanism consists of a piston and cylinder, the construction and operation of which is the same as that just described in connection with the escapement mechanism. It embodies the piston 364 with its integral tailpiece 365 and rod 366 mounted within the cylinder block 367. Attached to the piston rod is the clevis 368 which is connected to the lever 369 by means of the link 370. Lever 369 is attached to the shaft 371 which extends in front of the master control valve unit, see Figs. 12, 13 and 14, and is supported in the bearings 372 and 373 at the right and left hand ends respectively. Rock shaft 371 carries two pinions 374 and 375 which are secured thereon. These pinions mesh with rack teeth 376 and 377 formed in the right hand and left hand drum carriers 378 and 379 respectively, which are slidably mounted on the posts 380. These carriers 378 and 379 embody bearings for the master control drum shaft 320 to turn in. By means of the connections just described, it may be seen that a movement of piston 364 will cause a corresponding movement of the drum 286 to or from the valve block 222. Pipes 381 and 382 leading to the spaces 383 and 384 at the right and left hand ends respectively of the piston 364 are normally connected to pressure and cause piston 364 to be held normally in the position as shown in Fig. 20. In operation, when pipe 381 is opened to the sump by valve means to be described subsequently, piston 364 will move to the right, Fig. 20, and cause drum 286 to move downwards, as viewed in Figs. 14 and 20, and when pressure is reestablished in this pipe, the drum will move upwards to its normal position as shown. When the machine is in operation, pipes 381 and 351, Fig. 19, are both controlled by the same valve, as will be more fully described later, so as to cause the mechanisms for the rotation and reciprocation of the master control drum 286 to operate in unison, but it should be noted that as pistons 326 and 365 move in unison, the drum 286 moves down toward the valve block 222, Fig. 14, to cause actuation of one or more of the master control automatic valves 288–299, inclusive, and will move up again far enough for the buttons 287 to clear any of these valves that may remain up before it rotates to the next angular position as lock wheel 323, Figs. 18 and 19, is not released for rotation until lock bar 324 is almost at the end of its retractive stroke. This inward and outward movement of drum 286 followed by a rotation of same to the next station will hereinafter be referred to as an "indexing cycle" of the master control drum.

Figure 29:
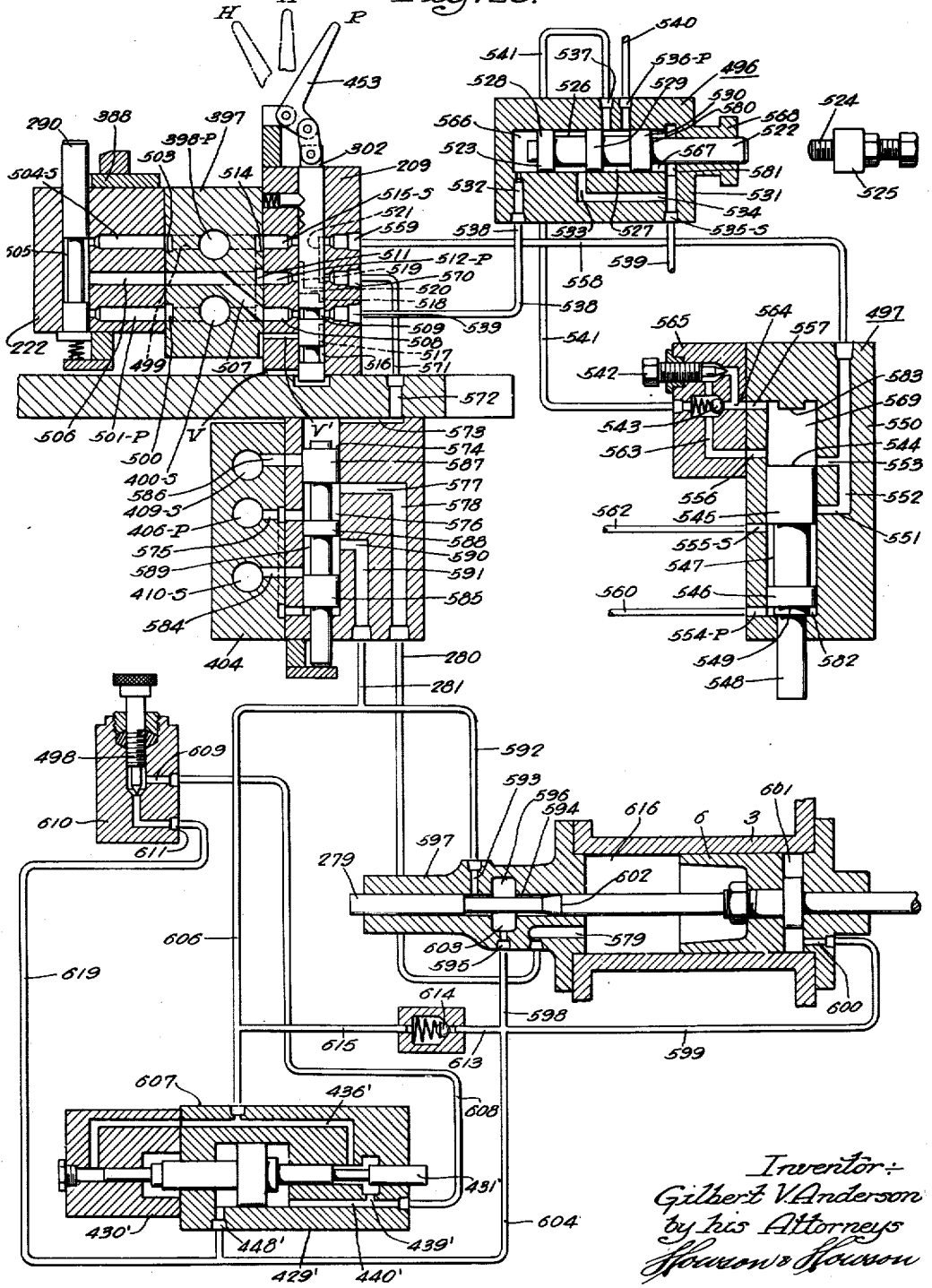

After each downward movement of the master control drum one or more of the automatic valves will have been actuated or pushed downward into valve block 222. As the master control drum is almost immediately retracted, it is necessary to lock these valves in the downward or operative position until they are later released. All of the automatic valves except the forming automatic valve 290, Fig. 29, are provided with two notches 385 and 386, see Fig. 24. The inclined face of one or the other of these notches will engage the inclined face 387 of a lock bar 388, see also Fig. 23. Lock bar 388 extends lengthwise of valve block 222 so as to engage all of the automatic valves except 290, as already noted. Rack teeth 389 are cut in both ends of lock bar 388 and engage the teeth of the two pinions 390 formed in the shaft 391 which also extends lengthwise of the valve block 222 and is supported in bearing blocks 392 at either end. This construction insures that the engaging edge 393 of lock bar 388 in moving toward or away from the automatic valves will always be parallel to the center line of this row of valves. Torsional springs 394 are attached at either end of shaft 391 so as to produce a clockwise torque on shaft 391, Fig. 24, and thereby keep lock bar 388 always in engagement with the automatic valves. When any one or more of these valves is pushed downwards into the operative position, the inclined face of lock bar 388 rides up the inclined face of notch 386 until the rounded edge 395 formed between the two notches 385 and 386 passes below the front edge 393 of lock bar 388. At this time, lock bar 388 snaps into the notch 385 of all the valves that have been pushed downward and holds them in their downward or operative position with lower face of notch 385 in contact with the under face of lock bar 388 until later released. Springs 396, Fig. 14, are provided for the automatic valves and serve to hold them in the inoperative position when not in use. Any valve that is locked down by lock bar 388 will, if there is no button on the drum in line with the given valve to hold it down, be released during a subsequent indexing cycle of the master control drum at the point when the lock bar 388 is pushed to its extreme right hand position, Fig. 24, just as the edge 395 of a valve that is being pushed down comes opposite the front edge 393 of the lock bar, for just at this point lock bar 388 is pushed far enough to the right to allow spring 396 of the given valve to push said valve upwards into its inoperative position. If several buttons are placed successively in line with the same valve, that valve will be held down for the same number of successive time intervals. It may be seen that any one or more valves of this group may be held in the operative position for one or more successive time intervals of the master control drum 286 by attaching one or more buttons in line with the valves to be actuated. A time interval is ended and a new one begun at each indexing cycle of the master control drum, and an indexing cycle of the master control drum occurs only at points in the operation of the machine at which it is desired to begin or end the operation of some part of the machine. This will be more clearly brought out in the subsequent description of the control mechanism. Valve block 209, see also Fig. 14, is bolted together with the intermediate block 397 and valve block 222 to form the master control valve assembly. Block 222 contains the automatically operated valves and block 209 contains the hand-operated valves. The intermediate block 397 provides the pressure and sump connections to both valve blocks 222 and 209. The pressure passage 398p connects by means of the pipe 399, see Figs. 12, 13 and 20, to pipe 19 which is connected to the pump P for supplying liquid under pressure, as has already been described. The sump passage 400s connects, by means of pipe 401, to the sump R.

Below the master control valve assembly are two groups of secondary valves. One is located in block 402 and the other in block 403, see Figs. 12 and 14. Both of these will be described later. A block 404 which is bolted to the two blocks 402 and 403 provides pressure and sump connections to these valve groups. Pipe 405 is a branch from pipe 399 and leads liquid under pressure to the pressure passage 406p of block 404, while pipes 407 and 408 are branches from pipe 401 and connect the sump passages 409s and 410s respectively to the sump. In the following description of the various sections of the master control valve mechanisms, those sections which are under automatic control of the master control drum 286, some of which comprise an automatically operated valve, a hand operated valve and a secondary valve, will be designated by the symbols 1A, 2A, 3A, etc., in numerical order reading from left to right, while the two remaining sections situated at the extreme left and right hand ends of the automatic section which are used only in setting up the tools and adjusting same will be designated as 1—S and 2—S respectively. All of the valves and moving parts of the machine are shown in all of the drawings in the positions which they will occupy at a certain point in the cycle in making the sample part shown in Fig. 36. This will be more clearly brought out in the subsequent description of the action of the control mechanism during the making of this piece.

A detailed description will now be given for each separate section of the master control valve mechanism.

Valve section 1—S for shutting off the turret feed

This valve section is shown in diagrammatic section in Fig. 26 including the hand operated valve 308 and its connections to the selector valve 134 and the turret reciprocating cylinder 1. Valve 308 is slidably mounted in the valve block 209. It is provided with two axial grooves 411 and 412. The right hand end 413 of the turret reciprocating cylinder 1 connects by means of the passages 191 and 414 and the pipe 415 with the passage 416 in valve block 209. The left hand end 417 of cylinder 1 connects by means of the passage 418, pipe 419, passages 420 and 421, and pipe 422 with the passage 423 in valve block 209. Pipes 137 and 424 lead from passages 425 and 426 respectively to a feed-regulating valve mechanism designated generally as 427 which acts in connection with the selector valve mechanism 134 to control the feed of the turret on its forward working or cutting stroke. This feed-regulating valve serves two main purposes, first, to enable the turret to feed much more slowly on its working stroke than would be possible with the control valves 133, Fig. 11, of the selector valve mechanism 134 alone, and second, to reduce the feed with an increase in cutting resistance so that when a tool begins to fail by dulling of the cutting edge, the length of time before serious damage would result to the machine or tool, or both, if this condition were allowed to continue, may be appreciably prolonged, so that if an operator is running several machines at the same time, this provision will give him more time to get back to a given machine to correct such trouble before damage occurs. This provision would therefore lessen the liability of damage to machine or tool that might occur because of the dulling of the cutting edge of the tool. It is also desirable when turning up against a shoulder with a square-faced tool and using this tool for facing the shoulder also to reduce the feed while doing this facing operation. This provision would automatically reduce the feed during such a facing operation, for the resistance to feeding would, during the facing operation, be considerably increased. The feed-regulating valve mechanism 427 comprises three sections, an upper section 428, a lower right hand section 429, as viewed in Fig. 26, and a lower left hand section 430. Within block 429 the feed-regulating valve proper is mounted. It consists essentially of the valve 431, the piston 432 and the projecting stem 433, all of which are integral and are slidably mounted in their respective bores as shown. Within the lower left hand block 430 a small plunger 434 is slidably mounted. Its head on the right hand end is held in contact with the end of the stem 433 of the feed-regulating valve by means of the hydraulic pressure which is transmitted to passage 435 by the branch pipe 207' which connects to pipe 207, which in turn is connected to the pressure manifold 20', see Figs. 12 and 14. The normal operation of the feed-regulating valve takes place when the turret-reciprocating valve 26 has been moved to its closed position by action of one of the cams 64 mounted on carrier 62, Figs. 1a, 3 and 4a, at the end of a forward rapid traverse movement of the turret as has been explained. With the hand control valve 308 in its downward or running position as shown in Fig. 26, liquid under pressure flows from pipe 207' through passages 435 and 436, annular groove 437 in feed-regulating valve 431, port 438, passages 439 and 440 and pipe 136 which leads to the selector valve mechanism. From thence it flows through the passage 138, annular groove 139, passages 140 and 141, past feed control valve 133, through passage 142, annular groove 143, passage 144 and pipe 137 which leads to the valve block 209 where it passes through passages 425, 412 and 416, leading to pipe 415 which connects by means of passages 414 and 191 to the right hand end 413 of the turret-reciprocating cylinder 1. This causes a forward movement of piston 4 to feed the turret toward the spindle, causing a flow of liquid from the left hand end 417 of the turret-reciprocating cylinder through passages 181 and 418, pipe 419 leading to passage 420, which is opened to communication with passage 421 by means of the annular groove 441 when the turret-reciprocating valve is in its central or closed position, and from thence through pipe 422, passages 423, 411 and 426 and pipe 424 leading to the upper section 428 of the feed-regulating valve. From thence it flows through the passage 442, annular groove 443 of valve 444, passage 445 and into pipe 446 which connects with pipe 447, see Figs. 4a and 13, leading to the sump. A description of the upper section 428 of the feed-regulating valve mechanism will be given later. Flow of liquid through the feed-regulating valve as just described causes a pressure drop as the liquid passes from the annular groove 437 into the port 438. This pressure drop or pressure differential caused by the feed-regulating valve effects a smaller pressure differential as the liquid passes the feed control valve 133 of the selector valve mechanism than would occur if the feed-regulating valve were not used.

It has been found, in using hydraulic feeds for machine tools, that a small amount of grit, lint or other foreign matter is always present in the liquid in spite of all precautions to use perfectly clean liquid, to provide strainers and to keep the valves, pipes and passages clean. For this reason there is a certain limit to the amount that the opening of a simple needle or throttle valve may be reduced and still maintain flow. If reduced much beyond this minimum opening, the flow will soon cease because of clogging even if considerable pressure is present in the system. Therefore, with a simple needle or throttle valve, a given working pressure and a given size of piston and cylinder for producing the feeding movements, there is a limit to the amount that the resulting feed can be reduced when using such a valve as the sole means of feed control. If, however, some form of non-clogging pressure-reducing valve is used in conjunction with the feed control valve so as to reduce the pressure differential at the feed control valve, the rate of feed can be correspondingly reduced. This is one of the main purposes of the feed-regulating valve 431. By its use the pressure differential at the control valve 133 may be reduced to a very small fraction of the working pressure. It should be noted that the passage 440 connects, by means of the pipe 136 and the connections leading therefrom, with the "upstream" passage 141 of feed control valve 133, i. e., the passage leading to said valve and that the passage 448 connects, by means of passage 449 and pipe 450, with pipe 137 which in turn connects, by means of the passages leading therefrom, with the "downstream" passage 142 of feed control valve 133, i. e., the passage leading from said valve. Thus the effective area on the right hand side of piston 432 of the feed-regulating valve is subjected to substantially the "upstream" pressure of control valve 133, whereas the effective area on the left hand side of same is subjected to substantially the "downstream" pressure of valve 133. Hence the pressure differential at the feed control valve 133 actuates the feed-regulating valve 431. As the effective areas at either side of piston 432 are approximately the same, it is seen that to balance the constant force exerted by the small plunger 434 tending to move piston 432 to the right a greater pressure must exist on the right hand side of piston 432 than on the left. In normal operation, valve 431 is automatically positioned axially by the opposing pressures existing on the opposite sides of piston 432 so as to produce a net force at piston 432 that will just balance the force produced by the plunger 434. This balancing action in positioning valve 431 determines the pressure differential at valve 133. With a given working pressure, this pressure differential at valve 133 is determined by the relative effective areas of plunger 434 and those at the sides of piston 432. By so proportioning these areas, the pressure differential at valve 133 may be reduced to any desired amount.

That this arrangement will automatically shift valve 431 to maintain the proper rate of flow of liquid past valve 133 to maintain the proper feed rate may be readily seen from an analysis of its action. With piston 4 moving to the left against a given cutting resistance under control of the valve arrangement described, it may be seen that if the cutting resistance should increase slightly, there would be a slight increase in the pressure in pipe 415. This would cause a slight increase in pressure in pipe 137, passage 142 leading from valve 133 and of the liquid on the left hand side of piston 432. This would unbalance the forces acting on valve 431 and cause it to move a small amount to the right, causing a decrease in the pressure differential of the liquid flowing through the opening of valve 431, and thereby cause an increase in the pressure existing in pipe 136 and passage 141 leading to valve 133, which would in turn increase the pressure differential at valve 133 to the proper amount to thereby maintain the proper rate of flow to cylinder 1 against the increased cutting resistance and at the same time increase the pressure at the right hand side of piston 432 to bring the forces acting on valve 431 once more into balance at the new position of valve 431. Conversely, it may be seen that if the cutting resistance should be reduced, there would be a reduction in the pressure on the left side of piston 432 which would cause a leftward movement of valve 431 to close the opening of same sufficiently to correspondingly reduce the pressure at the right hand side of piston 432 to bring the forces acting on valve 431 once more into balance at the new position of said valve and also to correct the pressure differential at valve 133 to maintain the proper rate of flow to cylinder 1. It has been stated that the effective areas at either side of piston 432 are approximately the same. The stem 433 to the left of piston 432, however, is slightly larger in diameter than the valve 431 to the right, so that the effective area to the right of piston 432 is actually a small amount greater than the effective area to the left of same. This excess of area on the right hand side of piston 432, with the considerably increased pressures at the sides of piston 432 caused by the increased resistance to feeding occasioned by the dulling of the tool or the facing of a shoulder, will increasingly oppose the constant force exerted by the pressure of the working liquid on the left end of plunger 434 and thereby reduce the remaining or resultant force to the right to be counterbalanced by the difference in pressure of the liquid acting on the right hand side of piston 432 above that on the left. Hence as the cutting resistance increases, the pressure differential at valve 133 necessary to balance the opposing forces on valve 431 becomes reduced, causing a reduced rate of flow past valve 133 and thereby resulting in a reduced rate of feed of the tool at the increased cutting resistance.

It should be noted that with the arrangement described there is no possibility of clogging, for if the minimum opening of valve 133, which is fixed for any given rate of feed, is large enough to pass any of the fine grit, lint or other foreign matter that is ever present in a hydraulic system, then the only other place that clogging can occur is at the opening of valve 431 which is not fixed. The area of this opening, between annular groove 437 and port 438, is in the normal feeding operation much smaller than that of valve 133, but if any obstruction to flow should occur at this point, due to the fine ever present foreign matter, an immediate drop in pressure in the passages 439, 440 and pipe 136 would occur which would unbalance the forces acting on piston 432 and thereby cause valve 431 to move to the right and let the obstruction pass through, after which the valve would again assume its original position.

The purpose of the valve 444 in the upper section 428 of the feed-regulating valve 427 is to prevent the tool from advancing towards the work at a more rapid rate than that for which feed control valve 133 is set. When using a machine of this nature for chucking work, and particularly when drilling through a casting of soft material such as brass with a fairly large drill, there would be, under certain conditions, a tendency when the drill breaks through for the drill to be pulled forward faster than it was being fed by flow of liquid to the right hand side of piston 4, which if not resisted would cause damage to the tool or work or both. Valve 444 is urged to the left by the spring 451 but is normally held to the right, as shown in Fig. 26, by the force of the liquid pressure in the space 452 exerted on left hand end of said valve. The force of spring 451 is comparatively light so that valve 444 will be held to the right when there is only enough pressure in pipe 137 to cause the turret to move freely forward without doing any work except to overcome the mechanical friction of the parts. In this position, passages 442 and 445 are open to communication with each other, and the cross sectional area of these passages is such that with the valve 444 in its open position as shown, there will be no appreciable resistance to the flow of liquid through them even at the maximum feed rate. If, however, under unusual conditions similar to those stated above, the turret or tool carriage should tend to move faster than it was being fed by the flow of liquid in pipes 137 and 415 leading to the head end 413 of cylinder 1, then the pressure in these pipes and consequently in the space 452 to the left of valve 444 would immediately fall to such a value as to allow spring 451 to partially close valve 444 so as to build up sufficient back pressure in pipes 424 and 422 leading from the back end 417 of cylinder 1 to prevent piston 4 and consequently the tool carriage from moving any faster than the rate at which liquid was being fed to it. Piston 4 would not stop or even slow down below this rate of movement, for in that case the pressure in pipes 137 and 415 would immediately increase, causing valve 444 to open wide enough to relieve the back pressure sufficiently to allow piston 4 to increase its rate of motion to substantially the rate at which the liquid was being fed to it from pipes 137 and 415.

The purpose of the annular groove 441 in the stem 30 of the turret-reciprocating valve 26 is to allow communication between passages 420 and 421 only when valve 26 is in its central or left hand positions, and to cut off this communication when valve 26 is in its right hand position, as shown in Fig. 26, in which position the pressure passage 214p is open to communication with the port 181 to subject the left end 417 of cylinder 1 to pressure. If communication between passages 420 and 421 were not closed, with valve 26 in this position as shown in Fig. 26, there would be a considerable loss of the working liquid due to the escape through the passage 418 and the pipes and passages leading therefrom to the open valve 444 in the upper section 428 of the feed-regulating valve, and from thence through the pipes 446 and 447 which lead to the sump. When valve 308 is moved to the upper or inoperative position with the operating handle 453 in the vertical position, passage 411 moves out of line with passage 423, and the lower end of groove 412 moves up out of communication with passage 425 leading from the feed-regulating and selector valves. This shuts off the pipes and passages leading to the two ends of cylinder 1. This will not interfere with the rapid traverse movements of the turret but will insure that the turret will stop exactly at the point of closure of the valve 26 by action of one of the cams 64 with cam roll 37, Fig. 4a. The closing of the two ends of cylinder 1 by moving valve 308 to the upper position will lock the piston 4 against any further movement with the ports of valve 26 closed. This valve is useful in setting the cams 64 to control the point in the forward movement of the turret at which the high velocity of rapid traverse has been reduced to the feed rate for the given tool and enables the operator, by repeated trials to set the tools very closely to the work, so that when the machine is in operation, a minimum amount of time will be lost from the time the rapid traverse has been reduced to the feed rate until the tool actually engages the work.

*Vavlve section 1A for opening the chuck*

This valve section is shown in diagrammatic section in Fig. 27, together with its connections to the cylinder 239. This valve section comprises the automatically operated valve 288, the hand-operated valve 300 and the secondary valve 454. As there are several sections of the master control valve mechanism that are similar to this, a partial description of these valves and their operation will serve for the others also. Valve 288 is operated by the buttons 287, Fig. 12, carried on the master control drum 286, as has been described. It is provided with a wide annular groove 455 so arranged that when the valve is in the upper or inoperative position, passage 456 is in communication with passage 457 leading from the main pressure passage 399p of intermediate block 397, and passage 458 leading to the main sump passage 400s is closed, and so that when the valve 288 is in the lower or operative position passage 458, leading to the sump passage 400s, is open to the central passage 456 and passage 457 leading from the pressure passage 399p is closed. Valve 454 serves, in addition to its functions as a valve, as a piston and operates in response to the pressure existing in passage 459. It is provided with a tail piece 460 of such a reduced diameter that the area of the shoulder 461 at the lower end between the tail piece and the main body of the valve is approximately equal to half the area of the main body, which is the area of the upper end of the valve. The space 462 below shoulder 461 connects by means of the passage 463, groove 464 and passage 465 with the pressure passage 406p of block 404 so as to maintain a constant upward force on shoulder 461 of valve 454. If passage 459 is connected to pressure, the resulting force on the top of valve 454 will be about double the upward force so the valve will be forced down into its lower or inoperative position as shown in Fig. 27. This lower position is determined by contact of the lower end of tail piece 460 with the stop plate 466. If passage 459 is connected to the sump, then there will be no downward force on the upper end of valve 454 and the upward force acting on shoulder 461 will force the valve into its upward position determined by contact of the upper end 467 of valve 454 with the under side of plate 468. When valve 454 is in the lower or inoperative position, as shown in Fig. 27, passage 469 communicates with annular groove 470 of this valve which allows the working liquid to flow from the pressure passage 406p through passages 465 and 469, annular groove 470, passages 471 and 472 to pipe 247 which leads through valve 249 to the left-hand end of cylinder 239, forcing piston 240 to the right and thereby closing the chuck, as has been described. This movement of piston 240 to the right forces liquid through pipe 248, passage 473, to which this pipe leads, passage 474, annular groove 475, passage 476, and from thence to the sump passage 410s of block 404. When valve 454 is in the upper or operative position, passage 476 is closed by the lower enlarged portion 477 of this valve, passage 478 is uncovered by the upper enlarged portion 479 of valve, and the central enlarged portion 480 has been moved up far enough to open communication between passage 469 and the lower annular groove 475 of the valve. This allows liquid to flow through passages 474 and 473 into pipe 248, and from thence into the right-hand end of cylinder 239, forcing piston 240 to the left to open the chuck. The liquid in the left-hand end of cylinder 239 escapes during this movement through pipe 247, valve 249, passages 472 and 471, annular groove 470, passage 478 into the sump passage 409s of block 404. Valve 300 is operated by hand by means of the lever 453, and has three positions designated respectively "H", "N" and "R", as shown in Fig. 27. A small conical pointed cylindrical plug 481 is provided which is forced into engagement with one of three conical-shaped indents 482 in valve 300 by means of the spring 483 so as to hold valve 300 in any desired one of its three positions. The three positions occupied by the end of hand lever 453 corresponding to the upper, intermediate and lower positions of the valve 300 are indicated by the letters H, N and R, respectively, in Fig. 27, which indicate the position for hand operation, the neutral position and the running position, respectively. When valve 300 is in the lower or running position, as shown in Fig. 27, annular groove 484 of this valve uncovers passage 456 and establishes communication of same with passage 485, leading by means of passage 459 to the upper end of valve 454. It can be clearly seen that with valve 300 in this position secondary valve 454 is under control of the valve 288. When valve 288 is in the upper or inoperative position as shown in Fig. 27, piston 240 is held to the right as also shown in Fig. 27 and the chuck stays closed. When, however, valve 288 is pushed down into its operative position, the upper enlarged portion 486 of this valve covers passage 457, while the lower enlarged portion 487 uncovers passage 458, which puts passage 459, leading to the upper end of valve 454, in communication with the sump passage 400s by means of the uncovered passage 458, annular groove 455, passage 456, annular groove 484 and passage 485 which connects with passage 459. This allows valve 454 to move into its upper position, thereby reversing the connections to pipes 247 and 248 and causing the chuck to open. Secondary valve 454 is under control of the automatically operated valve 288 only when the hand-operated valve 300 is in the lower or running position, for when the hand-operated valve is in its intermediate or neutral position or in its upper or hand-operated position, valve 288 is cut off from communication with the secondary valve 454, for in these two positions of valve 300, the passage 456 leading from valve 288 is closed by the lower enlarged portion 488 of valve 300. In both of these two positions of the hand-operated valve, the secondary valve 454 is under control only of the hand-operated valve. When the hand-operated valve 300 is in the intermediate or neutral position, passage 489 is uncovered by the upper enlarged portion 490 of valve 300, establishing direct communication between passage 459 leading to the upper end of valve 454 and the pressure passage 398p of block 397 through the uncovered passage 489, annular groove 484 and passage 485, which leads to passage 459. In this position of the hand-operated valve, the secondary valve 454 is held in its lower position and the chuck stays closed, but when the hand lever 453 is swung into the H or hand-operated position so as to move valve 300 into its upper position, passage 491 in valve 300 is brought into communication with passage 485, and passage 492 in valve 300 is brought in communication with passage 493. As passages 491 and 492 are connected by passage 494, it can be seen that in the upper or hand-operated position of valve 300, passage 459, which leads to the upper end of valve 454, is put into communication with the sump passage 400s of block 397, which allows valve 454 to move into its upper position and open the chuck. A groove V is provided at the lower end of all holes in block 209 in which the hand-operated valves 300 to 307, inclusive, Fig. 13, and 308 and 284 are situated, which serves as a vent to allow free movement of these valves.

*Valve section 2A for advance movement of feed tube*

This valve section is shown in Fig. 28, together with the cylinder 250 which operates the feed tube, and with the piping connecting the two. It may be seen that this valve section is the same in every respect as valve section 1A which has just been described, hence only a brief description of this section will be required. With the parts in the positions shown in Fig. 28, the secondary valve 495 is in the lower or inoperative position which connects pipe 258 with the pressure passage 406p of block 404 and pipe 259 with the sump passage 410s. This holds piston 250 to the left-hand end of cylinder which holds the feed tube in its retracted position, as has been described. Depression of valve 289 to its lower or operative position will allow secondary valve 495 to move up to its operative position, thereby reversing the connections to pipes 258 and 259, causing piston 250 to move to the right and move feed tube inwards to feed the stock to the stock stop, as has been described. Movement of lever 453 of this valve section to the H or hand-operated position will also allow secondary valve 495 to move up to its operative position to actuate piston 251 so as to move feed tube inwards, but movement of lever 453 to the neutral or running position with valve 289 in its upper position, as shown in Fig. 28, will not change the position of piston 250 from that shown, which corresponds to the retracted position of the feed tube.

*Valve section 3A for advancing forming tool slide*

This valve section is shown in Fig. 29 together with the connections between this valve section and the forming reversing valve 496, the forming reversing timing valve 497, cylinder 3 for actuating the forming tool slide F (which cylinder is integral with the cylinder for operating the cut-off slide), forming feed control valve 498, and other valves which are necessary for this group. It will be noted that the pressure and sump passages 398p and 400s respectively of the intermediate block 397 do not connect directly to the right and left with the corresponding passages of valve blocks 209 and 222 respectively in this section, as was the case in the previously described valves of the master control valve mechanism, nor is the hand-operated valve 302 the same as those which have been described for the valve sections 1A and 2A. It will be noted that automatic valve 290 is free of holding notches, and also that lock bar 388, shown in Fig. 24, has clearance cut on its inclined face to clear valve 290 and thereby prevent it from being held down. The reason for these differences is that in the former case the master control drum with its buttons controlled both the advance and retractive motions of the operating pistons of these sections, whereas in the case of the forming tool slide it is desirable to retract the forming tool at the completion of its forming cut without operation of the master control drum. This is accomplished by means of the forming reversing valve in a manner which will be described later. The reason for this mode of operation will become more apparent when one considers the fact that the forming operation is usually in progress during the time when the turret tools operate on the work and a condition may arise in which the completion of the forming cut would come at a time very close to that at which operation of the master control valve mechanism would be required for some other function. This would require a close adjustment of the rate of feed of the forming tool slide, which determines the point in the cycle at which the reversal of same would take place, to prevent the possibility of the actuating valves from the forming tool slide mechanism and some other mechanism calling for operation of the master control valve mechanism at the same time, which latter event would cause improper operation of same and would probably cause damage to the tools or machine or both. When it is considered that the rate or feed of the cutting tools is affected by the change in viscosity of the working liquid produced by a change in the temperature of same and that the temperature may change considerably in a few hours running, it may be easily seen that, in view of what has just previously been explained, the preferable method of reversing the forming tool slide is by an independent self-actuating arrangement rather than by actuation of the master control drum operating mechanism. This is the method employed in this invention and is illustrated diagrammatically in Fig. 29 for controlling the reversal of the forming slide, which method allows the reversal to take place at any suitable point in the cycle, before the severing of the pieces from the bar by the cut-off tool, regardless of whether the master control drum actuating mechanism should be in operation at the time or not, and gives a considerable latitude in the amount of time that may be allowed for the forming operation so that, with the proper setting of the valve for controlling the rate of feed of the forming tool slide to allow for variation of viscosity caused by change in the operating temperature of the working liquid, the machine may operate successfully regardless of such changes in viscosity. Fig. 22 shows the construction of the intermediate valve block 397 and clearly shows the connections from the pressure and sump passages 398p and 400s respectively, leading to the passages of valve blocks 222 and 209 to either side of this intermediate block. Passage 499 provides communication between the pressure passage 398p and groove 500 leading to passage 501p in block 222. Passage 502 provides communication between the sump passage 400s and groove 503 leading to the passage 504s in block 222. With the parts in the positions shown in Fig. 29, passage 504s communicates by means of annular groove 505 in automatic valve 290 with passages 506, 507 and 508 leading to the annular groove 509 in hand-operated valve 302. Thus with the parts in the positions shown valve 290 in its upper or inoperative position connects annular groove 509 to the sump. Passage 510, Figs. 22 and 30, provides communication between the pressure passage 398p and groove 511 leading to the passage 512p in block 209. Passage 513 provides communication between sump passage 400s and groove 514 leading to passage 515s in valve block 209. Hand-operated valve 302 embraces in addition to the annular groove 509 already mentioned, an annular groove 516, see also Figs. 29 and 29a connecting with a longitudinal groove 517; two longitudinal grooves 518 and 519 connected by the passage 520; and a longitudinal groove 521. The forming reversing valve 496 is mounted on the front spindle bearing, see Fig. 4, so that the projecting stem 522 of the valve 523 is in line with the adjusting screw 524 carried in the bracket 525 mounted on the forming tool slide F. Adjusting screw 524 is adapted to contact with the projecting stem 522 of the forming reversing valve 523 and displace same to its inoperative position as shown, at the inner end of the travel of the forming tool slide and at the completion of the forming operation. Valve 523 comprises two annular grooved sections 526 and 527 and three enlarged portions 528, 529 and 530. The valve housing 531 contains the passages 532–537, inclusive. Passage 532 connects by means of pipe 538 with passage 539 in block 209. Passages 533, 534 and 535s connect together and to pipe 539 which leads to the sump. Passage 536p connects to pipe 540 which leads from the pressure line 13, see Fig. 4, and passage 537 connects with pipe 541 which leads to the forming reversing timing valve 497. This valve mechanism embraces two sections, the regulating section and the operating section. The regulating section contains a regulating or timing valve 542 and a ball check 543. The operating section contains the operating valve 544 which embodies the two enlarged portions 545 and 546, an annular groove 547, a tailpiece 548 and a section 549 of a larger diameter than the tailpiece. The housing 550 of the operating section contains the passages 551–557, inclusive. Passages 551, 552 and 553 connect together and to pipe 558 which leads to passage 559 in block 209. Passage 554p connects to pipe 560 leading from the pressure manifold 20', Figs. 12 and 15, by means of pipe 561. Passage 555s connects with pipe 562 leading to the sump. Passages 556 and 557 connect with passages 563 and 564 respectively in the body 565 of the regulating section. The purpose of the forming reversing timing valve is to delay the return of the forming tool after it has reached the end of its cutting stroke for a sufficient length of time to allow the forming cutter to relieve itself of all strain produced during the forming cut and thereby leave a smooth accurate finish to the work. With the automatic valve 290 in the inoperative position shown in Fig. 29 and the hand-operated valve 302 in the running position as shown, passage 504s in valve block 222, which connects with the sump is in communication with annular groove 505 leading through passages 506, 507, 508, annular groove 509, passage 539, pipe 538 and passage 532 into the space 566 in valve body 531 at the left-hand end, as viewed in Fig. 29, of forming reversing valve 496. Space 567 in valve body 531 situated to the right of enlarged portion 530 of valve 523 is also connected to the sump by means of the passage 535s and pipe 539 leading thereto. Valve 523 is shown in its inoperative position in Fig. 29. It is held in either one of two positions to which it is moved in operation by means about to be described, by the friction of the packing within the gland 568 (not shown in diagrammatic view in Fig. 29). Inasmuch as the spaces 566 and 567 at either end of valve 523 are connected to the sump, the valve will remain in any position without the possibility of creeping due to leakage as the liquid would drain to the sump from either end without being able to build up a pressure sufficient to move said valve. With valve 523 in the inoperative position as shown in Fig. 29, pipe 540 leading from pressure manifold 20' transmits pressure through passage 536p, annular groove 527, passage 537, pipe 541, passages 563 and 564, in the body 565 of the regulating section of the forming timing reversing valve and passages 556 and 557 in the body 550 of the operating section which lead to the space 569 at the top of timing operating valve 544 and holds this valve in the lower position as shown. With valve 544 in its lower position as shown, passage 553 is uncovered by the enlarged portion 545 of valve 544, while passage 551 is covered by same. This allows the transmission of pressure through passage 553, pipe 558, passage 559, groove 521, passage 570, pipe 571, passage 572, and groove 573 leading to the space above the secondary valve 574 which holds this valve in its lower or inoperative position. With valve 574 in this position, passage 575 leading from the pressure passage 406p of block 404 transmits pressure through annular groove 576, passages 577 and 578, pipe 280, and passage 579 into the left-hand end of cylinder 3 and holds piston 6 in its right-hand position as shown, which holds the forming tool slide in its retracted position.

The operation of this valve mechanism is as follows: When automatic valve 290 is pushed downward into its operative position, by one of the buttons 287 of master control drum 286, passage 504s in valve block 222 is closed and passage 501p is opened to communication with annular groove 505. This allows liquid under pressure to flow through passages 506, 507 and 508, annular groove 509, passage 539, pipe 538 and passage 532 into the space 566 at the left of valve 523. This causes valve 523 to move to the right as viewed in Fig. 29, until the shoulder 580 on valve 523 contacts with the wall 581. In this operative position, the central enlarged portion 529 of valve 523 has been moved to the right of passage 537 so that this passage is now connected by means of annular groove 526, passages 533, 534 and 535s with the pipe 539 which leads to the sump. This allows the liquid under pressure in passage 554p in the body 550 of the operating section of the forming reversing timing valve 497 to flow into space 582 at the bottom of body 550, as viewed in Fig. 29, and force valve 544 quickly upwardly until the upper end of same contacts with the lug 583 projecting into the space 569 at the top of said valve. This movement of valve 544 forces liquid from space 569 through passages 556, 563, 557 and 564 past ball check valve 543 and into pipe 541 leading to passage 537 which has just been connected to the sump. This movement of valve 544 causes the enlarged portion 545 of same to cover passage 553 and uncover passage 551. Uncovering of passage 551 establishes a sump connection between passage 555s, annular groove 547, passages 551, 552, pipe 558, passage 559, groove 521, passage 570, pipe 571, passage 572 and groove 573 leading to the space above the secondary valve 574. This allows secondary valve 574 to move into its upward or operative position. In this position of valve 574, passage 584 is closed by enlarged portion 585 of this valve, passage 586 is uncovered by enlarged portion 587, and the central enlarged portion 588 moves above passage 575 leading from the pressure passage 406p. This allows liquid under pressure to flow from pressure passage 406p through passage 575, annular groove 589, passages 590 and 591, and pipes 281 and 592, passage 593, annular groove 594 in piston rod 279, passage 595 leading from the annular port 596 in cylinder head 597, pipes 598 and 599 to passage 600 leading to the right-hand end 601 of cylinder 3. This flow of liquid causes piston 6 to move rapidly to the left and quickly bring the forming tool into position to begin its cut. When the right-hand end 602 of the annular groove 594 has been moved to the left far enough to line up with the left side 603 of the port 596, communication between pipes 592 and 598 will be cut off, so that the rapid movement of the piston 6 to the left will be reduced to the slower feed rate which will be produced by flow from pipe 604 to 599, and thence to the right-hand end 601 of cylinder 3, as will be described subsequently. The right-hand end 602 of annular groove 594 in piston rod 279 is tapered so that the closing of communication between pipes 592 and 598 will take place gradually to thereby cause a gradual though rapid reduction in the velocity of piston 6 from the rapid traverse to the feed rate. The position of the forming tool 605 relative to the work W should be adjusted by means of the nuts 275, Fig. 5, so that just at the point where the velocity of movement of the forming cross slide F upon which it is mounted has been reduced to the feed rate, the tool 605 will engage the work W. Adjusting screw 282 should be adjusted so as to limit the stroke of cross slide F to such an amount as will give the proper depth of cut produced by the forming tool 605. When communication between pipes 592 and 598 has been cut off, liquid will flow through pipes 281 and 606 to the forming feed-regulating valve, designated generally as 607, the sections 429' and 430' of which are almost identical with the corresponding sections 429 and 430 of the turret-regulating valve shown in Fig. 26, which has already been described and will, therefore, require no further description at this point. For convenience, like parts of this valve will bear the same numbers as those of the valve in Fig. 26, except that in this case they will be "primed". Flow from pipes 281 and 606 will pass through the passages 438', 439', 440' of the forming feed-regulating valve, pipe 608, passage 609 in the body 610 of the forming feed control valve, past valve proper 498, through passage 611, pipes 619, 604, 599 and passage 600 to the right-hand end 601 of cylinder 3, causing the piston 6 and the forming tool slide F which it operates to advance with a slow controlled feed for the forming operation, the method of regulation being identical with that already described for the turret feed in connection with Fig. 26. It should be noted that, when pressure is exerted in pipe 613 and the space to the right of ball check valve 614, there is no possibility of unseating the check valve 614, as it is held tightly to its seat by the pressure exerted to the left of it which is transmitted from pipe 606 by the pipe 615.

In proceeding with the description of the operation of the reversing or withdrawing of the forming tool slide, it should be remembered that on the inward motion of same the secondary valve 574 is in its upward position, valve 544 is in its elevated position and valve 523 is in its right-hand position as viewed in Fig. 29. After screw 524 has contacted with the projecting stem 522 of valve 523, near the end of the inward movement of the forming tool slide and pushed it inwards sufficiently, passage 537 is closed to communication with passage 533 by the enlarged portion 529 and opened to communication with passage 536 by means of the annular groove 527 which causes liquid under pressure to flow from pipe 540, through passage 536p, annular groove 527, passage 537, pipe 541, past timing valve 542, passages 564 and 557 to space 569, thereby moving valve 544 slowly downward until passage 556 is uncovered.

This slow controlled movement of valve 544 provides the time interval necessary after the end of the inward motion of the forming slide F, at the point of contact of piston rod 279 with adjusting screw 282, Fig. 6, before withdrawing the forming tool to leave a smooth accurate finish to the work. When sufficient time for this has elapsed, valve 544 will have progressed far enough in its downward movement to uncover passage 556, at which time liquid will flow from pipe 541 through the comparatively unobstructed passages 563 and 556 and move valve 544 rapidly down to the end of its stroke, as shown in Fig. 29, which quickly uncovers passage 553, allowing the liquid to flow through same, through passage 552, pipe 558, passage 559, groove 521, passage 570, pipe 571, passage 572 and groove 573 leading to the space at the upper end of the secondary valve 574, which quickly forces it downwards to the position shown in Fig. 29. This position of valve 574 connects pipe 280 to pressure, as has been described, and causes flow of liquid through this pipe and passage 579 to the space 616 to the left of piston 6, causing it to move rapidly to the right to withdraw the forming cutter from the work. Movement to the right of piston 6 causes flow of liquid through passage 600, pipes 599 and 613, past the check valve 614, through pipes 615, 606, 281, passages 591 and 590, annular groove 589, passage 584, into the passage 419s which leads to the sump. This flow of liquid causes a rapid retractive movement of the forming tool slide F. The purpose of check valve 614 is to provide a free passage of liquid from pipe 599 to pipe 281 to permit a rapid retractive movement of the forming tool slide F until port 596 is uncovered to the annular groove 594, which also provides a free passage of liquid from pipe 599 to pipe 281 for the remainder of the retractive movement.

When the hand-operated valve 302 is moved to the "N" or "H" positions as shown in Figs. 29a and 29b, passage 508 leading from the automatic valve 290 is closed, while passage 539, leading from the space 566 to the left of valve 523, is brought into communication with the longitudinal groove 517 connecting with the annular groove 516, which connects with the vent passage V' leading to the atmosphere. It can thus be seen that operation of the forming reversing valve 496 and of the forming reversing timing valve 497 is effected only through automatic operation of the valve 290 when hand-operated valve 302 is in the "R" or running position. It should also be noted that when the hand-operated valve 302 is in any position other than the "R" position shown in Fig. 29, there will be no possibility of building a pressure in space 566 at the left of forming reversing valve 523 because of leakage of liquid into pipe 538, which would cause movement of this valve, as this circuit is vented to the atmosphere by the passage V' except when the hand-operated valve 302 is in the "R" position. When hand-operated valve 302 is moved to the "N" or neutral position, as shown in Fig. 29a, passage 579 is uncovered by the longitudinal groove 518 which connects, by means of the passage 520 and longitudinal groove 519, with the pressure passage 512p. This transmits pressure through these passages to pipe 571 which leads to passages 572 and 573, which communicate with the space above the secondary valve 574. This gives a direct pressure connection to the upper end of valve 574, and thereby holds it in its downward or inoperative position, which holds the forming slide F in its retracted position, or causes movement of said valve and of said forming slide into the positions just stated if they happen to be otherwise positioned. When hand-operated valve 302 is moved to the "H" or hand-operated position as shown in Fig. 29b, longitudinal groove 519 is moved out of communication with the pressure passage 512p and into communication with the sump passage 515s. This establishes a sump connection to the space above secondary valve 574, and allows it to move upwards into its operative position, which will cause the forming tool slide F to move inwards towards the work, as has been described.

*Valve section 4A for advancing cut-off tool slide*

This valve section is shown in Fig. 30 together with the connections between this valve section and the cylinder 2 which actuates the cut-off tool slide E, cut-off feed control valve 498', and other valves which are necessary for this group. The arrangement of valves and connections for this group is somewhat simpler than that for the forming tool slide just described, and the construction and operation of the secondary valve 617, the feed-regulating valve 431" and the feed control valve 498' and their associated parts is identical with the corresponding parts for the forming tool slide mechanism, and like parts of the cut-off feed-regulating valve which have been described and referred to twice before in reference to Figs. 26 and 29 will bear the same numbers as formerly, but will be "double primed". The action of the feed-regulating and control valves of the cut-off valve mechanism in response to the operation of the secondary valve 617 in producing a rapid movement of the cut-off tool to bring it up to the work and then a slow feed rate during the cutting operation is the same as has already been described in connection with the forming tool slide, consequently no further description of this valve action is deemed necessary. The secondary valve 617 is forced into its downward or inoperative position to cause a rapid retractive movement of the cut-off tool by release of the automatic valve 491 in a manner which has already been described in connection with the operation of the chuck and the feed tube, and release of the automatic valve 491 is effected by an indexing cycle of the master control valve mechanism by actuation of the cut-off reversing valve 283, Fig. 4, at the end of the inward movement of the cut-off tool after severing the work piece from the bar, in a manner to be described later in connection with the description of the valves shown in Fig. 35, for operation of the master control valve mechanism. When the hand-operated valve 303 is moved to the "N" position, the cut-off tool slide, E, is held in, or moved to, its retracted position, and when moved to the "H" position, the cut-off tool slide is held in, or moved to, its inner or operating position. These movements are effected in the same manner as has already been described in connection with the previously described valve sections, and, therefore, need no further description.

*Valve section 5A for holding turret forward*

This valve section is shown in Fig. 31 together with the connections between this valve section and the turret-reversing valve 203, the turret-reversing timing valve 211, the master control actuating valve 67, and the valve 26 for reciprocation of the turret. This valve section is provided for the purpose of holding the turret in its forward position independently of the turret-reversing timing valve, which has already been briefly mentioned in connection with the description of operation of the turret-reciprocating mechanism.

When the hand-operated valve 304 is in the running position as shown in Fig. 31, passage 618 in valve 304 is in communication with passage 619 to which pipe 208 from the turret-reversing valve 203 leads. This establishes communication between this pipe and the following passages: passages 620 to 625, inclusive, annular groove 626, passages 627 to 631, inclusive, leading to pipe 210 which connects with the turret-reversing timing valve 211, thus establishing a connection between the turret-reversing valve 203 and the turret-reversing timing valve 211, and as the turret-reversing timing valve connects, by means of pipes 212 and 213, with the space 28 to the left of the turret-reciprocating valve 26, it is seen that, with the valves 292 and 304 in the positions shown in Fig. 31, the normal withdrawal of turret at the end of its inner or feeding movements under control of the turret-reversing timing valve is not prevented. The purpose of the turret-reversing timing valve and its construction and operation is exactly the same as that of the forming reversing timing valve which has already been described, and consequently no further description is necessary here. When the automatic valve 292 is pushed down into its operative position, passage 625 is covered by enlarged portion 632 of valve 292, which prevents passage of liquid from the turret-reversing valve 203 through pipe 210 leading to the turret-reversing timing valve, and thereby causes the turret to be held in the inner position by preventing the flow of liquid to the turret-reciprocating valve 26 to cause withdrawal of same. This valve group is useful for holding the turret forward with the stock stop 41, Fig. 1a, in the working position after a piece of work has been finished and cut off until a new length of bar has been pushed forward against it and chucked in position. When automatic valve 292 is released and allowed to shift to its upper position, communication is again established between the turret reversing and the turret-reversing timing valves to allow flow of liquid to the turret-reciprocating valve 26, and thereby cause withdrawal of the turret. When hand-operated valve 304 is moved to the "N" position, a direct connection between pipes 208 and 210 is established by means of the groove 630, which in this position connects passage 619 with passage 631, to which pipes 208 and 210 respectively connect, so that with hand-operated valve 304 in this position, the normal withdrawal of the turret is not prevented. When the hand-operated valve is shifted into the "H" position, however, communication between the turret-reversing and the turret-reversing timing valve is then cut off and the turret will be held forward at the end of its next forward or inner stroke. It should be noted that when the turret is held forward either by depression of automatic valve 292 or by shifting hand-operated valve to the "H" position, that the pipe 210 leading to the turret-reversing timing valve is put into communication with the sump. In the former case, this is effected by means of the passages 631, 630, 629, 628, 627, annular groove 626, and passage 633 leading to the sump passage 400s, and in the latter case by means of the annular groove 634 in hand-operated valve 304, which in the "H" position connects passage 631 with passage 635 leading to the sump passage 400s. This connection of pipe 210 to the sump allows the turret to be held forward an indefinite length of time without the possibility of operation of the turret-reversing timing valve 211 and turret-reciprocating valve as a result of leakage of liquid under pressure into this pipe. The master control-actuating valve 67 is connected to the turret-reversing timing valve by means of pipe 636. This valve comprises the body 637 within which the slidable valve spindle 67' is carried. Valve spindle 67' is normally held to the right by a compression spring 638 with the collar 639 in contact with the cap 640. The right hand end 641 of valve spindle 67' as viewed in Fig. 31, is beveled at the two sides to adapt it to be pushed inwards by a dog or dogs 65 mounted on carrier 63, see Figs. 1a and 4a, which are provided with correspondingly beveled or inclined faces, as said dog or dogs move past the master control actuating valve on the forward or inward movement of the turret slide mechanism. A key pin 642 is provided which has a flattened upper end which engages a keyway 643 in valve spindle 67' to keep same from turning so as to maintain the beveled faces at the end 641 in the proper position with respect to the dogs 65. Within the valve body 637 a piston 644 is slidably mounted in the enlarged cylindrical space 645 and is also slidably mounted on the valve spindle 67'. Piston 644 is normally held to the right by means of the compression spring 646.

The purpose of the master control actuating valve is to cause an indexing cycle of the master control valve mechanism as has been stated. This will result when pipe 647, leading from the master control operating valve 648, Fig. 35, is connected to the sump, as will be described later, and is accomplished when valve spindle 67' is pushed to the left by a dog 65 on the forward movement of the turret slide mechanism. This movement to the left of valve spindle 67' brings the annular groove 649 into communication with passage 650 leading from pipe 647 which allows liquid to flow from said pipe through passage 650, annular groove 649, passage 651, cylindrical space 645, passage 652 and pipe 653 which leads to the sump. The purpose of piston 644 is to pull valve spindle 67' to the left out of the path of any of dogs 65 that may have passed it on the forward movement of turret when the turret is withdrawn to prevent an unintended indexing cycle of the master control valve mechanism and also to prevent needless wear and tear on dogs 65 and on the end 641 of valve spindle 67', during this rapid retractive movement of the turret. Withdrawal of valve spindle 67' is accomplished by flow of liquid under pressure through pipe 636 which connects with pipe 212 leading from the turret-reversing timing valve at the same time that flow takes place in pipe 213 leading to the turret-reciprocating valve 26 to cause withdrawal of the turret. Flow of liquid in pipe 636 continues through passage 654 leading to the space 655 behind piston 644 and moves this piston to the left, with a greater force than is exerted by springs 646 and 638, until shoulder 656 on valve spindle 67' comes in contact with the inner wall of cap 640, at which time the end 641 of valve spindle is beyond the path of dogs 65. It will be noted that the left face 657 of the hub on piston 644 is situated a certain distance to the right of the right-hand face of the shoulder 658 on valve spindle 67' when in the position shown in Fig. 31. This lost motion allows the edge 659 of piston 644 to cover passage 651 before moving valve spindle 67' to the left, and also on the return movement or movement to the right of piston 644, this insures that valve spindle 67' will be moved to the right to the position shown in Fig. 31 before passage 651 is uncovered by edge 659 of piston 644. Thus it may be seen that at no time during this outward and return movement of valve spindle 67' is a through connection established from pipe 647 to the sump, so that this withdrawal of valve spindle 67' and return of same may be accomplished at each retractive movement of the turret in order to clear dogs 65 without causing an unintended indexing cycle of the master control valve mechanism.

*Valve section 6A for clearing automatic valves*

This valve section is shown in Fig. 32. The purpose of this valve mechanism is to enable the operator to clear the automatic valve section, by releasing all automatic valves that are down, just prior to starting up on a new job, or at any time during the setting up and making of trial runs on a new job. Valve 293 is provided with a notch 660 which is exactly the same as the lower notch of the other valves of the automatic valve section. At the lower end of valve 293, its diameter is reduced first to form a shoulder 661, and then still further reduced to form a piston rod 662, to the lower end of which a piston 663 is attached. Valve 293 is normally held in its upper position by a compression spring 664. A passage 665 leads from the space 666 above piston 663 to the hand-operated valve 305 in valve block 209. Annular groove 667 in hand-operated valve 305 normally connects passage 665 with passage 668 leading to the sump passage 400s. Depression of hand-operated valve 305 until shoulder at the bottom of head 669 contacts with the upper face of valve block 209 causes the annular groove 670 to move down and establish communication between passages 671 and 665. This allows liquid under pressure to flow from the pressure passage 398p, through passage 671, annular groove 670, and passage 665 to the space 666 and move piston 663 down with a force greater than that of spring 664 until shoulder 661 contacts with the bottom of hole 672 in which the upper end of valve 293 is fitted. This movement causes the inclined face of the notch 660 to force the lock bar 388 to the right and release any of the automatic valves that may have been locked down. When hand-operated valve 305 is released, spring 673 causes same to move upwards again until collar 674 at the lower end of the valve contacts the lower surface of plate 468, at which time a sump connection is again established to space 666 above piston 663, allowing spring 664 to force valve 293 to its upper or inoperative position, as shown in Fig. 33.

*Valve section 7A for resetting the master control valve mechanism*

This valve section is shown in Fig. 33, which shows also the connections between this valve section and the cylinder 310 for rotation of the master control valve mechanism. Pipe 675 leading from the pressure manifold 20', Fig. 12, to passage 676 transmits hydraulic pressure to the space 677 at the right of piston 309 which produces a constant force on the right side of piston tending to move it to the left. When valves 294 and 306 are in their inoperative and running positions respectively, as shown in Fig. 33, pressure is transmitted from the pressure passage 398p through the passage 678, annular groove 679, passage 680, annular groove 681, passage 682, pipe 683, passages 684, 685 and 686 leading to the space 687 to the left of piston 309, which produces a force on the left end of piston 309 tending to move it to the right. This latter force tending to move piston 309 to the right is greater than that tending to move it to the left, as the area of the piston on the right side subject to pressure is less than that on the left by an amount equal to the area of the piston rod 311, consequently with valves 294 and 306 in the positions shown, the net force on piston 309 is to the right as viewed in Figs. 34 and 17, giving the tendency to counterclockwise rotation of pinion 313 which produces the successive rotary movements of the master control drum 286 during successive indexing cycles of this mechanism upon actuation of the escapement mechanism, as has been described. When the automatic valve 294 is depressed by one of the buttons 287 attached to this section of the master control drum 286 at the point in the cycle of operation of the machine, usually at the end of the cycle, at which time it is desired to reset said drum, passage 678 leading from the pressure passage 398p is closed, and passage 688 which leads to the sump passage 400s is opened, which relieves the pressure in the space 687 to the left of piston 309 and allows same to move to the left under action of the constant force acting on the right side of the piston supplied by flow of liquid, under pressure through pipe 675. This motion of piston causes drum 286 to rotate in the opposite direction from which it rotated during the successive indexing cycles. The area of the opening 689 at the inner end of the passage 686 leading to the space 687 to the left of cylinder 310 is considerably reduced in order to control the velocity of motion of piston 309 and its associated parts during the indexing cycles of this mechanism in order to prevent undue shock or strain on these working parts. On the return movement of piston 309, however, it is desirable, inasmuch as this movement may at times be almost as great as the full stroke, to have the major part of this return movement take place at a high velocity in order to take as little time for this return movement as possible. This is accomplished by providing a second passage 690 of larger area than that at 689 to allow a greater rate of discharge of liquid from space 687 than would take place if only passage 686 with its restricted end 689 were provided. A ball 691 held to its seat by spring 692 is provided so that liquid can pass through this passage only on the return stroke. Passage 690 is so located longitudinally of the bore of cylinder 310 that it is covered by piston 309 a short distance before the end of its return movement. The chamfer 693 at the left end of piston 309 is for the purpose of gradually closing passage 690 so as to reduce the velocity without shock to that produced with flow through the smaller passage 689 only. The velocity, after closing of passage 690, at which the end 694 of piston rod 311 contacts with the adjusting screw 695, see Fig. 17, is sufficiently reduced to prevent noise or shock. Screw 695 is adjustable so that the holes in the starting position of drum 286 and any buttons 287 that may be screwed therein line up correctly with the automatic valves 288 to 299, inclusive, when rotation of drum 286 comes to rest in its reset position. The drum is held in this angular position until the end of the next indexing cycle following the resetting of same, at which time automatic valve 294 will have been released and drum 286 will then rotate one section at a time, at each indexing cycle. Movement of hand-operated valve 306 to the "N" position cuts off communication from automatic valve 294 by closing of passage 680, but no movement of piston 309 results thereby as passage 696, which leads from the pressure passage 398p, is uncovered to annular groove 681 in valve 306, which establishes a pressure connection to passage 682 as before. When hand-operated valve 306 is moved to the "H" position, however, the pressure in space 687 to the left of piston 309 is relieved as the Z-shaped passage 697 is then brought in communication with passage 682 at the top and passage 698 at the bottom, which leads to the sump passage 400s, thereby providing a communication to the sump for space 687 to the left of piston 309. This allows piston 309 to move to the left to reset the master control drum 286 in the manner already described.

Valve section 8A for allowing turret to rotate

This valve section is shown in Fig. 34, together with the connections between this valve section and the cylinder 91, see also Fig. 3, for holding cam roll 89 from cam 90 to prevent rotation of the turret T when the carriage and the turret mechanism are in the retracted position. With the automatic and hand-operated valves 295 and 307 respectively in the positions shown in Fig. 34, liquid pressure is transmitted from the pressure passage 398p through passage 698, annular groove 699, passage 700, annular groove 701, passage 702, pipe 703 and passage 704 leading to the space 705 in cylinder 91 to the right of piston 706. This holds piston 706 to the left, and by means of the piston rod 92, with which it is integral and the link plates 95 and other parts connecting it to the bell crank 88, holds cam roll 89 in its downward position and thereby prevents turret rotation, as has already been described. When, during the operation of the machine, it is desired to allow the turret to rotate, valve 295 is pushed downward into its operative position by one of the buttons 287 attached to this section of the master control drum 286. This establishes a sump conection between the passage 707, leading from the sump passage 400s, and annular groove 699 connecting to passage 700 which leads to the space 705 in cylinder 91. This relieves the pressure in space 705 and allows spring 86, Fig. 7, to pull cam roll 89 up to the high point 192 of cam 90, thereby opening the motor intake valve 78 to cause rotation of the turret, as has been described. A vent hole represented in Fig. 34 as passage 708 is provided in the left end of cylinder 91 to allow free movement of piston 706. This vent hole (not shown elsewhere) leads horizontally inwards from cylinder 91 to the inside of base B so that any liquid which may leak past piston 706 may find its way back to the sump at the bottom of the base. Hand-operated valve 307 is provided for rotating turret by hand for attaching or removing the turret tools or adjusting same. When hand-operated valve 307 is depressed, passage 700 is closed to communication with annular groove 701, but passage 709 leading from the sump passage 400s is uncovered to same, which establishes a sump connection to passage 702 leading to the space 705 to the right of piston 706, and thereby causes rotation of turret. Upon releasing hand-operated valve 307 which is normally held in its upward position by the spring 710, passage 709 is closed and passage 700 opened again, which causes flow of liquid to space 705 in cylinder 91 and forces piston 706 to the left to close motor intake valve 78. It should be remembered that when the motor intake valve 78 is pushed down to its lowest position in closing same, see Fig. 2, the motor discharge valve 79 is allowed to open and swing finger 109 moved out of the path of rotating finger 53 so that all parts of this motor valve mechanism are reset and ready for the next rotational movement of the turret. It may thus be seen that the operator may rotate the turret from one cam 117, 117' or 117'', Fig. 2, in this instance, to the next as many times as desired merely by depressing and releasing the hand-operated valve 307 once for each rotary movement of the turret.

Valve sections 9A to 12A and valve section 2S

The purpose of the valves in sections 9A to 12A inclusive is to index the drum 286 of the master control mechanism to a succeeding station a predetermined time interval after the operation of one of these valves. Four of these valves are provided so that time intervals may be selected of as many as four different lengths and introduced into the cycle of operations of the machine between the various events at any points desired. Some of the conditions that make this necessary will be more fully brought out in the subsequent description of the making of work piece illustrated in Fig. 36. Valve section 2S is for indexing the master control mechanism by hand. Valve sections 2S and 9A to 12A inclusive are both shown in Fig. 35 together with the valve 648 for operation of the master control mechanism, cylinder 338 for actuating the escapement mechanism of the master control mechanism, cylinder 367 for reciprocating master control drum, cut-off reversing valve 283, master control actuating valve 67, see also Fig. 31, and the connections between these valve units.

The valve 648 for operation of the master control valve mechanism embodies a three-way valve 711 which may be turned to either of two positions by means of the hand lever 712, see also Fig. 16, attached to head 713 of valve 711. The two pins 714 and 715 limit the amount of angular motion of this valve. The purpose of this three-way valve is to render inoperative the cylinder 367 for reciprocation of the drum 286 of the master control valve mechanism, see also Fig. 20, so that in "setting up" for a new job the drum 286 may be rotated, by means of the hand-indexing valve 284 of section 2S without the vertical reciprocating motion taking place. When the three-way valve 711 is in the "running position", as shown in Fig. 35, and all communicating passages of the several valves 67, 284, 283 and 285 which connect, by means of the pipe 716 and its branches, to the master control operating valve 648 are closed, then liquid pressure will be transmitted from the pressure manifold 20', see also Figs. 12 and 15, through the pipes 561 and 560, passages 717p, 718, restricted passage 719, into the passage 720, and as there is, under the conditions stated, no opening for escape through passages 721 and pipe 716, the pressure will be transmitted through passage 722 and pipe 351 which leads to the space 349 in block 338 and holds piston 326, for actuation of the master control escapement mechanism, in its inoperative position, as has been described.

With valve 711 in the position shown pressure is also transmitted from passage 722 to passage 723 through the three-way valve 711, passage 724 and pipe 381 which leads to the space 383 in block 367 and holds piston 364, for reciprocation of the master control drum, in its inoperative position, as has been described. Opening of any one of the valves connecting pipe 716 to the sump will allow liquid from space 721 at the top of valve 648 to escape, and as the restricted passage 719 will allow only a limited amount of liquid to flow into passage 720, the pressure therein will drop to a very low value, which will, therefore, relieve the pressure in spaces 349 and 383 in the cylinder blocks 338 and 367 respectively, and thereby initiate an indexing cycle of the master control mechanism by actuation of pistons 326 and 364 respectively. The word "initiate" is herein, and will hereinafter be, used to refer to the downward movement of the master control drum 286, which by means of the attached buttons causes actuation of one or more of the automatic valves 288 to 299, inclusive, as has already been described. Arrest of the flow of liquid through passage 721 and pipe 716 by closing of the given valve connecting therewith will allow the liquid which flows through the restricted passage 719 to flow through the pipes 351 and 381 and cause these pistons 326 and 364 to return at a somewhat reduced rate to their respective normal positions, as shown in Fig. 35, to complete the indexing cycle, which causes withdrawal of the master control drum 286 and the rotation of same to the next angular position in the manner already described. It may thus be seen that the opening and closing of any one of the valves connecting with pipe 716 will cause an indexing cycle of the master control mechanism. The master control actuating valve 67 has already been described, and in the description it was pointed out that movement of dog or dogs 65, mounted on carrier 63, to force valve spindle 67' toward its housing caused this valve to open communication between pipe 647, which connects with pipe 716 and the sump, and that passing of dog 65 allowed it to close again. It is now seen that such actuation of valve spindle 67' of the master control actuating valve will result in an indexing cycle of the master control mechanism.

Cut-off reversing valve 283 is mounted on the front spindle bearing, as shown in Figs. 1 and 4, and comprises the housing 725 within which the valve spindle 726 is slidably mounted. A stem 727 projects through the housing 725 and is adapted to contact with the adjusting screw 728 carried in the bracket 729 mounted on the side of the cut-off tool slide E. An annular groove 730 in valve spindle 726 is adapted to open communication between the passages 731 and 732 when valve spindle 726 is pushed inwards at the end of the inward movement of the cut-off slide. Passage 731 leads to pipe 733, which connects with pipe 716 from the valve 648 for operation of the master control mechanism. Passage 732 connects with passage 734s, which leads to pipe 735 leading to the sump. Opening of communication of passages 731 and 732 to each other gives a sump connection to pipe 716, and thereby initiates an indexing cycle of the master control mechanism to cause a retractive movement of the cut-off slide E, as will be more fully described hereinafter. This retractive movement of same will allow spring 736 to move valve spindle 726 into its closed position as shown, and thereby complete the indexing cycle of the master control mechanism.

Valve sections 9A to 12A are practically identical. The upper part comprises the four automatic valves 296–299, inclusive, and the four control valves 737 to 740, inclusive. The lower half comprises the four timing valves 285. Inasmuch as the construction and operation of these four valve sections are the same, that of the one 9A only will be described. Pipe 741 connects with pipe 716 from the valve 648 for operation of the master control mechanism. Pipe 741 leads to passage 742 in block 403, which connects with passage 743 common to the four valve sections 9A to 12A. Passage 743 connects, by means of passage 744, to the timing valve 285 of section 9A, and by means of similar passages with the other three timing valves in sections 10A to 12A, inclusive. With the automatic valve 296 in the inoperative position as shown, pressure is transmitted from the pressure passage 398p of block 397 through passage 745, annular groove 746, passage 747, past control valve 737, through passage 748 and passage 749 which leads to the space 750 above the timing valve 285 and holds it in its downward or inoperative position as shown. The downward position of valve 285 is determined by contact of the tail piece 751 with the adjusting screw 752. Tail piece 751 is of a smaller diameter than that of the main body of valve 285, and the space 753 below the shoulder 754 formed at the junction of the two connects, by means of passage 755, with the pressure passage 406p. This connection produces a constant upward force on valve 285 which is approximately half of that produced on the upper face of same when valve 296 is in the position shown. When valve 296 is pushed down into its operative position, by one of the buttons of the master control drum, passage 745 is closed to communication with annular groove 746, and passage 756 is opened to communication with same, and as passage 756 leads to the sump passage 400s, this movement of valve 296 relieves the pressure in space 750 above the timing valve 285 and allows same to move upwards as a result of the constant upward force on the shoulder 754 of same. The velocity of this upward movement of valve 285 is determined by the amount of opening of control valve 737. When valve 285 has reached the upper end of its movement, as determined by contact of the upper end of same with the lower face of plate 468, passages 757 and 744 will have been opened to communication with each other by the annular groove 758 in valve 285. Passage 757 connects, by means of passages 759 and 760, with the sump passage 409s, so that at this upper position of timing valve 285, a sump connection is established to these passages leading from pipes 741 and 716, which connect with the valve 648 for operation of the master control mechanism, and thereby initiates an indexing cycle of this mechanism. When valve 296 is released, timing valve 285 is forced down again into its inoperative position, as shown, to complete the indexing cycle of the master control mechanism. The length of the time interval from the time the master control drum 286 moves down to depress automatic valve 296 and thereby actuate timing valve 285 until timing valve 285 has initiated the next indexing cycle and causes drum 286 to move down a second time, after having been withdrawn in the meantime and rotated to a second angular position, is determined by the adjustment of the control valve 737 and the adjusting screw 752. Increasing the opening of the former and reducing the length of stroke of timing valve 285 by means of the latter shortens the duration of the time interval, whereas the opposite adjustments of same lengthens the time interval. In any case when using a timing valve, the length of the time interval must be sufficient to allow the drum to be retracted and rotate to the next angular position before actuation by the given timing valve at the upper end of its stroke, in order to insure the proper operation of the master control mechanism. In other words, the time interval produced by any given timing valve must be at least a little longer than the time interval of opening of that particular valve, (other than a timing valve,) of the group shown in Fig. 35 connecting to pipe 716, which causes the indexing cycle during which the given timing valve is brought into action.

The hand-operated valve 284 of valve section 2S is held in its upper or inoperative position by the spring 761, this position being determined by contact of the collar 762 mounted on the downward projecting stem 763 of this valve with the under side of plate 468. When valve 284 is depressed, the annular groove 764 formed therein opens communication between passage 765 leading from pipe 766 and passage 767 which leads to the sump passage 400s. The sump connection to pipe 766 which connects with pipe 716 initiates an indexing cycle of the master control mechanism, and release of valve 284 completes the cycle, allowing the drum to rotate to the next angular position. The three-way valve 711 is shown in its normal or running position in Fig. 35. When it is desired to rotate the master control drum 286 without reciprocation of same, either to index it in a counterclockwise direction, as viewed in Fig. 14, or to reset it to the starting position during the hand operation of the machine in the process of setting up and adjusting the tools, valve 711 is turned to the reverse position from that in which it is shown in Fig. 35 by means of the handle 712. When valve 711 is turned to the position opposite that shown in Fig. 35, passage 723 is closed and passage 768 leading from the passage 711p is opened. As passage 711p leads from pipe 560, a constant source of supply for liquid under pressure, the space 383 in block 367, Figs. 35 and 20, to which passage 768 now connects will be under pressure, which will hold piston 364 to the left and thereby hold drum 286 in its upper position regardless of any rotation of same caused by actuation of any one of valves 67, 284, 283 or any of the timing valves 285 of sections 9A to 12A, inclusive.

In Fig. 21, a means is shown for disconnecting the master control drum shaft 320 from the mitre gear 319 which is normally connected to it. This means comprises the lock pin 769 which normally engages the hole 770 in the driving arm 771 which is secured by means of the set screw 772, see also Fig. 13, and key 773 to the tubular hub extension 774 of the mitre gear 319. Lock pin 769 is carried in the extension 775 of the arm 776 which is secured to the end of the master control drum shaft 320 by means of the pin 777. Lock pin 769 carries a hollow knob 778 at its outer end and is provided with a shoulder 779 at its inner end. A spring 780 is provided which normally holds the inner end of lock pin 769 in the hole 770 of arm 771. Withdrawal of lock pin 769 from hole 770 by means of the knob 778 allows the operator to rotate the master control drum 286 into any angular position desired for attaching or rearranging the buttons 287 on same in setting up a new job. It will be noted that the letters of the alphabet are stamped on the periphery of the master control drum 286 at the left end, see Fig. 12, with each letter in line with a longitudinal row of holes for attachment of buttons 287. These letters are in alphabetical order and so arranged that when lock pin 769 is in place in hole 770 of arm 771 and drum 286 is reset angularly or rotated in a clockwise direction, as viewed in Fig. 14, as far as it will go, the letter A will be down and in line with the automatic valves 288 to 299, inclusive, and after the first indexing cycle, letter B will be rotated into this position, etc. This arrangement of letters indicates to the operator not only where the starting row of holes is located on drum 286, but where the succeeding holes are located so that he may readily attach the buttons 287 in accordance with a prearranged grouping for any given job. A dial 781 is mounted on the left end of the master control drum shaft 320 with another row of letters stamped on its periphery. These letters also are in alphabetical order and so arranged that when a given letter on the drum 286, A for instance, is in the downward position with its row of holes in line with the automatic valves, the letter A appears at the top of the dial 781 opposite the pointer 782, and when the B row of holes lines up at the bottom of drum with the automatic valves, the letter B appears on the dial oposite the pointer, etc. When the required buttons 287 for a given job have been attached to the drum 286 and it has been rotated back again into place in hole 770 and lock pin 769 dropped again into place in hole 770 of arm 771, this dial 781 enables the operator to rotate the drum 286 so as to readily bring any desired row of buttons into the working position in line with the automatic valves, and also enables him to at all times tell which row is in the working position.

It will be noted that the stations of the turret as shown in Fig. 1a are marked with the Roman numerals I, II, III, etc., for reference in the following description of the operation of the machine.

Operation of the machine in making the piece shown in Fig. 36

Fig. 36 is a perspective view of a simple piece of work W which is typical of the class of work for which this machine is adapted, and is chosen as an example in describing the operation of this machine. Before proceeding with the description of operation of the machine in the making of this piece, the following list of the valve sections of the master control valve mechanism is given for ready reference, together with the number of the drawing in which each section is shown diagrammatically.

1S for shutting off turret feed, shown in Fig. 26;
2S for indexing master control valve mechanism, shown in Fig. 35;
1A for opening of chuck, shown in Fig. 27;
2A for inward movement of feed tube, shown in Fig. 28;
3A for advancing forming slide, shown in Fig. 29;
4A for advancing cut-off slide, shown in Fig. 30;
5A for holding turret forward, shown in Fig. 31;
6A for clearing master control automatic valves, shown in Fig. 32;
7A for resetting master control valve mechanism, shown in Fig. 33;
8A for allowing turret to rotate, shown in Fig. 34; and
9A to 12A, inclusive, the timing valves for indexing master control valve mechanism after a predetermined time interval, illustrated in Fig. 35.

In setting up the machine for a given job, the operator will fit into the machine the proper sized collet jaws and feeding fingers to suit the stock to be used, place a bar of stock J in the machine, place the necessary tools in their proper places, adjust them to finish the work to the proper dimensions (by taking trial cuts by hand operation of the machine), and adjust the feed rates to suit each tool, which will also be done by taking trial cuts and by hand operation. The operator may now attach the necessary buttons to the drum in their proper places to give the desired sequence of operations, the number and arrangement necessary in this instance being given in the chart in Fig. 38, then put the machine in automatic operation and try out the several motions individually and collectively, with the bar of stock J held clear of the tools, to see that the several tools and tool holders clear each other and that the sequence of operations and timing of same is correct, and make such adjustments or changes as may be necessary for satisfactory operation before starting the machine in actual operation on the bar J to produce the work W.
The procedure necessary to put the machine in automatic operation for these preliminary tryouts is the same as will be given in the following description of the starting of the machine for production. The holding of any one or more mechanisms inoperative while trying out the automatic operation of others may be accomplished by putting the levers 453 of the hand-operated valves of the given valve sections in the "N" or neutral position. For example, to try out the turret and cross slide motions with the stock J held back, the levers 453 of the valve sections IA and 2A (see list) are put in the N position, and the chuck will remain closed and feed tube will remain in its retracted position during automatic operation of the machine even though the buttons on the drum 286 operate the automatic valves of these sections. After the operator has made the initial tryouts and is ready to start the machine in automatic operation on the bar J to produce the work W, the following procedure is followed: 1st.—The stock J is positioned until the inner face is approximately in line with the left or back face of the cut-off tool 783. The chuck is now closed and the cross slides E and F withdrawn (if not already so) by shifting the levers 453 of the valve sections IA, 3A and 4A of the master control valve mechanism to the upper or N position. 2nd.—The automatic valves are cleared by depressing knob 669 of the hand-operated valve in the 6A section, and three-way valve 711, Fig. 35, is turned to the position shown in Fig. 35, so that—3rd.—The drum 286 can be indexed to position E, by operation of the hand-operated valves of sections 7A and 2S, with the drum in the upper position so that the buttons on same will clear their respective automatic valves. 4th.—The turret, which is held in the retracted position, is rotated to bring the station which carries the last tool into the working position (which is station III in this instance) by operation of the hand-operated valve in the 8A section. 5th.—Handle 235, Figs. 2 and 31 of the three-way valve 174 is swung to the running position shown in Fig. 31 so as to open communication between pipes 173 and 175, and turret control lever 228 is swung into the X position, as shown in Fig. 4a, to allow automatic operation of the turret-reciprocating valve 26. 6th.—All levers 453 of the hand-operated valves of the master control valve mechanism, that are not already so, are swung to the "R" or running position, as shown in Fig. 14, and the three-way valve 711 is turned into the operative position shown in Fig. 35. All parts of the machine are now in the positions shown in the drawings, with the exception of the cut-off tool, which is retracted, and the stock J, which has been trimmed and set approximately flush with the back side of the cut-off tool. With the spindle running, the machine is now ready for automatic operation to produce work W. To start the machine in motion, hand-operated valve of section 2S is depressed for an instant, then released. This causes an indexing cycle of the master control mechanism, causing the drum 286 to descend, as represented by motion from point 1496 to point 1497 in Fig. 37, and thereby depress the automatic valves of sections 7A, 8A and 12A, as the three buttons on the E station of drum 286 are in the lower or working position and in line with these three valve sections, see Figs. 13, 14 and 38. Depressing of automatic valve 295 of section 8A, Fig. 34, will cause rotation of the turret from section III past stations IV, V and VI to station I, as represented in Fig. 37, by motion from point 1498 to point 1499, at which time it will start to move forward at a rapid rate, as represented at point 1500. In the meantime, master control drum 286 will have been retracted, as shown in Fig. 37, from 1501 to 1502, by release of the hand-indexing valve of section 2S, at which time drum 286 will be reset from station E to station A as shown from 1503 to 1504 because of the depression of the automatic valve 294 of section 7A, a button 1008 for which is on the E station of drum 1007, see Fig. 38. While these motions are in progress, the timing valve 285 of section 12A will be moving upwards, as shown from 1505 to 1506, Fig. 37, because of the depression of the automatic valve 299 of valve section 12A, a button for which is also on the E station of the drum, as shown in Fig. 38. It should be remembered that during this time on this initial cycle, the cut-off tool is in its retracted position, and not in the position shown in Fig. 37. When the timing valve of section 12A has reached the end of its upward stroke as shown at 1506, it initiates a second indexing cycle of the master control mechanism, causing drum 286 to descend as shown from 1507 to 1508 and causes the buttons on the A station, see Fig. 38, to depress the automatic valves of sections IA, 5A and 9A, thereby terminating the E time interval of the motions represented in Fig. 37 and starting the A interval. As there are no buttons on the A station of drum 286 in sections 7A, 8A and 12A, the automatic valves of these sections will be released on this downward movement of the drum. Release of the automatic valve 299 of section 12A will cause the timing valve of this section to descend to its inoperative position as shown from 1509 to 1510, Fig. 37, and thereby complete the indexing cycle of the master control mechanism, causing drum 286 to ascend as shown from 1511 to 1512. At point 1512, drum 286 rotates from the A station to the B station as shown from 1513 to 1514. While these events are taking place, the turret mechanism continues its forward rapid movement to some point such as 1515, at which time it has been slowed down by one of the cams 64, mounted on the carrier 62, to a feed rate, at which rate it continues for a short distance to point 1516, at which the turret mechanism has reached its forward position with the stock stop 41, Fig. 1a, in place ready to position the end of stock J, when it is subsequently moved forward. The turret mechanism will be held in this forward position because of the depression of the automatic valve 292 in section 5A, which temporarily cuts off communication between the turret-reversing valve 203, Fig. 31, and the turret-reversing timing valve 211. Depression of the automatic valve 288 of section 1A causes opening of the chuck as shown from 1517 to 1518, Fig. 37, and depression of the automatic valve 296 of section 9A will start the timing valve of this section on an upward movement as shown from 1519 to 1520. At point 1520 at the upper end of its movement, this timing valve will initiate another indexing cycle of the master control mechanism, causing drum 286 to descend as shown from 1521 to 1522 and causes the buttons on the B station of same to depress the automatic valves of sections 2A and 10A and hold down those of sections 1A and 5A, see Fig. 38, while the lock bar 388, Fig. 24, is retracted and returns to engagement again to hold these four valves down upon the subsequent upward movement of drum 286. This momentary retraction of lock bar 388 releases automatic valve 296 of section 9A, as there is no button in this section, on the B station of the drum 286. Release of automatic valve 296 in section 9A will cause downward movement of the timing valve of this section as shown from 1523 to 1524, Fig. 37. Downward movement of this valve will complete the indexing cycle of the master control mechanism, causing drum 286 to ascend as shown from 1525 to 1526 and rotate from station B to station C as shown from 1527 to 1528. The repetition of the buttons in the 1A and 5A sections on the B station of the drum 286 which has caused these two valves to remain down in their operative positions during the B time interval causes the chuck to remain open and the turret mechanism to remain forward with the stock stop 41 in the working position while the feed tube 241, Fig. 1, advances as shown from 1529 to 1530, Fig. 37, as a result of the depression of the automatic valve 289 of section 2A. The reason for providing time interval A is to insure that the chuck is fully open before starting the forward movement of the feed tube. Forward movement of the feed tube feeds the stock J towards the stock stop 41. During these movements the timing valve of section 10A is moving upwards as shown from 1531 to 1532, because of the depression of automatic valve 297 of this section. When the upper end of its stroke is reached at point 1532, the next indexing cycle of the master control mechanism is initiated, causing drum 286 to descend as shown from 1533 to 1534 and cause the buttons on the C station of same to depress the automatic valves of sections 3A and 8A and hold down the automatic valve of section 2A. Downward movement of drum 286 will cause the release of automatic valve 297 of section 10A and allow the timing valve of this section to descend as shown from 1535 to 1536. This will cause completion of the indexing cycle and cause the drum to ascend as shown from 1537 to 1538 and to rotate from station C to station D as shown from 1539 to 1540. On the downward movement of the drum from 1533 to 1534 to start the C time interval, automatic valves of the 1A and 5A sections will be released, which will start closure of the chuck as shown from 1541 to 1542 and the release of the turret mechanism for the rapid retractive movement of same as shown from 1544 to 1545 after the time interval 1543 to 1544 as determined by the adjustment of the turret-reversing timing valve 211, Fig. 31. The end of stock J will have contacted with the stock stop 41 at some point 1546 in advance of the closing of chuck. The feeding fingers at the inner end of the feed tube will slip on the stock during the remainder of the motion of the feed tube from 1546 to 1530 and thereby hold the stock accurately against the stock stop until gripped by the chuck. Automatic valve 289 of the 2A section is held down during the C time interval by a second button in the 2A section on the C station of the drum 286 in order to continue the forward movement of the feed tube beyond the point of contact of the stock with the stock stop. Depression of the automatic valve 290 of section 3A starts the forming tool slide F, which carries the forming tool 605 rapidly forward as shown from 1548 to 1549. At point 1549 the rapid movement has been reduced to the proper feed rate, and shortly thereafter the forming tool 605 will start its cutting operation on the bar J. Depression of the automatic valve 295 of section 8A will allow the turret to rotate from station I to station II as shown from 1550 to 1551. At the end of this rotation of the turret, it will move rapidly forward as shown from 1552 to 1553 to bring the drill centering tool 42 in turret station II up to the stock. At point 1553 the rapid traverse will have been reduced to the proper feed rate, and shortly thereafter the tool 42 will engage the stock J and begin its cutting operation. When point 1554 has been reached at the end of the forward movement of the turret mechanism, tool 42 will have been fed to the proper depth and the turret-reversing valve 203 will have been actuated to cause, through operation of the turret-reversing timing valve 211, after the time interval from 1554 to 1555 as produced by same, the rapid retractive movement of the turret as shown from 1555 to 1556. When the turret is withdrawn to its retracted position at 1556, rotation of same will take place as shown from 1557 to 1558 to bring the drill 43 in station III into the working position. At the end of this rotation of the turret, it will be moved rapidly forward as shown from 1559 to 1560 to bring the drill 43 up to the work W. At point 1560, the rapid traverse will have been reduced to the proper feed rate, and shortly thereafter the drill will engage the work W and begin its cutting operation. When a point 1561 has been reached in the drilling operation, a certain amount in advance of the point 1562 at which the drilling operation will have been completed, dog 65, Fig. 1a, will have pushed valve spindle 67' of the master control-actuating valve 67 in far enough to open this valve and cause actuation of the master control mechanism to initiate another indexing cycle of same as shown from 1563 to 1564, and as dog 65 continues past valve spindle 67' to allow it to close valve 67 again, this indexing cycle will be completed as shown from 1565 to 1566. The downward movement of drum 286 from 1563 to 1564 causes the buttons on the D station of same to depress the automatic valve of section 4A and release the automatic valves of sections 2A and 8A. It should be remembered that the automatic valve 290 of the 3A section which was depressed at the beginning of the previous interval has no notches for lock bar 388 to engage, so it is already up in its inoperative position. Depression of automatic valve 291 of section 4A will start the cut-off tool slide E, which carries the cut-off tool 783 rapidly forward as shown from 1568 to 1569. At point 1569, the rapid movement has been reduced to the proper feed rate, and shortly thereafter, the cut-off tool 783 will start its cutting operation on the work W. The rate of feed of the forming tool will have been adjusted so that the forming operation will have been completed as shown at 1570 and the forming tool will have started back on its rapid retractive movement as shown from 1571 to 1572, after the time interval from 1570 to 1571 produced by the forming reversing timing valve 497, at about the time the cut-off tool starts in at the feed rate at point 1569. The longitudinal position of dog 65 on its carrier 63 is so adjusted that the amount by which point 1561 is advanced ahead of point 1573 will have caused the cut-off tool 783 to sink a certain amount into the work, as represented by movement from 1569 to 1574, by the time the drilling is completed in order to reduce the total time of cycle as much as possible and thereby maintain a high rate of production. Release of the automatic valve 289 of the 2A section at the beginning of the D time interval causes the retractive movement of the feed tube as shown from 1575 to 1576, while release at the same time of the automatic valve 295 of the 8A section will cause the motor intake valve 78 to be held closed to prevent rotation of the turret when it is subsequently retracted as shown from 1573 to 1577. At the completion of the index cycle of the master control mechanism for the D time interval as shown from 1565 to 1566, the drum 286 will have been rotated from the D station to the E station as shown from 1578 to 1579. The line X—X on the timing diagram of Fig. 37 represents the point of time in the cycle of motions necessary for making the piece of work W, as shown in Fig. 38, at which the positions of the various elements correspond to those shown in the drawings. At this point in the cycle, the turret is held back in its retracted position with the drill 43 in the working position awaiting the severing of the work W from the bar J by the cut-off tool 783 before rotating to bring the stock stop 41 into the working position to begin a new cycle, the forming tool 605 has been retracted, the chuck is closed, the feed tube is in its retracted position, the master control drum 286 is in its upper position with the buttons of station E in the working position, and all four timing valves are in their downward or inoperative positions. When the cut-off tool 783 has severed the work from the bar and reached the point 1580 of its inward movement, the cut-off reversing valve 283 will have been opened, by contact of screw 728 carried by the cut-off tool slide E with the stem 727 of this valve, sufficiently to cause actuation of the master control valve mechanism and thereby initiate the indexing cycle as shown from 1496 to 1497, which has already been described, and cause a repetition of the cycle of movements as has just been described. The screw 728 carried on the cut-off tool slide E will have been adjusted relative to the cut-off reversing valve 283 that the cut-off tool slide will have reached the end of its inner stroke an instant, represented by the time interval from 1581 to 1582, before the beginning of the retractive movement of same, which will be produced by the release of the automatic valve 291 of the 4A section upon the downward movement of the drum 286 as represented from 1496 to 1497.

I claim:

1. In a machine tool, the combination with a carriage, of a hydraulic motor for traversing said carriage, a source of actuating fluid connected with the motor, and means for regulating the flow of said fluid to the motor, said regulating means comprising a valve adjustable to normally regulate the rate of flow of the fluid, a second valve intermediate the first valve and said source, and means for automatically adjusting said second valve to regulate flow to the first valve in accordance with the pressure differential at opposite sides of said first valve to thereby maintain a substantially uniform rate of flow through the latter.

2. In a machine tool, the combination with a carriage, of a hydraulic motor for traversing said carriage, a source of actuating fluid connected with the motor, and means for regulating the flow of said fluid to the motor, said regulating means comprising a valve adjustable to normally regulate the rate of flow of the fluid, a second valve intermediate the first valve and said source, a piston for actuating said second valve, and means for subjecting one side of said piston to the fluid pressure in that portion of the fluid system intermediate the said first valve and the motor and the opposite side of said piston to the fluid pressure in the system intermediate the first valve and the second valve.

3. In a machine tool, the combination with a carriage, of a hydraulic motor for traversing said carriage, a source of actuating fluid connected with the motor, and means for regulating the flow of said fluid to the motor, said regulating means comprising a valve adjustable to normally regulate the rate of flow of the fluid, a second valve intermediate the first valve and said source, and means actuated automatically by the pressure differential at opposite sides of the first valve for adjusting said second valve and comprising an hydraulic piston connected to the second valve, and means for subjecting the opposite sides of said piston respectively to the fluid pressures at opposite sides of the said first valve.

4. In a machine tool, the combination with a carriage, of a hydraulic motor for traversing said carriage, a source of actuating fluid connected with the motor, and means for regulating the flow of said fluid to the motor, said regulating means comprising a valve adjustable to normally regulate the rate of flow of the fluid, a second valve intermediate the first valve and said source, an hydraulic plunger actuated by the fluid pressure at said source and acting on the second valve in a direction to open said valve, an hydraulic piston operatively connected with the valve and subjected at opposite sides respectively to the fluid pressures at the opposite sides of the first valve, the said pressure at the motor side of the first valve tending to actuate the piston to open the valve, and the pressure at the source side of the first valve tending to actuate the piston to close the valve, and said plunger and piston being so relatively proportioned that the net fluid pressure on the latter may balance the force exerted on the valve by the plunger.

5. In a machine tool, the combination with a carriage, of a hydraulic motor for traversing said carriage, a source of actuating fluid connected with the motor, and means for regulating the flow of said fluid to the motor, said regulating means comprising a valve adjustable to normally regulate the rate of flow of the fluid, a second valve intermediate the first valve and said source, an hydraulic plunger actuated by the fluid pressure at said source and acting on the second valve in a direction to open said valve, an hydraulic piston operatively connected with the valve and subjected at opposite sides respectively to the fluid pressures at the opposite sides of the first valve, the said pressure at the motor side of the first valve tending to actuate the piston to open the valve, and the pressure at the source side of the first valve tending to actuate the piston to close the valve, and said plunger and piston being so relatively proportioned that the net fluid pressure on the latter may balance the force exerted on the valve by the plunger, and the said source side of said piston having a larger effective area than the opposite side.

6. In a machine tool, the combination with a carriage, of a hydraulic motor for reciprocating the carriage, a source of fluid pressure connected to said motor, a valve for regulating the flow of fluid from said source to the motor, a second valve controlling the discharge from said motor, and means actuated by decrease of fluid pressure intermediate the first-named valve and said motor resulting from overrunning of said motor by the carriage for actuating the valve to retard the discharge rate to thereby create a back pressure at said discharge opposing actuation of the motor through the carriage.

7. In a machine tool, the combination with a carriage, of a hydraulic cylinder, a piston in said cylinder, and means for connecting said piston to the carriage, a source of fluid pressure connected to one end of said piston, a valve controlling the discharge from the opposite end of said piston, and means actuated by reduction in pressure at the intake end of said piston resulting from overrunning of said piston by the carriage for actuating the valve to retard the rate of discharge from said piston to thereby create a back pressure opposing actuation of said piston through the carriage.

8. In a machine tool, the combination with a carriage, of a hydraulic motor for actuating the carriage, a source of fluid pressure connected to said motor, a valve controlling the discharge of said motor, resilient means tending to close said valve, means actuated by fluid pressure at the intake of said motor for normally holding said valve open against said resilient means, said resilient means being adapted to move the latter towards the closed position upon decrease of fluid pressure at the intake of said motor resulting from the overrunning of said motor by the carriage whereby a back pressure is created on said motor opposing actuation of the motor through the carriage.

9. In a machine tool, the combination with a rotary turret, of an hydraulic motor operatively connected with the turret, an hydraulic system including a source of fluid energy connected with said motor, said system comprising a valve controlling flow of liquid from said source to the motor, and a second valve controlling the rate of fluid discharge from said motor, means for normally retaining said second valve open, means for opening the first valve to actuate the motor to rotate the turret, means actuated by the motor following a predetermined rotary movement of the turret for adjusting the second valve to retard the motor, and mechanical stop means also actuated by the motor for positively limiting the movement of the motor following said adjustment of the second valve.

10. In a machine tool, the combination with a rotary turret, of an hydraulic motor operatively connected with the turret, an hydraulic system including a source of fluid energy connected with said motor, said system comprising a valve controlling flow of fluid from said source to the motor, and a second valve controlling the rate of fluid discharge from said motor, means for normally retaining said second valve open, means for opening the first valve to actuate the motor to rotate the turret, means actuated by the motor for adjusting the second valve to retard the motor following a predetermined rotary movement of the turret, and mechanical stop means operated by said motor-actuated means for positively limiting the movement of the motor following said adjustment of the second valve.

11. In a machine tool, the combination with a rotary turret, of an hydraulic motor operatively connected with the turret, an hydraulic system including a source of fluid energy connected with said motor, said system comprising a valve controlling the flow of fluid from said source to the motor, and a second valve controlling the rate of fluid discharge from said motor, means for normally retaining said second valve open, means for opening the first valve to actuate the motor to rotate the turret, means for interrupting the operation of the motor following a predetermined rotary movement of the turret, means for subsequently closing said first and second valves, and means operative by closure of said first valve to connect the intake and discharge ports of said motor.

12. In a machine tool, the combination with a rotary turret, of an hydraulic motor operatively connected with the turret, an hydraulic system including a source of fluid energy connected with said motor, said system comprising a valve controlling the flow of fluid from said source to the motor, means for locking the turret in a plurality of positions of rotary adjustment, means for interrupting the operation of said motor following a predetermined rotational movement of said turret to arrest the movement of said turret in one of said positions of adjustment, means for subsequently closing said valve, and means operative in advance of the closing of said valve for actuating said turret-locking means.

13. In a machine tool, the combination with a carriage, and means for traversing said carriage, of a rotary turret mounted on said carriage, an hydraulic motor operatively connected with the turret, an hydraulic system including a source of fluid energy connected with said motor, means including a second hydraulic motor for traversing said carriage, means for actuating the first-named motor to rotate the turret intermittently into a plurality of positions, means operated by the first motor in each movement of the turret to a new position for actuating the second motor to traverse the carriage, and means actuated by movement of the carriage for locking the turret in the respective positions.

14. In a machine tool, the combination with a carriage, and means for traversing said carriage, of a rotary turret mounted on said carriage, an hydraulic motor operatively connected with the turret, an hydraulic system including a source of fluid energy connected with said motor, means including a second hydraulic motor for traversing said carriage, means for actuating the first-named motor to rotate the turret intermittently into a plurality of positions, means operated by the first motor in each movement of the turret to a new position for actuating the second motor to traverse the carriage, means actuated by movement of the carriage for locking the turret in the respective positions, and means associated with said first motor for retaining the turret in the adjusted position until actuation of said locking means.

15. In a turret machine tool, the combination with a work carrier, of a turret tool carrier, hydraulic mechanism for relatively traversing said carriers, said mechanism comprising a plurality of control valves each adapted independently of the others to regulate the said traverse movement in the cutting operation of the tool upon the work, means synchronized with the traversing mechanism for adjusting the turret successively into a plurality of differing positions, and means operatively connected with the turret-adjusting means for selectively rendering said valves operative in the said differing positions of the turret.

16. In a turret machine tool, the combination with a work carrier, of a turret tool carrier, hydraulic mechanism for relatively traversing said carriers, means synchronized with the traversing mechanism for adjusting the turret successively into a plurality of differing positions, a plurality of valves individually operative to control the hydraulic mechanism for regulating the said traverse movement in the cutting operation of the tool upon the work, means for independently adjusting the valves to afford relatively differing traverse movements, and means operatively connected with the turret-adjusting means for selectively rendering said valves operative in the said differing positions of the turret.

17. In a turret machine tool, the combination with a work carrier, of a turret tool carrier, mechanism for relatively traversing said carriers, mechanism for rotatably adjusting said turret, means actuated by the latter mechanism for controlling the operation of the traverse mechanism, control means for the turret mechanism, means for operatively connecting said turret-control means with the traverse mechanism to effect a synchronized cyclic operation of said mechanisms, and means for periodically operatively disconnecting said turret-control means from the traverse mechanism to thereby interrupt the operation of both of said mechanisms.

18. In a turret machine tool, the combination with a work carrier, of a turret tool carrier, hydraulic mechanism for relatively traversing said carriers, an hydraulic motor for rotatably adjusting the turret, a valve controlling the operation of the traverse mechanism, actuating means for the valve operatively connected with said motor, a second valve controlling the operation of said motor, means for operatively connecting said second valve with the traverse mechanism to effect a synchronized cyclic operation of said mechanisms, hydraulically-actuated means for operatively disconnecting the said second valve from the traverse mechanism for interrupting the operation of the said motor and hence of the traverse mechanism, and a master control valve for said hydraulically-actuated means.

19. In an hydraulically-actuated machine tool, the combination with a traversible carriage, of master valve mechanism for controlling the movements of said machine, an hydraulic motor for actuating said valve mechanism, pressure means for normally preventing operation of said motor, means actuated in timed relation with the traverse movement of the carriage for relieving said pressure to permit said motor to actuate the valve mechanism, and means automatically operative to reapply said pressure to again render the motor inoperative.

20. In an hydraulically-actuated machine tool, the combination with a traversible carriage, of master valve mechanism for controlling the movements of said machine, an hydraulic motor for actuating said valve mechanism, a control valve for said motor comprising a valve-actuating element located in the path of and adapted for operation by said carriage when the latter moves in one direction, and hydraulic mechanism for retracting said element to prevent actuation of the valve by the reverse movement of the carriage, said hydraulic retracting mechanism including means for preventing actuation of the valve when said element is so retracted.

21. In an hydraulically-actuated machine tool, the combination with a master control valve mechanism, of means for actuating said mechanism comprising a plurality of hydraulic piston and cylinder assemblies, means for admitting pressure from a common source simultaneously to the opposite sides of each of the respective pistons, said pistons having larger effective areas at one side than at the other, common means for retarding the flow of pressure from the source to the sides of said pistons of greater area, and means for intermittently relieving the pressure at the said sides of greater area to thereby effect an intermittent reciprocation of said pistons.

22. In an hydraulic control device, the combination with control valve mechanism and means for actuating said mechanism, of independent means forming a part of the said control valve mechanism and operative as a result of said actuation for initiating a subsequent actuation of the mechanism after a predetermined time interval.

23. In an hydraulically-actuated machine, the combination with master control valve mechanism, of means for intermittently actuating said mechanism to effect a cyclic operation of said machine, said control valve mechanism including means operative in the normal actuation of the mechanism for initiating a succeeding actuation thereof after a predetermined time interval.

24. In an hydraulically-actuated machine, the combination with a plurality of parts and mechanisms for independently actuating said parts, of a master control valve device operatively associated with said mechanisms, and means for intermittently actuating said device to effect a progressive cyclic actuation of said parts, said intermittent actuating means comprising means for selectively regulating the time interval between successive actuations of said control valve mechanism.

25. In an hydraulically-actuated machine, the combination with means for effecting an intermittent actuation of said machine, of means for selectively regulating the time interval between successive operations, said regulating means comprising a piston valve, means for normally applying pressure to both ends of said valve to maintain the valve in closed position, means for relieving the pressure at one side of said valve to permit the valve to open, and means for regulating the interval of time required for movement of the valve from the closed to the open position, said regulating means comprising means for regulating the rate of travel of the valve into the open position in combination with other means for regulating the effective stroke of the valve to vary the travel of the latter from the closed to the open position.

26. In an hydraulically-actuated machine tool, the combination with a longitudinally movable tool carriage, of a transversely movable tool carriage and mechanism for independently traversing said carriages, of means for effecting an intermittent actuation of said carriages, said means comprising a master valve, mechanism including a plurality of valves respectively connected with and controlling the operation of said traversing mechanisms, together with means for operating said valves to effect a synchronized actuation of the carriages, and a plurality of independent means actuated respectively by the movement of said carriages for effecting actuation of said operating means.

27. In an hydraulically-actuated machine, the combination with means for effecting an intermittent cyclic operation of said machine, said means comprising a master valve mechanism including a rotary valve-actuating member, means for intermittently rotating said member from an initial position into a plurality of successive operative positions corresponding with the successive operations of said machine, and means operatively associated with said master valve mechanism and automatically operative when said cycle of operations is complete for resetting said rotary valve-actuating member to the said initial position in preparation for a repetition of said cyclic operation.

28. In an hydraulically-actuated machine tool, the combination with a plurality of independently movable parts including a traversable carriage, and hydraulic means for actuating said parts, of a plurality of valves for controlling the actuation of said parts, and a master control device for selectively actuating said valves, said device comprising a rotary drum, a plurality of valve-actuating members mounted on said drum, and means for intermittently rotating said drum to bring said members successively into valve-actuating position.

29. In an hydraulically-actuated machine tool, the combination with a plurality of independently movable parts including a traversable carriage, and hydraulic means for actuating said parts, of a plurality of valves for controlling the actuation of said parts, and a master control device for selectively actuating said valves, said device comprising a rotary drum, a plurality of valve-actuating members mounted on said drum, and means for intermittently rotating said drum to bring said members successively into valve-actuating position, said members being removably attached to said drum to provide for variable cyclic actuations of said valves.

30. In an hydraulic control device, the combination with a plurality of valves, of means for selectively actuating said valves, said means comprising a rotary drum, a plurality of valve-actuating elements adapted to be detachably secured to said drum in a plurality of selective positions corresponding to the positions of the respective valves and circumferentially of the drum, means for intermittently rotating said drum to bring said elements successively into alignment with said valves, and means for intermittently reciprocating said drum to effect an actuating engagement of said elements with the corresponding valves.

31. In an hydraulic control device, the combination with a plurality of valves and means for selectively actuating said valves, said means comprising a rotary drum, valve-actuating elements carried by said drum, means for intermittently angularly moving said drum from an initial position successively through a plurality of different operative positions, and means for subsequently reversely rotating the drum to return the drum to said initial position.

32. In an hydraulic control device, the combination with a plurality of valves and means for selectively actuating said valves, said means comprising a rotary drum, valve-actuating elements carried by said drum, means for intermittently angularly moving said drum from an initial position successively through a plurality of different operative positions, said means comprising an hydraulic piston for actuating said drum and escapement means providing for said intermittent actuation, and means for reversing moving said piston to return the drum to the said initial position.

33. In an hydraulic machine tool, the combination with a tool slide, of an hydraulic motor for advancing said slide to feed the tool to the work, means for reversing the motor to retract the tool, said means comprising a motor control valve arranged for actuation by the tool slide when the latter moves into the advance position, and a timing valve interposed between the said control valve and the motor for injecting a time interval between the actuation of said control valve and the reverse operation of said motor.

34. In an hydraulic machine tool, the combination with a tool slide, of an hydraulic motor for advancing said slide to feed the tool to the work, means for reversing the motor to retract the tool, said means comprising a motor control valve arranged for actuation by the tool slide when the latter moves into the advance position, a timing valve interposed between the said control valve and the motor for injecting a time interval between the actuation of said control valve and the reverse operation of said motor, said timing valve comprising an hydraulic piston controlling the flow of the actuating fluid to the motor, fluid means controlled by the first-named valve for actuating said piston to admit fluid pressure to the motor, and adjustable means for controlling the rate of movement of said piston.

35. In an hydraulic control device, the combination with a plurality of valves and means for selectively actuating said valves, said means comprising a rotary drum, valve-actuating elements carried by said drum, means for intermittently angularly moving said drum from an initial position successively through a plurality of different operative positions, and means for subsequently rotating the drum to return the drum to said initial position.

36. In a machine tool, the combination with a traversible carriage, of a plurality of hydraulic motors for actuating said carriage and other moving parts of said machine, means for supplying hydraulic pressure to said motors, master valve mechanism comprising a plurality of independent motor-controlling valves and means for actuating said valves to effect a synchronized operation of said motors, motor means for operating said actuating means, and means actuated in timed relation with the traverse movement of the carriage for actuating said motor means.

37. An hydraulically-actuated machine tool comprising in combination a plurality of machine units mutually productive in synchronized operation of a predetermined result, one of said units comprising a traversible carriage, and each of said units including a prime mover in the form of a fluid motor, a master valve mechanism comprising a plurality of independent motor-controlling valves, and means for actuating said valves to effect a synchronized operation of said motors, fluid motor means for operating said actuating means, a valve for controlling the operation of the last-named fluid motor and through said motor of the master valve mechanism, and means actuated in timed relation with the traverse movement of said carriage for operating said last-named valve.

38. An hydraulically-actuated machine tool comprising in combination a plurality of machine units mutually productive in synchronized operation of a predetermined result, one of said units comprising a traversible carriage, another of said units comprising work-feeding devices, and each of said units including a prime mover in the form of a fluid motor, a master valve mechanism comprising a plurality of independent motor-controlling valves, and means for actuating said valves to effect a synchronized cyclic operation of said motors, fluid motor means for operating said actuating means, a valve for controlling operation of the last-named fluid motor and through said motor of the master valve mechanism, and means actuated in timed relation with the traverse movement of said carriage for operating said last-named valve.

39. An hydraulically-actuated machine tool comprising in combination a plurality of machine units mutually productive in synchronized operation of a predetermined result, several of said units comprising respectively a traversible carriage, a work-supporting chuck, together with means for progressively feeding said work, and means for severing a portion of the work supported by said chuck, and each of said units including a prime mover in the form of a fluid motor, a master valve mechanism comprising a plurality of independent motor-controlling valves, and means for actuating said valves to effect a synchronized cyclic operation of said motors, fluid motor means for operating said actuating means, a valve for controlling the operation of the last-named motor and through said motor of the master valve mechanism, and means actuated in timed relation with the operation of said carriage for operating the last-named valve.

GILBERT V. ANDERSON.